(12) United States Patent
Hirota et al.

(10) Patent No.: US 6,546,721 B2
(45) Date of Patent: Apr. 15, 2003

(54) EXHAUST GAS PURIFICATION DEVICE

(75) Inventors: Shinya Hirota, Susono (JP); Toshiaki Tanaka, Numazu (JP); Kazuhiro Itoh, Mishima (JP); Koichiro Nakatani, Susono (JP); Koichi Kimura, Susono (JP); Takamitsu Asanuma, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 3 days.

(21) Appl. No.: 09/834,894

(22) Filed: Apr. 16, 2001

(65) Prior Publication Data

US 2001/0032459 A1 Oct. 25, 2001

(30) Foreign Application Priority Data

Apr. 18, 2000 (JP) ........................................ 2000-122409
May 10, 2000 (JP) ........................................ 2000-142323
Feb. 21, 2001 (JP) ........................................ 2001-045442

(51) Int. Cl.[7] ................................................ F01N 3/00
(52) U.S. Cl. .............................. 60/297; 60/278; 60/280; 60/295; 60/311; 60/286
(58) Field of Search .......................... 60/274, 285, 286, 60/280, 278, 295, 297, 311, 301, 300

(56) References Cited

U.S. PATENT DOCUMENTS

| | | |
|---|---|---|
| 4,902,487 A | 2/1990 | Cooper et al. |
| 5,100,632 A | 3/1992 | Dettling et al. |
| 5,404,719 A | 4/1995 | Araki et al. |
| 5,473,890 A * | 12/1995 | Takeshima et al. ............ 60/285 |
| 5,775,099 A * | 7/1998 | Ito et al. ........................ 60/274 |
| 6,058,700 A * | 5/2000 | Yamashita et al. ............. 60/285 |
| 6,167,696 B1 * | 1/2001 | Maaseidvaag et al. ........ 60/274 |

FOREIGN PATENT DOCUMENTS

| | | |
|---|---|---|
| EP | 0 766 993 A2 | 4/1997 |
| JP | 6-129235 A | 5/1994 |
| JP | 6-159037 A | 6/1994 |
| JP | 6-272541 A | 9/1994 |
| JP | 7-106290 B2 | 11/1995 |
| JP | 9-94434 A | 4/1997 |
| JP | 11-300165 A | 11/1999 |
| JP | 3012249 B2 | 12/1999 |
| JP | 2000-18026 A | 1/2000 |

* cited by examiner

Primary Examiner—Thomas Denion
Assistant Examiner—Binh Tran
(74) Attorney, Agent, or Firm—Oliff & Berridge, PLC

(57) ABSTRACT

An engine comprising a particulate filter which is arranged in the exhaust passage and has a function of absorbing $NO_x$, where the amount of discharged particulate discharged from the combustion chamber per unit time is made smaller than the amount of particulate removable by oxidation per unit time without emitting a luminous flame on the particulate filter and where the temperature of the particulate filter is maintained in a temperature range where the $NO_x$ absorption rate becomes more than a certain value.

38 Claims, 36 Drawing Sheets

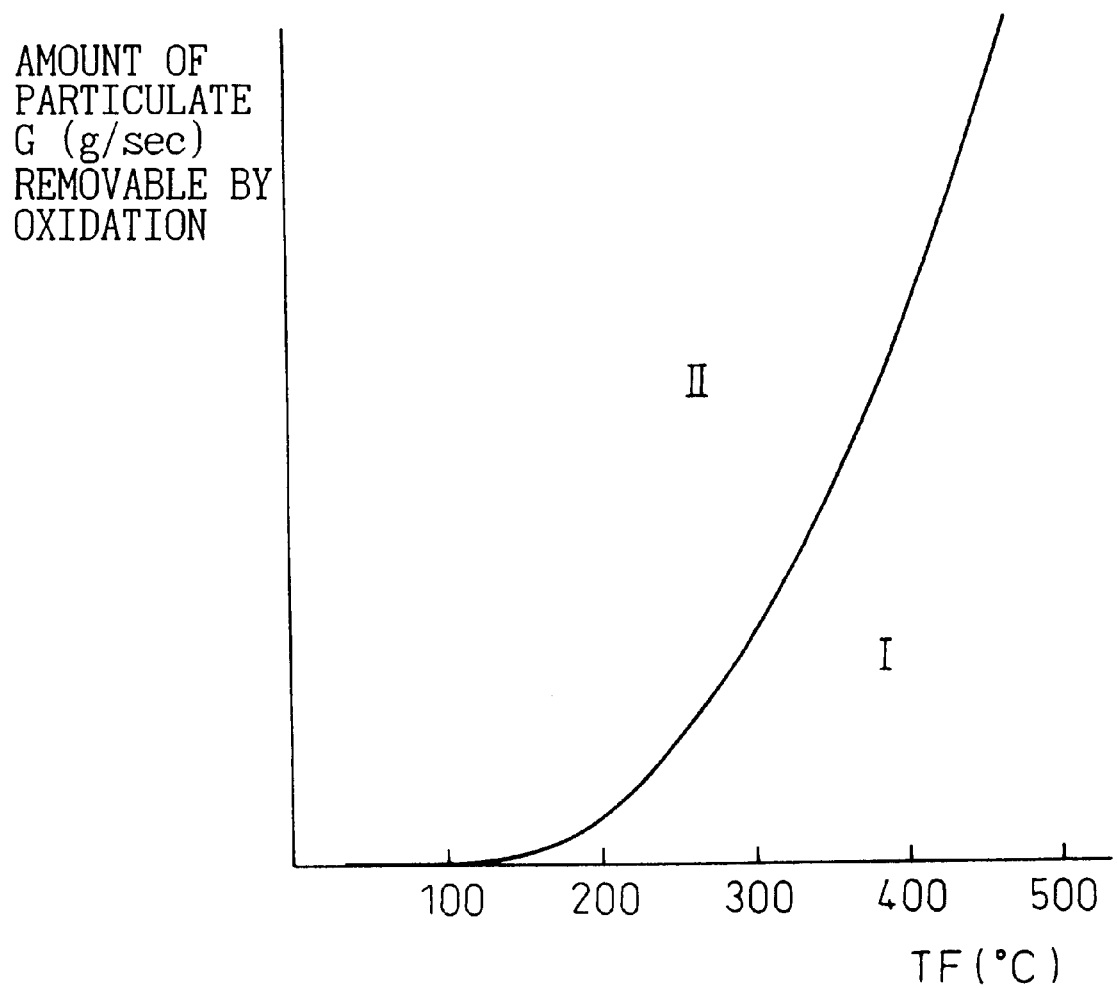

TF=200°C

TF=250°C

TF=300°C

TF=350°C

TF=400°C

TF=450°C

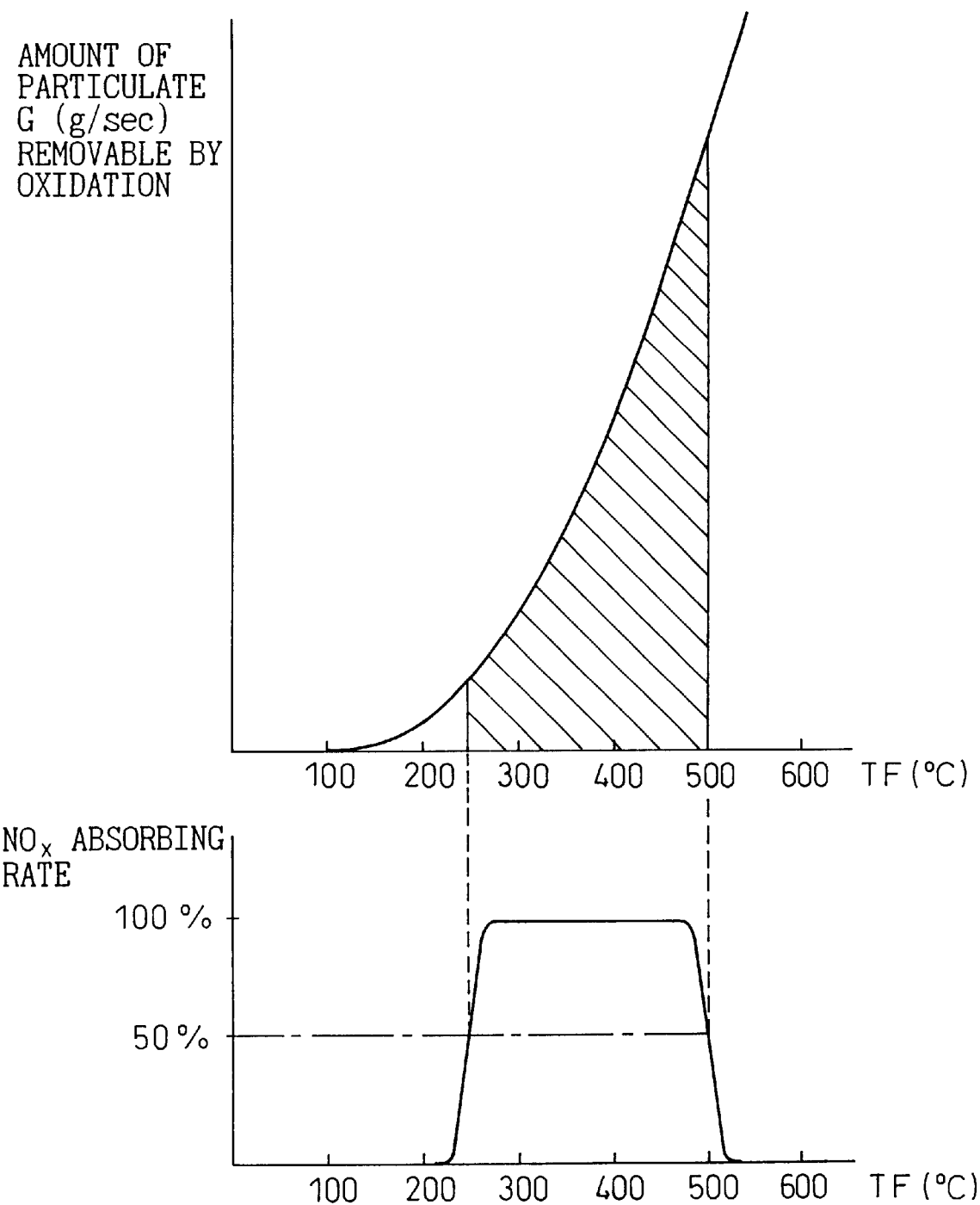

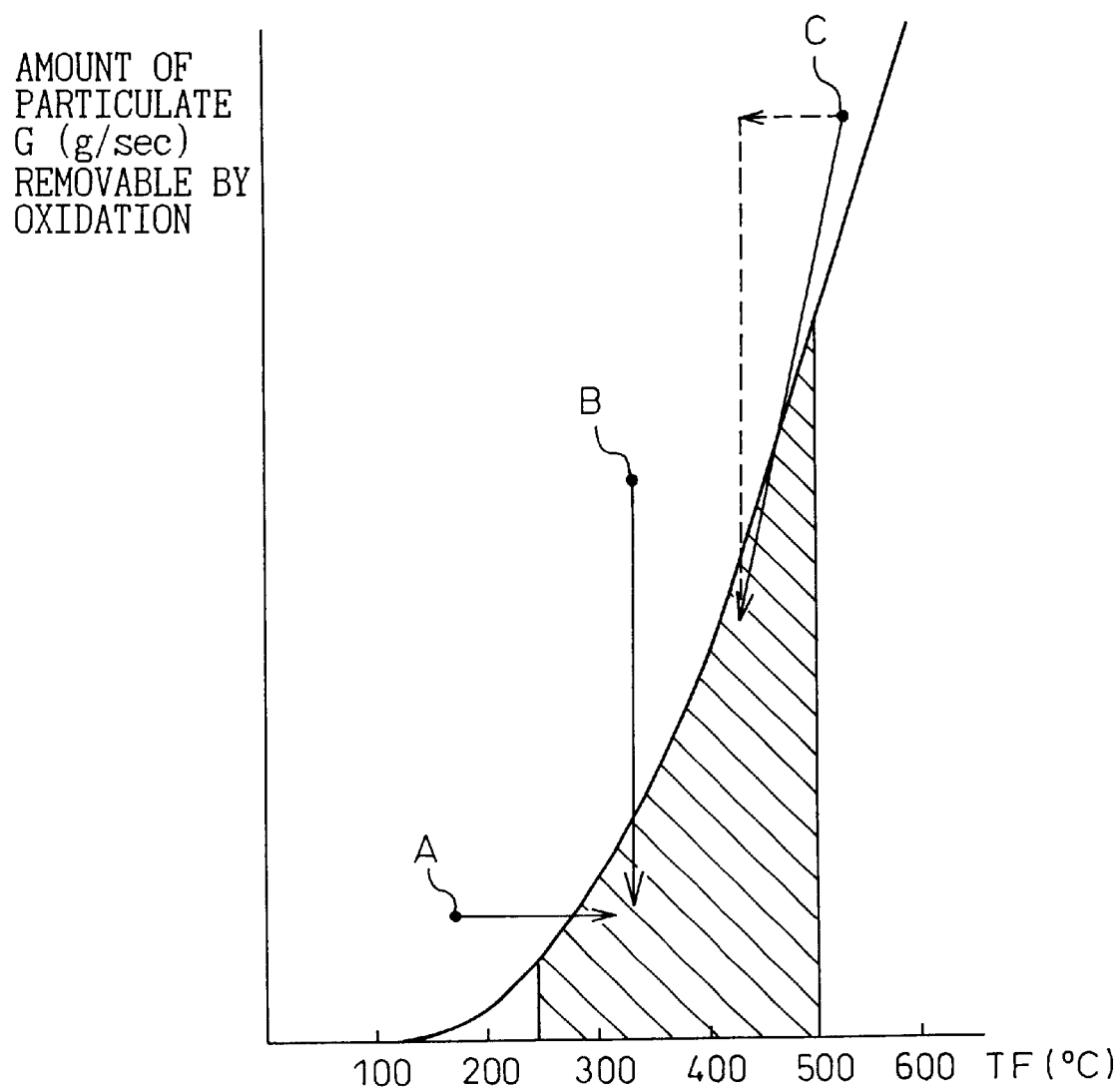

EXHAUST GAS PURIFICATION DEVICE

BACKGROUND OF THE INVENTION

1. Field of the Invention

The present invention relates to an exhaust gas purification device of an engine.

2. Description of the Related Art

In the related art, in a diesel engine, particulate contained in the exhaust gas is removed by arranging a particulate filter in the engine exhaust passage, using that particulate filter to trap the particulate in the exhaust gas, and igniting and burning the particulate trapped on the particulate filter to recycle the particulate filter. The particulate trapped on the particulate filter, however, does not ignite unless the temperature becomes a high one of at least about 600° C. As opposed to this, the temperature of the exhaust gas of a diesel engine is normally considerably lower than 600° C. Therefore, it is difficult to use the heat of the exhaust gas to cause the particulate trapped on the particulate filter to ignite. To use the heat of the exhaust gas to cause the particulate trapped on the particulate filter to ignite, it is necessary to lower the ignition temperature of the particulate.

It has been known in the related art, however, that the ignition temperature of particulate can be reduced if carrying a catalyst on the particulate filter. Therefore, known in the art are various particulate filters carrying catalysts for reducing the ignition temperature of the particulate.

For example, Japanese Examined Patent Publication (Kokoku) No. 7-106290 discloses a particulate filter comprising a particulate filter carrying a mixture of a platinum group metal and an alkali earth metal oxide. In this particulate filter, the particulate is ignited by a relatively low temperature of about 350° C. to 400° C., then is continuously burned.

Summarizing the problem to be solved by the invention, in a diesel, engine, when the load becomes high, the temperature of the exhaust gas reaches from 350° C. to 400° C., therefore with the above particulate filter, it would appear at first glance that the particulate could be made to ignite and burn by the heat of the exhaust gas when the engine load becomes high. In fact, however, even if the temperature of the exhaust gas reaches from 350° C. to 400° C., sometimes the particulate will not ignite. Further, even if the particulate ignites, only some of the particulate will burn and a large amount of the particulate will remain unburned.

That is, when the amount of the particulate contained in the exhaust gas is small, the amount of the particulate deposited on the particulate filter is small. At this time, if the temperature of the exhaust gas reaches from 350° C. to 400° C., the particulate on the particulate filter ignites and then is continuously burned.

If the amount of the particulate contained in the exhaust gas becomes larger, however, before the particulate deposited on the particulate filter completely burns, other particulate will deposit on that particulate. As a result, the particulate deposits in layers on the particulate filter. If the particulate deposits in layers on the particulate filter in this way, the part of the particulate easily contacting the oxygen will be burned, but the remaining particulate hard to contact the oxygen will not burn and therefore a large amount of particulate will remain unburned. Therefore, if the amount of particulate contained in the exhaust gas becomes larger, a large amount of particulate continues to deposit on the particulate filter.

On the other hand, if a large amount of particulate is deposited on the particulate filter, the deposited particulate gradually becomes harder to ignite and burn. It probably becomes harder to burn in this way because the carbon in the particulate changes to the hard-to-burn graphite etc. while depositing. In fact, if a large amount of particulate continues to deposit on the particulate filter, the deposited particulate will not ignite at a low temperature of 350° C. to 400° C. A high temperature of over 600° C. is required for causing ignition of the deposited particulate. In a diesel engine, however, the temperature of the exhaust gas usually never becomes a high temperature of over 600° C. Therefore, if a large amount of particulate continues to deposit on the particulate filter, it is difficult to cause ignition of the deposited particulate by the heat of the exhaust gas.

On the other hand, at this time, if it were possible to make the temperature of the exhaust gas a high temperature of over 600° C., the deposited particulate would be ignited, but another problem would occur in this case. That is, in this case, if the deposited particulate were made to ignite, it would burn while generating a luminous flame. At this time, the temperature of the particulate filter would be maintained at over 800° C. for a long time until the deposited particulate finished being burned. If the particulate filter is exposed to a high temperature of over 800° C. for a long time in this way, however, the particulate filter will deteriorate quickly and therefore the problem will arise of the particulate filter having to be replaced with a new filter early.

Further, if the deposited particulate is burned, the ash will condense and form large masses. These masses of ash clog the fine holes of the particulate filter. The number of the clogged fine holes gradually increases along with the elapse of time and therefore the pressure loss of the flow of exhaust gas in the particulate filter gradually becomes larger. If the pressure loss of the flow of exhaust gas becomes larger, the output of the engine falls and therefore due to this as well a problem arises that the particulate filter has to be replaced quickly with a new filter.

If a large amount of particulate deposits once in layers in this way, various problems arise as explained above. Therefore, it is necessary to prevent a large amount of particulate from depositing in layers while considering the balance between the amount of particulate contained in the exhaust gas and the amount of particulate able to be burned on the particulate filter. With the particulate filter disclosed in the above publication, however, no consideration is given at all to the balance between the amount of particulate contained in the exhaust gas and the amount of particulate able to be burned on the particulate filter and therefore various problems arise as explained above.

Further, with the particulate filter disclosed in the above publication, if the temperature of the exhaust gas falls below 350° C., the particulate will not ignite and therefore the particulate will deposit on the particulate filter. In this case, if the amount of deposition is small, when the temperature of the exhaust gas reaches from 350° C. to 400° C., the deposited particulate will be burned, but if a large amount of particulate deposits in layers, the deposited particulate will not ignite when the temperature of the exhaust gas reaches from 350° C. to 400° C. Even if it does ignite, part of the particulate will not burn, so will remain unburned.

In this case, if the temperature of the exhaust gas is raised before the large amount of particulate deposits in layers, it is possible to make the deposited particulate burn without leaving any, but with the particulate filter disclosed in the above publication, this is not considered at all. Therefore, when a large amount of particulate deposits in layers, so far as the temperature of the exhaust gas is not raised to over 600° C., all of the deposited particulate cannot be made to burn.

Further, known is an $NO_x$ absorbent which absorbs the $NO_x$ exhaust gas when the air-fuel ratio of the inflowing exhaust gas is lean and which releases and reduces the absorbed $NO_x$ when the air-fuel ratio of the inflowing exhaust gas becomes the stoichiometric air-fuel ratio or rich. If this $NO_x$ absorbent is arranged in the engine exhaust passage, the $NO_x$ generated during combustion under a lean air-fuel ratio can be made to be absorbed in the $NO_x$ absorbent.

The absorption action of the $NO_x$ by this $NO_x$ absorbent, however, only occurs in a certain temperature range determined by the $NO_x$ absorbent. The same applies even when giving an $NO_x$ absorption function to a particulate filter. Therefore, when giving an $NO_x$ absorption function to the particulate filter, it is necessary to keep a large amount of particulate from being deposited on the particulate filter and simultaneously maintain the temperature of the particulate filter in a temperature range where the $NO_x$ absorption action occurs.

SUMMARY OF THE INVENTION

An object of the present invention is to provide an exhaust gas purification apparatus designed to simultaneously remove the particulate and $NO_x$ in an exhaust gas by a novel method.

According to the present invention, there is provided an exhaust gas purification apparatus of an engine having a combustion chamber comprising an exhaust passage and a particulate filter arranged in the exhaust passage for removing particulate in exhaust gas exhausted from the combustion chamber; the particulate filter being a particulate filter having a function of removing, by oxidation, particulate in the exhaust gas without emitting a luminous flame when an amount of discharged particulate discharged from the combustion chamber per unit time is smaller than an amount of particulate removable by oxidation per unit time without emitting a luminous flame on the particulate filter and of absorbing $NO_x$ in exhaust gas when an air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich; the amount of the discharged particulate and the temperature of the particulate filter being usually maintained within a simultaneous particulate and $NO_x$ treatment region in a temperature region wherein the amount of discharged particulate becomes smaller than an amount of particulate removable by oxidation and a $NO_x$ absorption rate becomes more than a certain value at all times.

BRIEF DESCRIPTION OF THE DRAWINGS

These and other objects and features of the present invention will be more apparent from the following description given with reference to the accompanying drawings, wherein:

FIG. 6 is a view of the relationship between the amount of particulate removable by oxidation and the temperature of the particulate filter;

FIG. 11 is a view of a simultaneous particulate and $NO_x$ treatment region;

FIG. 12 is a view for explaining the method of removal by oxidation of particulate;

DESCRIPTION OF THE PREFERRED EMBODIMENTS

Figure 1:
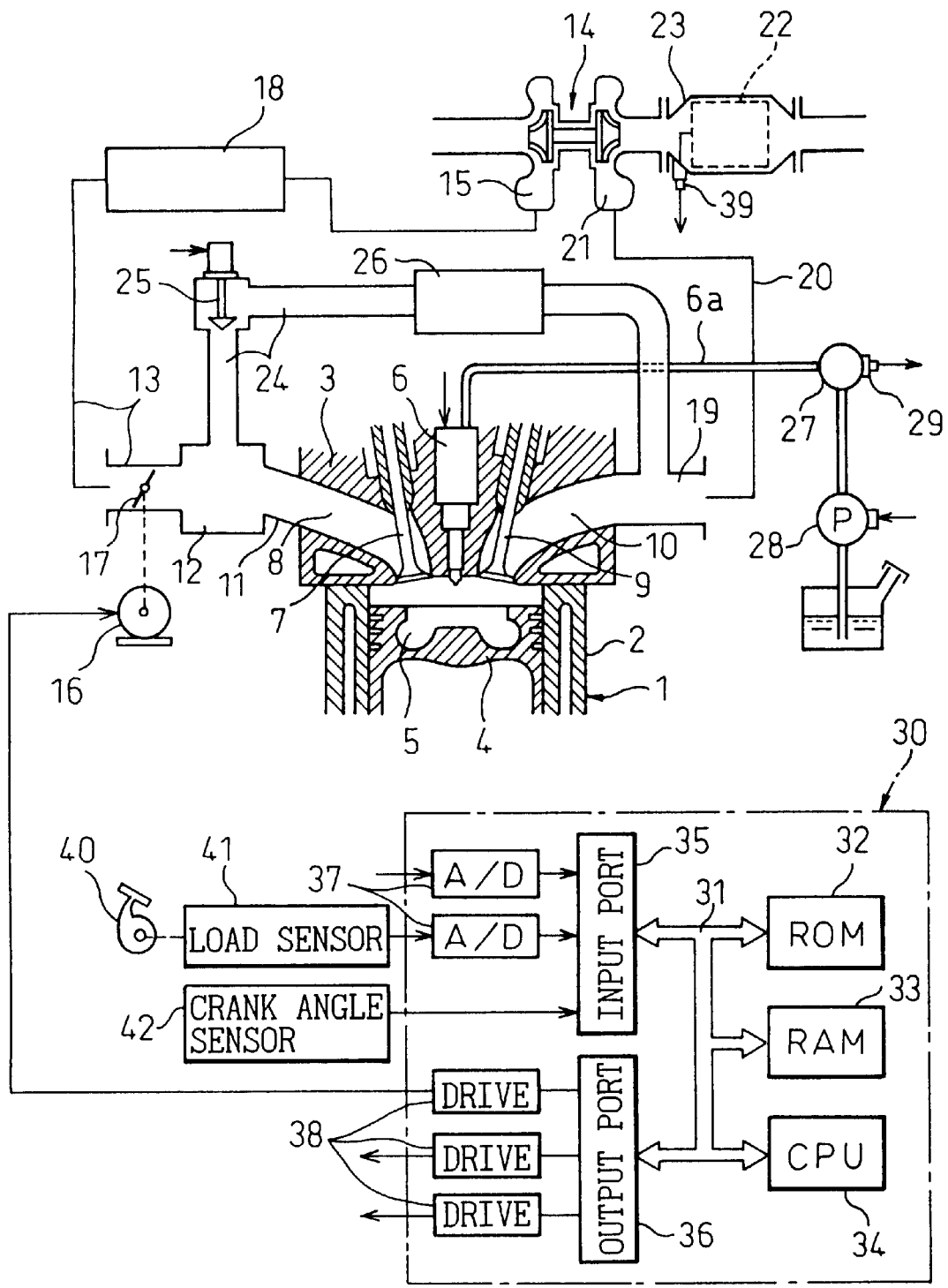
FIG. 1 is an overall view of an internal combustion engine.

FIG. 1 shows the case of application of the present invention to a compression ignition type internal combustion engine. Note that the present invention can also be applied to a spark ignition type internal combustion engine.

Referring to FIG. 1, 1 indicates an engine body, 2 a cylinder block, 3 a cylinder head, 4 a piston, 5 a combustion chamber, 6 an electrically controlled fuel injector, 7 an intake valve, 8 an intake port, 9 an exhaust valve, and 10 an exhaust port. The intake port 8 is connected to a surge tank 12 through a corresponding intake tube 11, while the surge tank 12 is connected to a compressor 15 of an exhaust turbocharger 14 through an intake duct 13. Inside the intake duct 13 is arranged a throttle valve 17 driven by a step motor 16. Further, a cooling device 18 is arranged around the intake duct 13 for cooling the intake air flowing through the intake duct 13. In the embodiment shown in FIG. 1, the engine coolant water is lead inside the cooling device 18 and the intake air is cooled by the engine coolant water. On the other hand, the exhaust port 10 is connected to an exhaust turbine 21 of an exhaust turbocharger 14 through an exhaust manifold 19 and an exhaust pipe 20. The outlet of the exhaust turbine 21 is connected to a casing 23 housing a particulate filter 22.

The exhaust manifold 19 and the surge tank 12 are connected to each other through an exhaust gas recirculation (EGR) passage 24. Inside the EGR passage 24 is arranged an electrically controlled EGR control valve 25. A cooling device 26 is arranged around the EGR passage 24 to cool the EGR gas circulating inside the EGR passage 24. In the embodiment shown in FIG. 1, the engine coolant water is guided inside the cooling device 26 and the EGR gas is cooled by the engine coolant water. On the other hand, fuel injectors 6 are connected to a fuel reservoir, a so-called common rail 27, through fuel feed pipes 6a. Fuel is fed into the common rail 27 from an electrically controlled variable discharge fuel pump 28. The fuel fed into the common rail 27 is fed to the fuel injectors 6 through the fuel feed pipes 6a. The common rail 29 has a fuel pressure sensor 29 attached to it for detecting the fuel pressure in the common rail 27. The discharge of the fuel pump 28 is controlled based on the output signal of the fuel pressure sensor 29 so that the fuel pressure in the common rail 27 becomes a target fuel pressure.

An electronic control unit 30 is comprised of a digital computer provided with a read only memory (ROM) 32, random access memory (RAM) 33, microprocessor (CPU) 34, input port 35, and output port 36 connected to each other through a bidirectional bus 31. The output signal of the fuel pressure sensor 29 is input through a corresponding AD converter 37 to the input port 35. Further, the particulate filter 22 has attached to it a temperature sensor 39 for detecting the particulate filter 22. The output signal of this temperature sensor 39 is input to the input port 35 through the corresponding AD converter 37. An accelerator pedal 40 has connected to it a load sensor 41 generating an output voltage proportional to the amount of depression L of the accelerator pedal 40. The output voltage of the load sensor 41 is input to the input port 35 through the corresponding AD converter 37. Further, the input port 35 has connected to it a crank angle sensor 42 generating an output pulse each time a crankshaft rotates by for example 30 degrees. On the other hand, the output port 36 is connected through corresponding drive circuits 38 to the fuel injectors 6, the step motor 16 for driving the throttle valve, the EGR control valve 25, and the fuel pump 28.

Figure 2A:
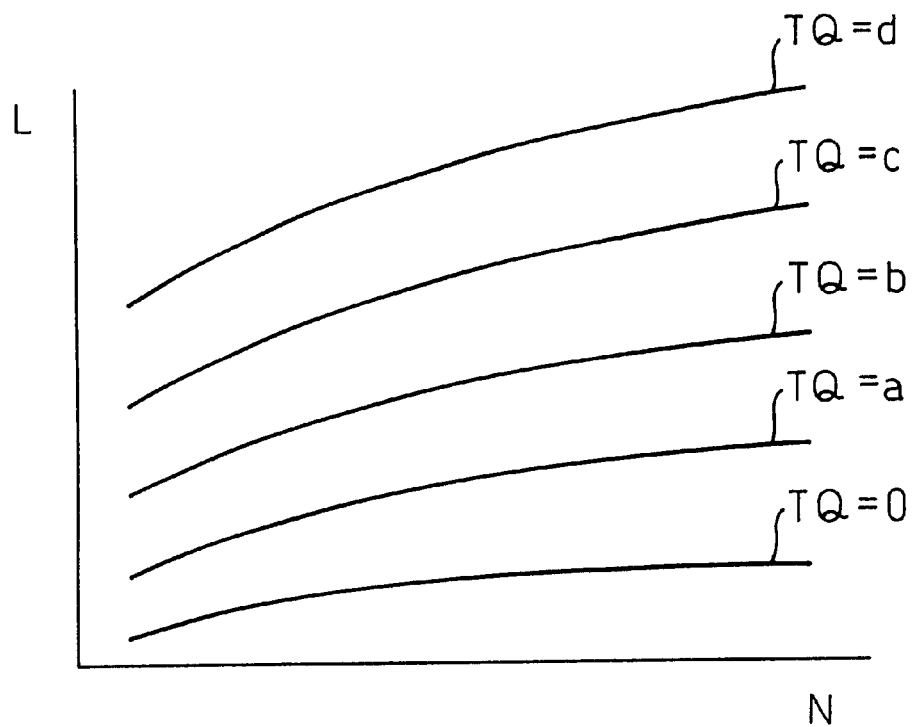
FIGS. 2A and 2B are views of a required torque of an engine.
Figure 2B:
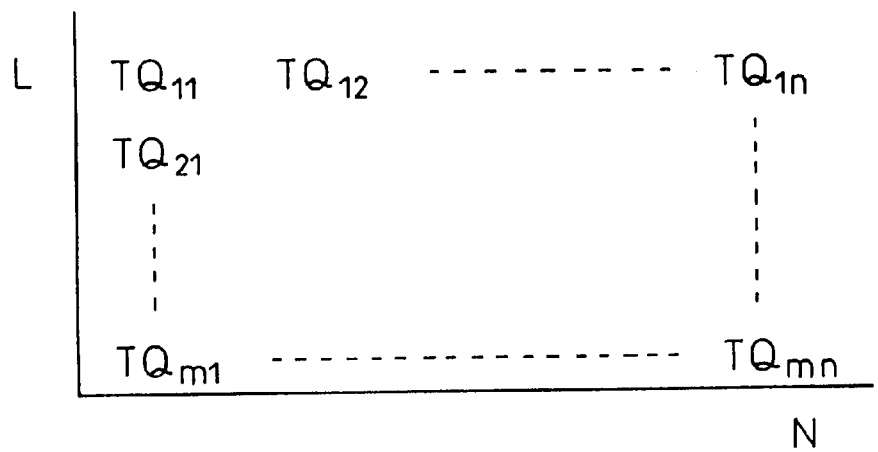

FIG. 2A shows the relationship between the required torque TQ, the amount of depression L of the accelerator pedal 40, and the engine speed N. Note that in FIG. 2A, the curves show the equivalent torque curves. The curve shown by TQ=0 shows the torque is zero, while the remaining curves show gradually increasing required torques in the order of TQ=a, TQ=b, TQ=c, and TQ=d. The required torque TQ shown in FIG. 2A, as shown in FIG. 2B, is stored in the ROM 32 in advance as a function of the amount of depression L of the accelerator pedal 40 and the engine speed N. In this embodiment of the present invention, the required torque TQ in accordance with the amount of depression L of the accelerator pedal 40 and the engine speed N is first calculated from the map shown in FIG. 2B, then the amount of fuel injection etc. are calculated based on the required torque TQ.

Figure 3A:
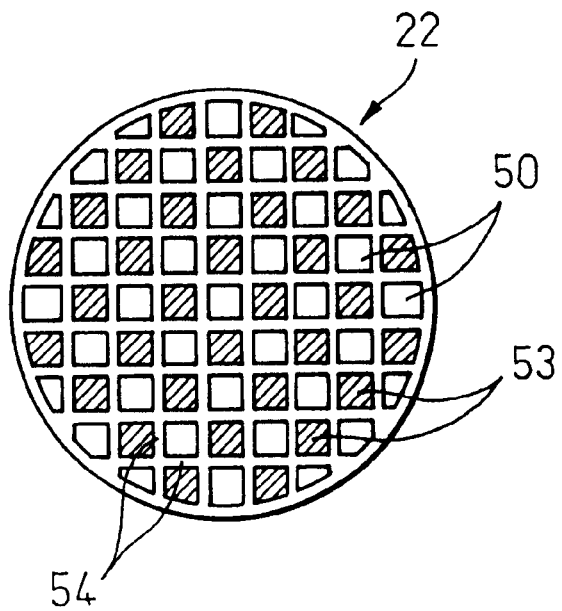
FIGS. 3A and 3B are views of a particulate filter.
Figure 3B:
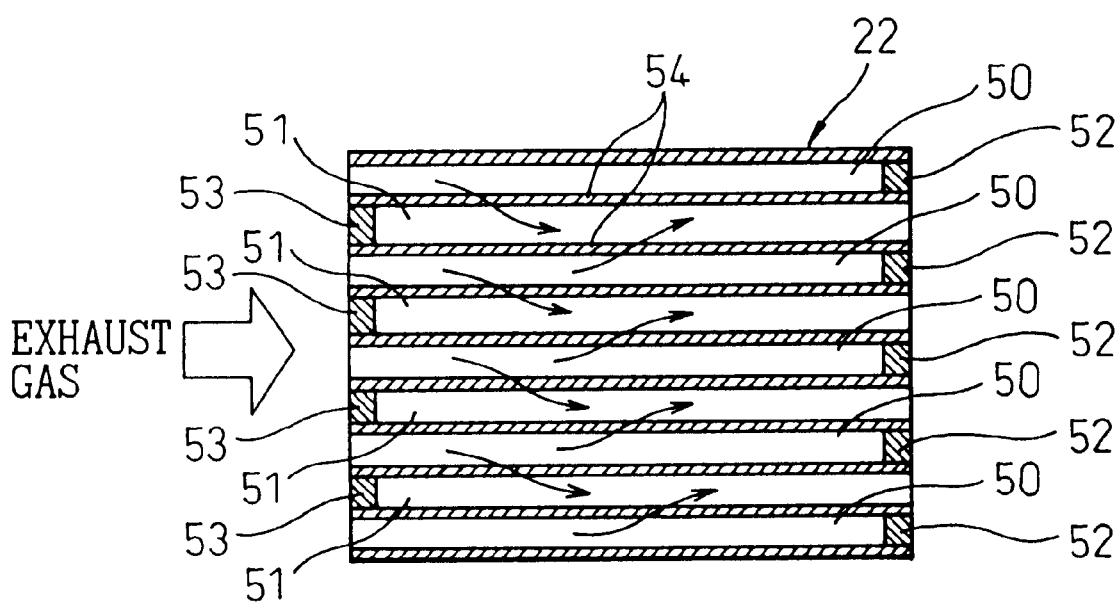

FIGS. 3A and 3B show the structure of the particulate filter 22. Note that FIG. 3A is a front view of the particulate filter 22, while FIG. 3B is a side sectional view of the particulate filter 22. As shown in FIGS. 3A and 3B, the particulate filter 22 forms a honeycomb structure and is provided with a plurality of exhaust circulation passages 50, 51 extending in parallel with each other. These exhaust circulation passages are comprised by exhaust gas inflow passages 50 with downstream ends sealed by plugs 52 and exhaust gas outflow passages 51 with upstream ends sealed by plugs 52. Note that the hatched portions in FIG. 3A show plugs 53. Therefore, the exhaust gas inflow passages 50 and the exhaust gas outflow passages 51 are arranged alternately through thin wall partitions 54. In other words, the exhaust gas inflow passages 50 and the exhaust gas outflow passages 51 are arranged so that each exhaust gas inflow passage 50 is surrounded by four exhaust gas outflow passages 51, and each exhaust gas outflow passage 51 is surrounded by four exhaust gas inflow passages 50.

The particulate filter 22 is formed from a porous material such as for example cordierite. Therefore, the exhaust gas flowing into the exhaust gas inflow passages 50 flows out into the adjoining exhaust gas outflow passages 51 through the surrounding partitions 54 as shown by the arrows in FIG. 3B.

In this embodiment of the present invention, a layer of a carrier comprised of for example aluminum is formed on the peripheral surfaces of the exhaust gas inflow passages 50 and the exhaust gas outflow passages 51, that is, the two side surfaces of the partitions 54 and the inside walls of the fine holes in the partitions 54. On the carrier are carried a precious metal catalyst and an active oxygen release agent which absorbs the oxygen and holds the oxygen if excess oxygen is present in the surroundings and releases the held oxygen in the form of active oxygen if the concentration of the oxygen in the surroundings falls.

In this case, in this embodiment according to the present invention, platinum Pt is used as the precious metal catalyst. As the active oxygen release agent, use is made of at least one of an alkali metal such as potassium K, sodium Na, lithium Li, cesium Cs, and rubidium Rb, an alkali earth metal such as barium Ba, calcium Ca, and strontium Sr, a rare earth such as lanthanum La, yttrium Y, and cesium Ce, and a transition metal.

Note that in this case, as the active oxygen release agent, use is preferably made of an alkali metal or an alkali earth metal with a higher tendency of ionization than calcium Ca, that is, potassium K, lithium Li, cesium Cs, rubidium Rb, barium Ba, and strontium Sr.

Next, the action of removal of the particulate in the exhaust gas by the particulate filter 22 will be explained taking as an example the case of carrying platinum Pt and potassium K on a carrier, but the same type of action for removal of particulate is performed even when using another precious metal, alkali metal, alkali earth metal, rare earth, and transition metal.

In a compression ignition type internal combustion engine such as shown in FIG. 1, combustion occurs even under an excess of air. Therefore, the exhaust gas contains a large amount of excess air. That is, if the ratio of the air and fuel fed into the intake passage, combustion chamber 5, and exhaust passage is called the air-fuel ratio of the exhaust gas, then in a compression ignition type internal combustion engine such as shown in FIG. 1, the air-fuel ratio of the exhaust gas becomes lean. Further, in the combustion chamber 5, NO is generated, so the exhaust gas contains NO. Further, the fuel contains sulfur S. This sulfur S reacts with the oxygen in the combustion chamber 5 to become $SO_2$. Therefore, the fuel contains $SO_2$. Accordingly, exhaust gas containing excess oxygen, NO, and $SO_2$ flows into the exhaust gas inflow passages 50 of the particulate filter 22.

Figure 4A:
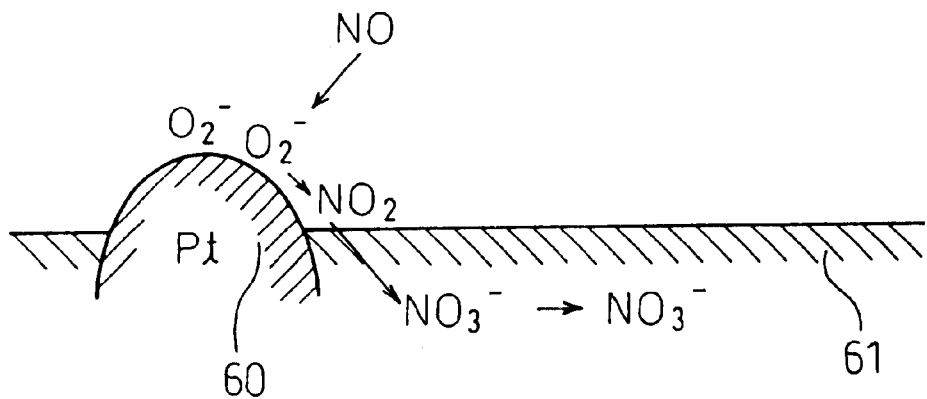
FIGS. 4A and 4B are views for explaining an action of oxidation of particulate.
Figure 4B:
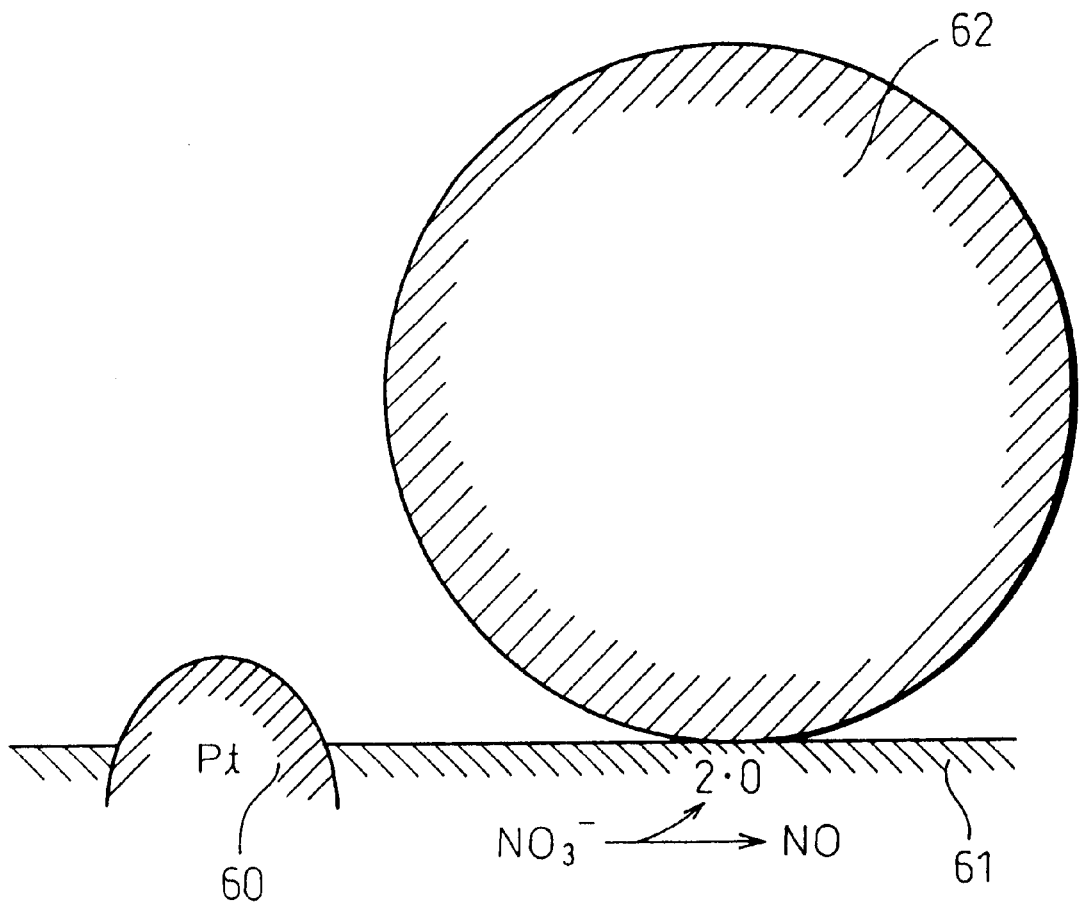

FIGS. 4A and 4B are enlarged views of the surface of the carrier layer formed on the inner circumferential surfaces of the exhaust gas inflow passages 50 and the inside walls of the fine holes in the partitions 54. Note that in FIGS. 4A and 4B, 60 indicates particles of platinum Pt, while 61 indicates the active oxygen release agent containing potassium K.

In this way, since a large amount of excess oxygen is contained in the exhaust gas, if the exhaust gas flows into the exhaust gas inflow passages 50 of the particulate filter 22, as shown in FIG. 4A, the oxygen $O_2$ adheres to the surface of the platinum Pt in the form of $O_2^-$ or $O^{2-}$. On the other hand, the NO in the exhaust gas reacts with the $O_2^-$ or $O^{2-}$ on the surface of the platinum Pt to become $NO_2$ ($2NO+O_2 \rightarrow 2NO_2$). Next, part of the $NO_2$ which is produced is absorbed in the active oxygen release agent 61 while being oxidized on the platinum Pt and diffuses in the active oxygen release agent 61 in the form of nitrate ions $NO_3^-$ as shown in FIG. 4A. Part of the nitrate ions $NO_3^-$ produces potassium nitrate $KNO_3$.

On the other hand, as explained above, the exhaust gas also contains $SO_2$. This $SO_2$ is absorbed in the active oxygen release agent 61 by a mechanism similar to that of NO. That is, in the above way, the oxygen $O_2$ adheres to the surface of the platinum Pt in the form of $O_2^-$ or $O^{2-}$. The $SO_2$ in the exhaust gas reacts with the $O_2^-$ or $O^{2-}$ on the surface of the platinum Pt to become $SO_3$. Next, part of the $SO_3$ which is produced is absorbed in the active oxygen release agent 61 while being oxidized on the platinum Pt and diffuses in the active oxygen release agent 61 in the form of sulfate ions $SO_4^-$ while bonding with the potassium Pt to produce potassium sulfate $K_2SO_4$. In this way, potassium sulfate $KNO_3$ and potassium sulfate $K_2SO_4$ are produced in the active oxygen release agent 61.

On the other hand, particulate comprised of mainly carbon is produced in the combustion chamber 5. Therefore, the exhaust gas contains this particulate. The particulate contained in the exhaust gas contacts and adheres to the surface of the carrier layer, for example, the surface of the active oxygen release agent 61, as shown in FIG. 4B when the exhaust gas is flowing through the exhaust gas inflow passages 50 of the particulate filter 22 or when heading from the exhaust gas inflow passages 50 to the exhaust gas outflow passages 51.

If the particulate 62 adheres to the surface of the active oxygen release agent 61 in this way, the concentration of oxygen at the contact surface of the particulate 62 and the active oxygen release agent 61 falls. If the concentration of oxygen falls, a difference in concentration occurs with the inside of the high oxygen concentration active oxygen release agent 61 and therefore the oxygen in the active oxygen release agent 61 moves toward the contact surface between the particulate 62 and the active oxygen release agent 61. As a result, the potassium sulfate $KNO_3$ formed in the active oxygen release agent 61 is broken down into potassium K, oxygen O, and NO. The oxygen O heads toward the contact surface between the particulate 62 and the active oxygen release agent 61, while the NO is released from the active oxygen release agent 61 to the outside. The NO released to the outside is oxidized on the downstream side platinum Pt and is again absorbed in the active oxygen release agent 61.

On the other hand, if the temperature of the particulate filter 22 is high at this time, the potassium sulfate $K_2SO_4$ formed in the active oxygen release agent 61 is also broken down into potassium K, oxygen O, and $SO_2$. The oxygen O heads toward the contact surface between the particulate 62 and the active oxygen release agent 61, while the $SO_2$ is released from the active oxygen release agent 61 to the outside. The $SO_2$ released to the outside is oxidized on the downstream side platinum Pt and again absorbed in the active oxygen release agent 61.

On the other hand, the oxygen O heading toward the contact surface between the particulate 62 and the active oxygen release agent 61 is the oxygen broken down from compounds such as potassium sulfate $KNO_3$ or potassium sulfate $K_2SO_4$. The oxygen O broken down from these compounds has a high energy and has an extremely high activity. Therefore, the oxygen heading toward the contact surface between the particulate 62 and the active oxygen release agent 61 becomes active oxygen O. If this active oxygen O contacts the particulate 62, the oxidation action of the particulate 62 is promoted and the particulate 62 is oxidized without emitting a luminous flame for a short period of several minutes to several tens of minutes. While the particulate 62 is being oxidized in this way, other particulate is successively depositing on the particulate filter 22. Therefore, in practice, a certain amount of particulate is always depositing on the particulate filter 22. Part of this depositing particulate is removed by oxidation. In this way, the particulate 62 deposited on the particulate filter 22 is continuously burned without emitting luminous flame.

Note that the $NO_x$ is considered to diffuse in the active oxygen release agent 61 in the form of nitrate ions $NO_3^-$ while repeatedly bonding with and separating from the oxygen atoms. Active oxygen is produced during this time as well. The particulate 62 is also oxidized by this active oxygen. Further, the particulate 62 deposited on the particulate filter 22 is oxidized by the active oxygen O, but the particulate 62 is also oxidized by the oxygen in the exhaust gas.

when the particulate deposited in layers on the particulate filter 22 is burned, the particulate filter 22 becomes red hot and burns along with a flame. This burning along with a flame does not continue unless the temperature is high. Therefore, to continue burning along with such flame, the temperature of the particulate filter 22 must be maintained at a high temperature.

As opposed to this, in the present invention, the particulate 62 is oxidized without emitting a luminous flame as explained above. At this time, the surface of the particulate filter 22 does not become red hot. That is, in other words, in the present invention, the particulate 62 is removed by oxidation by a considerably low temperature. Accordingly, the action of removal of the particulate 62 by oxidation without emitting a luminous flame according to the present invention is completely different from the action of removal of particulate by burning accompanied with a flame.

The platinum Pt and the active oxygen release agent 61 become more active the higher the temperature of the particulate filter 22, so the amount of the active oxygen O able to be released by the active oxygen release agent 61 per unit time increases the higher the temperature of the particulate filter 22. Further, only naturally, the particulate is more easily removed by oxidation the higher the temperature of the particulate itself. Therefore, the amount of the particulate removable by oxidation per unit time without emitting a luminous flame on the particulate filter 22 increases the higher the temperature of the particulate filter 22.

The solid line in FIG. 6 shows the amount G of the particulate removable by oxidation per unit time without emitting a luminous flame. The abscissa of FIG. 6 shows the temperature TF of the particulate filter 22. Note that FIG. 6 shows the amount G of particulate removable by oxidation in the case where the unit time is 1 second, that is, per second, but 1 minute, 10 minutes, or any other time may also be employed as the unit time. For example, when using 10 minutes as the unit time, the amount G of particulate removable by oxidation per unit time expresses the amount G of particulate removable by oxidation per 10 minutes. In this case as well, the amount G of particulate removable by oxidation per unit time without emitting a luminous flame on the particulate filter 22, as shown in FIG. 6, increases the higher the temperature of the particulate filter 22.

Now, if the amount of the particulate discharged from the combustion chamber 5 per unit time is called the amount M of discharged particulate, when the amount M of discharged particulate is smaller than the amount G of particulate removable by oxidation for the same unit time or when the amount M of discharged particulate per 10 minutes is smaller than the amount G of particulate removable by oxidation per 10 minutes, that is, in the region I of FIG. 6, all of the particulate discharged from the combustion chamber 5 is removed by oxidation successively in a short time without emitting a luminous flame on the particulate filter 22.

Figure 5A:
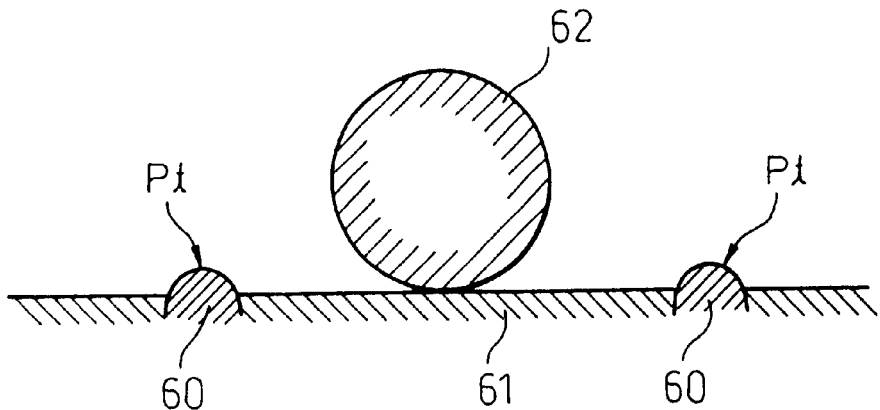
FIGS. 5A to 5C are views for explaining an action of deposition of particulate.
Figure 5B:
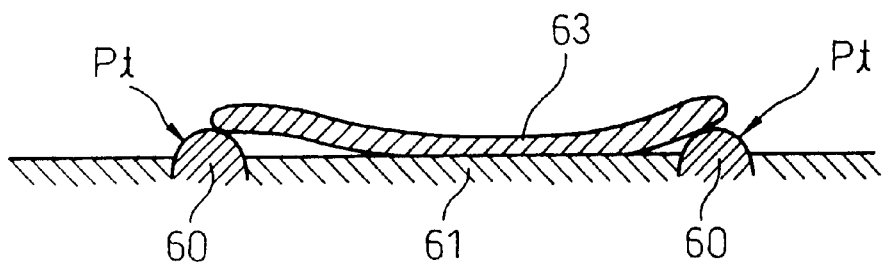
Figure 5C:
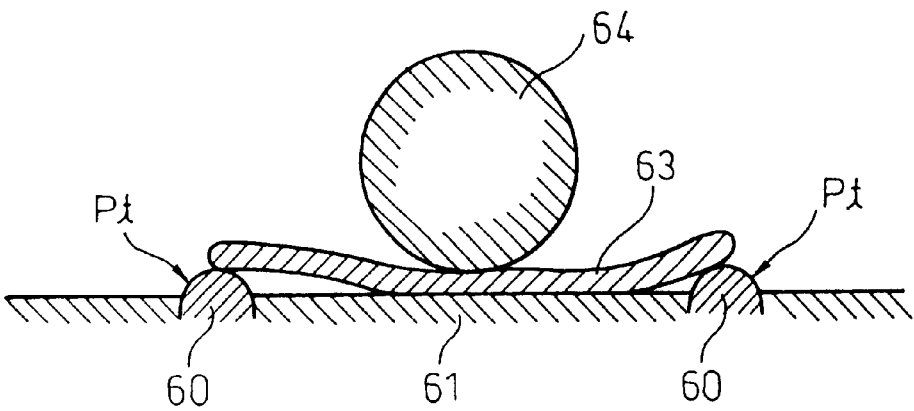

As opposed to this, when the amount M of discharged particulate is larger than the amount G of particulate removable by oxidation, that is, in the region II of FIG. 6, the amount of active oxygen is not sufficient for successive oxidation of all of the particulate. FIGS. 5A to 5C show the state of oxidation of particulate in this case.

That is, when the amount of active oxygen is not sufficient for successive oxidation of all of the particulate, if particulate 62 adheres on the active oxygen release agent 61 as shown in FIG. 5A, only part of the particulate 62 is oxidized. The portion of the particulate not sufficiently oxidized remains on the carrier layer. Next, if the state of insufficient amount of active oxygen continues, the portions of the particulate not oxidized successively are left on the carrier layer. As a result, as shown in FIG. 5B, the surface of the carrier layer is covered by the residual particulate portion 63.

This residual particulate portion 63 covering the surface of the carrier layer gradually changes to hard-to-oxidize graphite and therefore the residual particulate portion 63 easily remains as it is. Further, if the surface of the carrier layer is covered by the residual particulate portion 63, the action of oxidation of the NO and $SO_2$ by the platinum Pt and the action of release of the active oxygen from the active oxygen release agent 61 are suppressed. As a result, as shown in FIG. 5C, other particulate 64 successively deposits on the residual particulate portion 63. That is, the particulate deposits in layers. If the particulate deposits in layers in this way, the particulate is separated in distance from the platinum Pt or the active oxygen release agent 61, so even if easily oxidizable particulate, it will not be oxidized by active oxygen O. Therefore, other particulate successively deposits on the particulate 64. That is, if the state of the amount M of discharged particulate being larger than the amount G of particulate removable by oxidation continues, particulate deposits in layers on the particulate filter 22 and therefore unless the temperature of the exhaust gas is made higher or the temperature of the particulate filter 22 is made higher, it is no longer possible to cause the deposited particulate to ignite and burn.

In this way, in the region I of FIG. 6, the particulate is burned in a short time without emitting a luminous flame on the particulate filter 22. In the region II of FIG. 6, the particulate deposits in layers on the particulate filter 22. Therefore, to prevent the particulate from depositing in layers on the particulate filter 22, the amount M of discharged particulate has to be kept smaller than the amount G of the particulate removable by oxidation at all times.

As will be understood from FIG. 6, with the particulate filter 22 used in this embodiment of the present invention, the particulate can be oxidized even if the temperature TF of the particulate filter 22 is considerably low. Therefore, in a compression ignition type internal combustion engine shown in FIG. 1, it is possible to maintain the amount M of the discharged particulate and the temperature TF of the particulate filter 22 so that the amount M of discharged particulate normally becomes smaller than the amount G of the particulate removable by oxidation. Therefore, in this embodiment of the present invention, the amount M of discharged particulate and the temperature TF of the particulate filter 22 are maintained so that the amount M of discharged particulate usually becomes smaller than the amount G of the particulate removable by oxidation.

If the amount M of discharged particulate is maintained to be usually smaller than the amount G of particulate removable by oxidation in this way, the particulate no longer deposits in layers on the particulate filter 22. As a result, the pressure loss of the flow of exhaust gas in the particulate filter 22 is maintained at a substantially constant minimum pressure loss to the extent of being able to be said to not change much at all. Therefore, it is possible to maintain the drop in output of the engine at a minimum.

Further, the action of removal of particulate by oxidation of the particulate takes place even at a considerably low temperature. Therefore, the temperature of the particulate filter 22 does not rise that much at all and consequently there is almost no risk of deterioration of the particulate filter 22. Further, since the particulate does not deposit in layers on the particulate filter 22, there is no danger of coagulation of ash and therefore there is less danger of the particulate filter 22 clogging.

This clogging however occurs mainly due to the calcium sulfate $CaSO_4$. That is, fuel or lubrication oil contains calcium Ca. Therefore, the exhaust gas contains calcium Ca. This calcium Ca produces calcium sulfate $CaSO_4$ in the presence of $SO_3$. This calcium sulfate $CaSO_4$ is a solid and will not break down by heat even at a high temperature. Therefore, if calcium sulfate $CaSO_4$ is produced and the fine holes of the particulate filter 22 are clogged by this calcium sulfate $CaSO_4$, clogging occurs.

In this case, however, if an alkali metal or an alkali earth metal having a higher tendency toward ionization than calcium Ca, for example potassium K, is used as the active oxygen release agent 61, the $SO_3$ diffused in the active oxygen release agent 61 bonds with the potassium K to form potassium sulfate $K_2SO_4$. The calcium Ca passes through the partitions 54 of the particulate filter 22 and flows out into the exhaust gas outflow passage 51 without bonding with the $SO_3$. Therefore, there is no longer any clogging of fine holes of the particulate filter 22. Accordingly, as described above, it is preferable to use an alkali metal or an alkali earth metal having a higher tendency toward ionization than calcium Ca, that is, potassium K, lithium Li, cesium Cs, rubidium Rb, barium Ba, and strontium Sr, as the active oxygen release agent 61.

Now, in this embodiment of the present invention, the intention is basically to maintain the amount M of the discharged particulate smaller than the amount G of the particulate removable by oxidation in all operating states. In practice, however, it is almost impossible to keep the amount M of discharged particulate lower than the amount G of the particulate removable by oxidation in all operating states. For example, at the time of engine startup, the temperature of the particulate filter 22 is normally low. Therefore, at this time, the amount M of discharged particulate becomes larger than the amount G of the particulate removable by oxidation. Therefore, in this embodiment of the present invention, the amount M of discharged particulate is made to become smaller than the amount G of the particulate removable by oxidation normally continuously except for special cases such as right after engine startup.

Note that if the amount M of discharged particulate becomes larger than the amount G of the particulate removable by oxidation such as immediately after engine startup, the portion of the particulate which could not be oxidized on the particulate filter 22 starts to be left. If the amount M of discharged particulate becomes smaller than the amount G of the particulate removable by oxidation when this portion of the particulate which could not be oxidized in this way starts to be left, that is, when the particulate only deposits less than a certain limit, the portion of the residual particulate is removed by oxidation by the active oxygen O without emitting a luminous flame. Therefore, in this embodiment of the present invention, at the time of a special operating state such as immediately after engine startup, the amount M of discharged particulate and the temperature TF of the particulate filter 22 are maintained so that only an amount of particulate less than a certain limit which can be removed by oxidation when the amount M of discharged particulate becomes smaller than the amount G of the particulate removable by oxidation deposits on the particulate filter 22.

Further, there are sometimes cases where the particulate deposits in layers on the particulate filter 22 due to some reason or another even if the amount M of discharged particulate and the temperature TF of the particulate filter 22 are maintained in this way. Even in this case, if the air-fuel ratio of part or all of the exhaust gas is made temporarily rich, the particulate deposited on the particulate filter 22 is oxidized without emitting a luminous flame. That is, if the air-fuel ratio of the exhaust gas is made rich, that is, if the concentration of oxygen in the exhaust gas is lowered, the active oxygen O is released all at once to the outside from the active oxygen release agent 61. The particulate deposited by the active oxygen O released all at once is removed by oxidation in a short time without emitting a luminous flame.

On the other hand, if the air-fuel ratio is maintained lean, the surface of the platinum Pt is covered by oxygen and so-called oxygen toxification of the platinum Pt occurs. If such oxygen toxification occurs, the action of oxidation of the $NO_x$ falls, so the efficiency of $NO_x$ absorption falls and therefore the amount of release of active oxygen from the active oxygen release agent 61 falls. If the air-fuel ratio is made rich, however, the oxygen on the surface of the platinum Pt is consumed, so the oxygen toxification is eliminated. Therefore, if the air-fuel ratio is changed from rich to lean, the action of oxidation of the $NO_x$ becomes stronger, so the efficiency of $NO_x$ absorption becomes higher and therefore the amount of release of active oxygen from the active oxygen release agent 61 increases.

Therefore, if the air-fuel ratio is sometimes switched from lean to rich when the air-fuel ratio is maintained lean, the oxygen toxification of the platinum Pt is eliminated each time. Therefore the amount of release of active oxygen increases when the air-fuel ratio is lean and therefore the action of oxidation of the particulate on the particulate filter 22 can be promoted.

Now, in FIG. 6, the amount G of the particulate removable by oxidation is shown as a function of only the temperature TF of the particulate filter 22, but the amount G of the particulate removable by oxidation is actually a function of the concentration of oxygen in the exhaust gas, the concentration of $N_x$ in the exhaust gas, the concentration of unburned hydrocarbons in the exhaust gas, the degree of ease of oxidation of the particulate, the spatial velocity of the flow of exhaust gas in the particulate filter 22, the pressure of the exhaust gas, etc. Therefore, the amount G of the particulate removable by oxidation is preferably calculated taking into consideration the effects of all of the above factors including the temperature TF of the particulate filter 22.

Figure 7A:
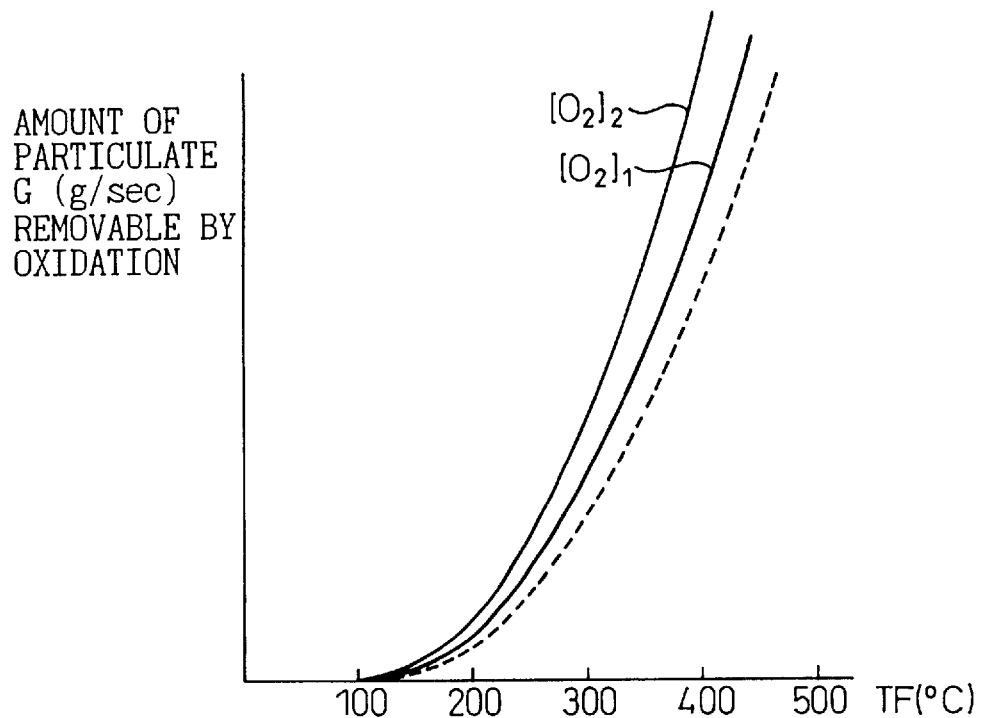
FIGS. 7A and 7B are views of an amount of particulate removable by oxidation.
Figure 7B:
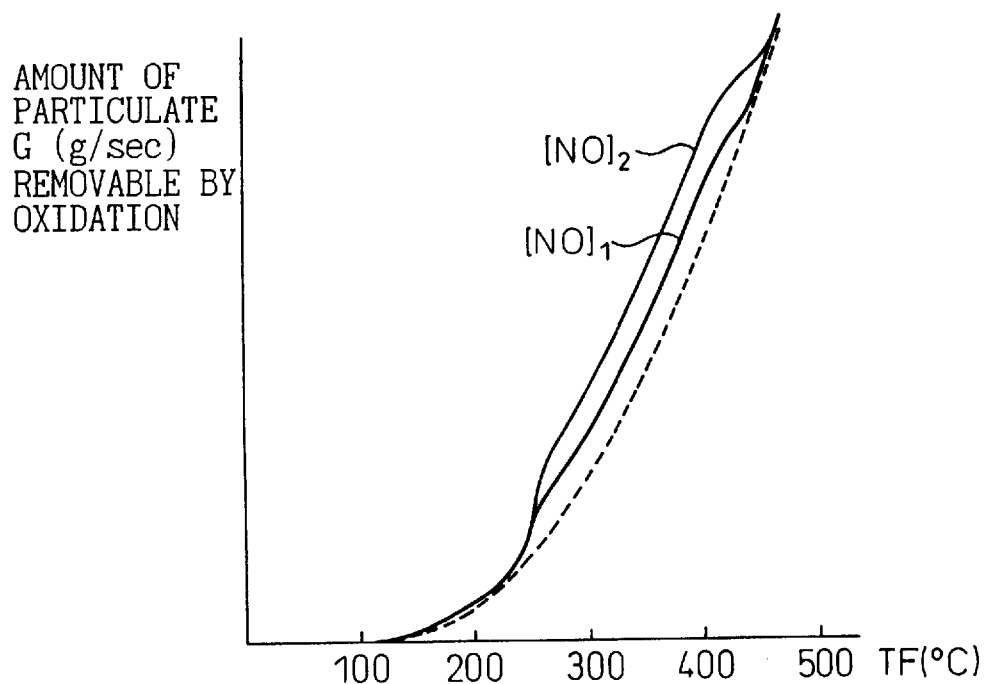
Figure 8A:
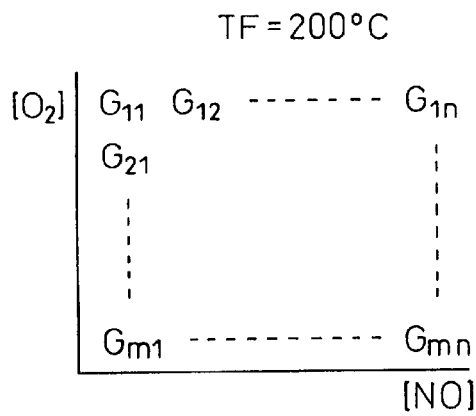
FIGS. 8A to 8F are views of maps of the amount G of particulate removable by oxidation.
Figure 8B:
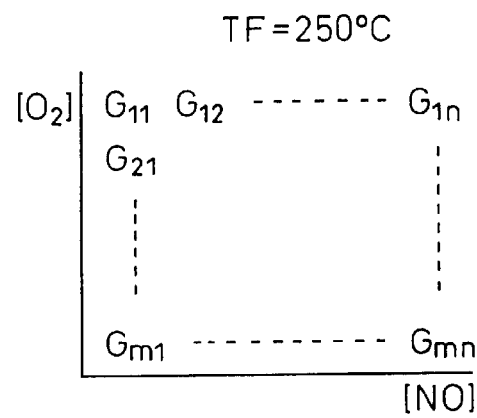
Figure 8C:
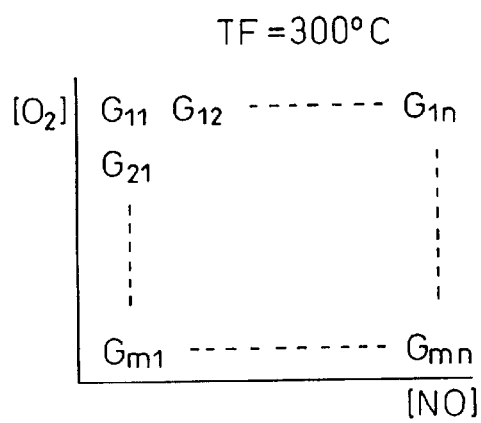
Figure 8D:
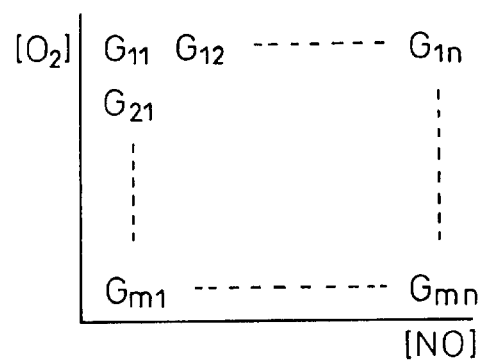
Figure 8E:
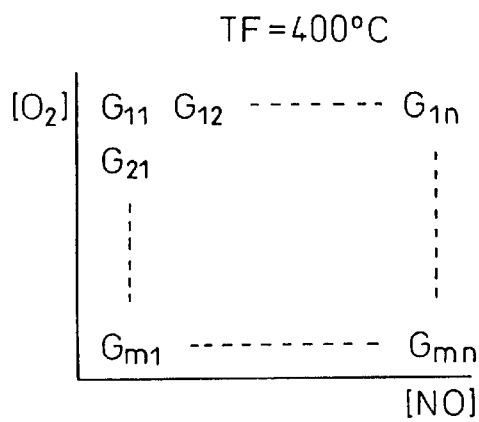
Figure 8F:
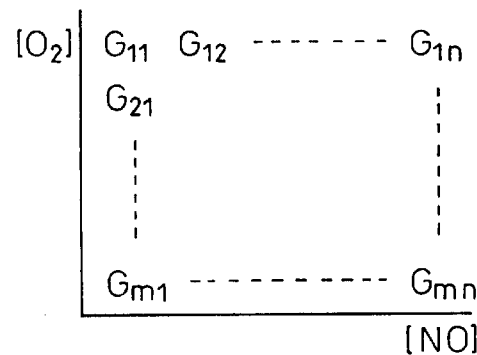

The factor having the greatest effect on the amount G of the particulate removable by oxidation among these however is the temperature TF of the particulate filter 22. Factors having relatively large effects are the concentration of oxygen in the exhaust gas and the concentration of $NO_x$. FIG. 7A shows the change of the amount G of the particulate removable by oxidation when the temperature TF of the particulate filter 22 and the concentration of oxygen in the exhaust gas change. FIG. 7B shows the change of the amount G of the particulate removable by oxidation when the temperature TF of the particulate filter 22 and the concentration of $NO_x$ in the exhaust gas change. Note that in FIGS. 7A and 7B, the broken lines show the cases when the concentration of oxygen and the concentration of $NO_x$ in the exhaust gas are the reference values. In FIG. 7A, $[O_2]_1$ shows the case when the concentration of oxygen in the exhaust gas is higher than the reference value, while $[O_2]_2$ shows the case where the concentration of oxygen is further higher than $[O_2]_1$. In FIG. 7B, $[NO]_1$ shows the case when the concentration of $NO_x$ in the exhaust gas is higher than the reference value, while $[NO]_2$ shows the case where the concentration of $NO_x$ is further higher than $[NO]_1$.

If the concentration of oxygen in the exhaust gas becomes high, the amount G of the particulate removable by oxidation increases even by just that. Since the amount of oxygen absorbed into the active oxygen release agent 61 further increases, however, the active oxygen released from the active oxygen release agent 61 also increases. Therefore, as shown in FIG. 7A, the higher the concentration of oxygen in the exhaust gas, the more the amount G of the particulate removable by oxidation increases.

On the other hand, the NO in the exhaust gas, as explained earlier, is oxidized on the surface of the platinum Pt and becomes $NO_2$. Part of the thus produced $NO_2$ is absorbed in the active oxygen release agent 61, while the remaining $NO_2$ disassociates to the outside from the surface of the platinum Pt. At this time, if the platinum Pt contacts the $NO_2$, an oxidation reaction will be promoted. Therefore, as shown in FIG. 7B, the higher the concentration of $NO_x$ in the exhaust gas, the more the amount G of the particulate removable by oxidation increases. However, the action of promoting the oxidation of the particulate by the $NO_2$ only occurs while the temperature of the exhaust gas is from about 250° C. to about 450° C., so, as shown in FIG. 7B, if the concentration of $NO_x$ in the exhaust gas becomes higher, the amount G of the particulate removable by oxidation increases while the temperature TF of the particulate filter 22 is from about 250° C. to 450° C.

As explained above, it is preferable to calculate the amount G of the particulate removable by oxidation taking into consideration all of the factors having an effect on the amount G of the particulate removable by oxidation. In this embodiment of the present invention, however, the amount G of the particulate removable by oxidation is calculated based on only the temperature TF of the particulate filter 22 having the largest effect on the amount G of the particulate removable by oxidation among the factors and the concentration of oxygen and the concentration of $NO_x$ in the exhaust gas having relatively large effects.

That is, in this embodiment of the present invention, as shown in FIGS. 8A to 8F, the amounts G of particulates removable by oxidation at various temperatures TF (200° C., 250° C., 300° C., 350° C., 400° C., and 450° C.) are stored in advance in the ROM 32 in the form of a map as a function of the concentration of oxygen [$O_2$] in the exhaust gas and the concentration of $NO_x$ [NO] in the exhaust gas. The amount G of the particulate removable by oxidation in accordance with the temperature TF of the particulate filter 22, the concentration of oxygen [$O_2$], and the concentration of $NO_x$ [NO] is calculated by proportional distribution from the maps shown from FIGS. 8A to 8F.

Figure 9A:
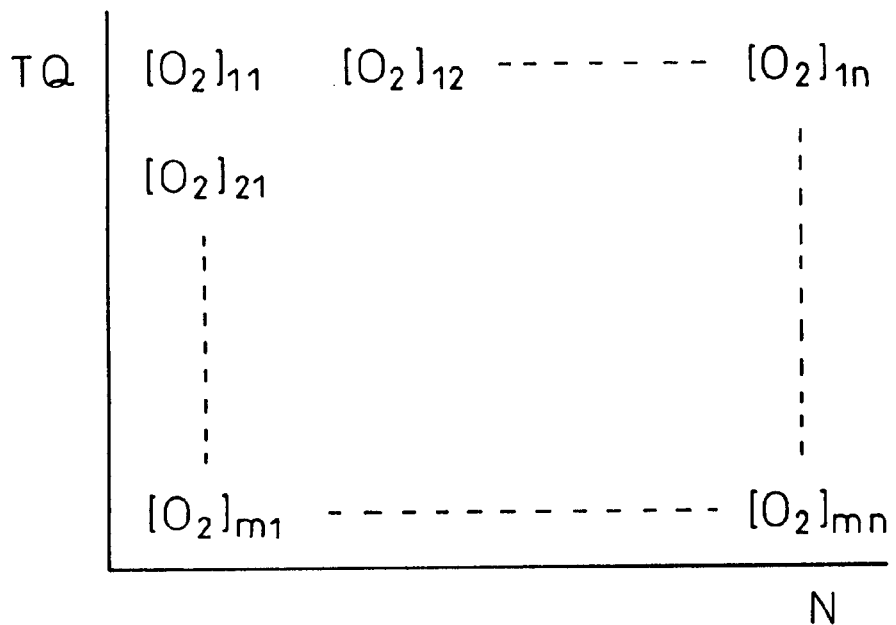
FIGS. 9A and 9B are views of maps of the concentration of oxygen and the concentration of $NO_x$ in the exhaust gas.
Figure 9B:
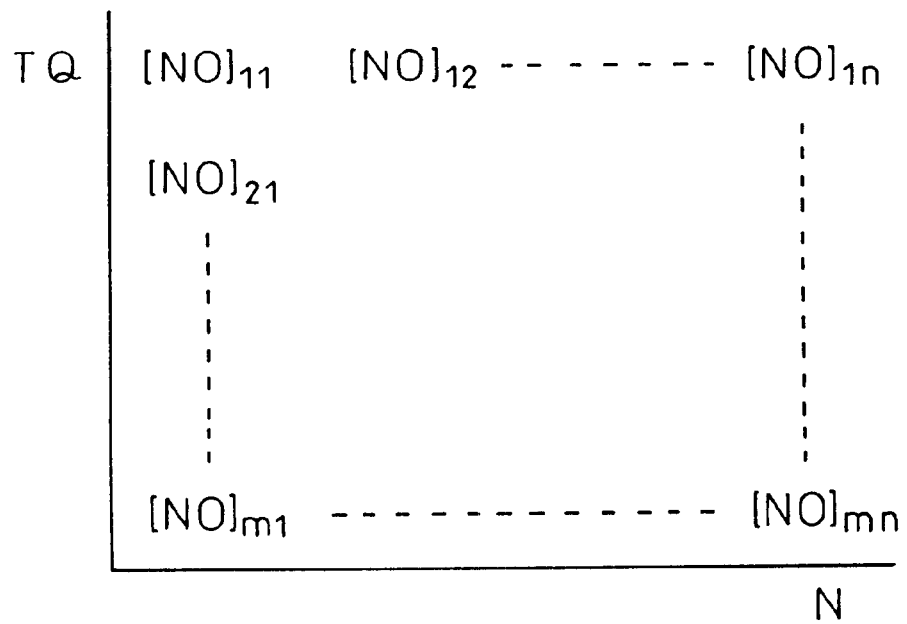

Note that the concentration of oxygen [$O_2$] and the concentration of $NO_x$ [NO] in the exhaust gas can be detected using an oxygen concentration sensor and a $NO_x$ concentration sensor. In this embodiment of the present invention, however, the concentration of oxygen [$O_2$] in the exhaust gas is stored in advance in the ROM 32 in the form of a map as shown in FIG. 9A as a function of the required torque TQ and engine speed N. The concentration of $NO_x$ [NO] in the exhaust gas is stored in advance in the ROM 32 in the form of a map as shown in FIG. 9B as a function of the required torque TQ and the engine speed N. The concentration of oxygen [$O_2$] and concentration of $NO_x$ [NO] in the exhaust gas are calculated from these maps.

Figure 10A:
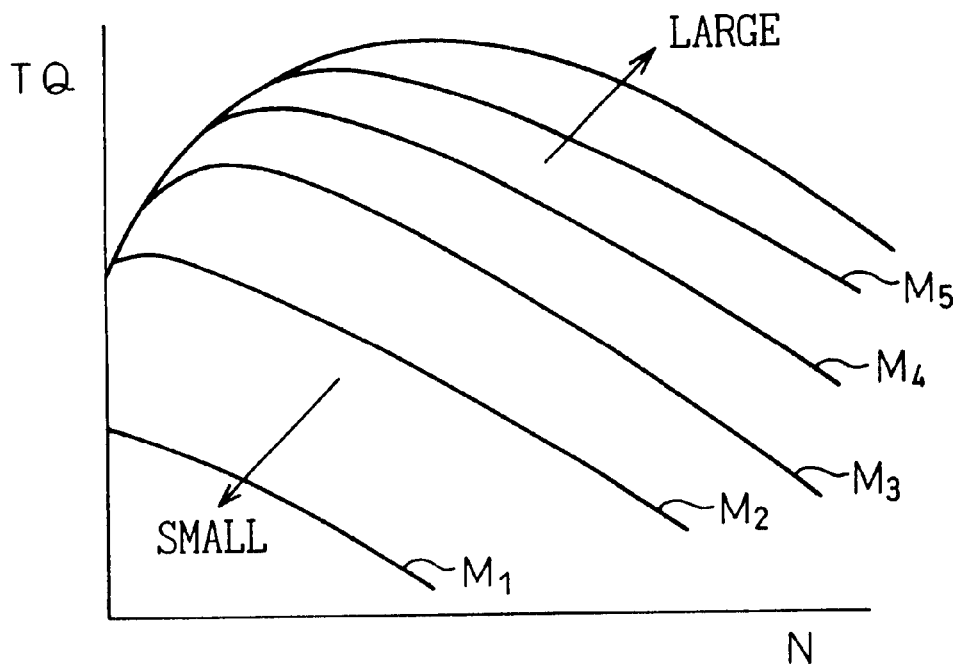
FIGS. 10A and 10B are views of the amount of discharged particulate.

On the other hand, the amount G of the particulate removable by oxidation changes according to the type of the engine, but once the type of the engine is determined, becomes a function of the required torque TQ and the engine speed N. FIG. 10A shows the amount M of discharged particulate of the internal combustion engine shown in FIG. 1. The curves $M_1$, $M_2$, $M_3$, $M_4$, and $M_5$ show the amounts of equivalent discharged particulate ($M_1<M_2<M_3<M_4<M_5$).

Figure 10B:
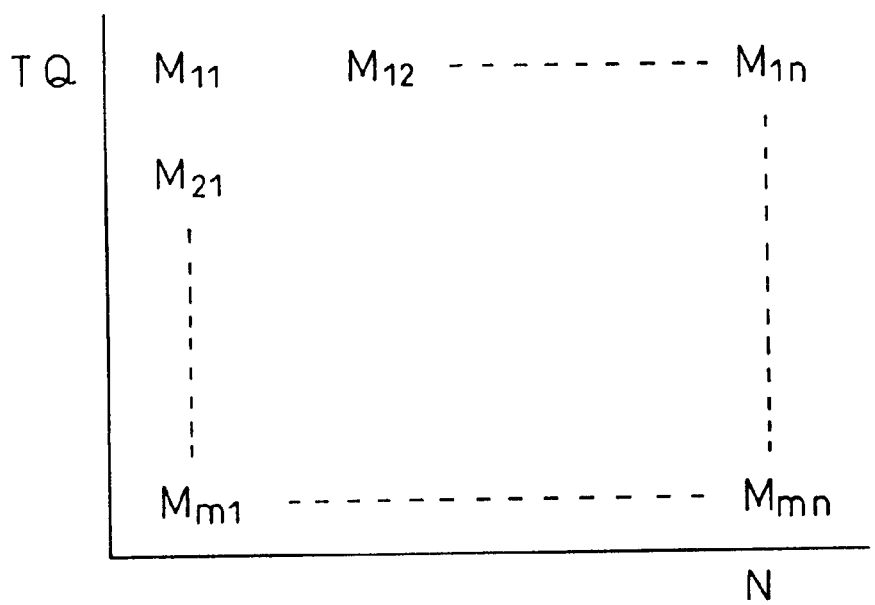

In the example shown in FIG. 10A, the higher the required torque TQ, the more the amount M of discharged particulate increases. Note that the amount M of discharged particulate shown in FIG. 10A is stored in advance in the ROM 32 in the form of a map shown in FIG. 10B as a function of the required torque TQ and the engine speed N.

Now, in the embodiment according to the present invention, as explained above, a layer of a carrier comprised of aluminum is for example formed on the two side surfaces of the partitions 54 of the particulate filter 22 and the inside walls of the fine holes in the partitions 54. A precious metal catalyst and active oxygen release agent are carried on this carrier. Further, in this embodiment of the present invention, the carrier carries a precious metal catalyst and an $NO_x$ absorbent which absorbs the $NO_x$ contained in the exhaust gas when the air-fuel ratio of the exhaust gas flowing into the particulate filter 22 is lean and releases the absorbed $NO_x$ when the air-fuel ratio of the exhaust gas flowing into the particulate filter 22 becomes the stoichiometric air-fuel ratio or rich.

In this embodiment according to the present invention, platinum Pt is used as the precious metal catalyst. As the $NO_x$ absorbent, use is made of at least one of an alkali metal such as potassium K, sodium Na, lithium Li, cesium Cs, and rubidium Rb, an alkali earth metal such as barium Ba, calcium Ca, and strontium Sr, and a rare earth such as lanthanum La and yttrium Y. Note that as will be understood by a comparison with the metal comprising the above active oxygen release agent, the metal comprising the $NO_x$ absorbent and the metal comprising the active oxygen release agent match in large part.

In this case, it is possible to use different metals or to use the same metal as the $NO_x$ absorbent and the active oxygen release agent. When using the same metal as the $NO_x$ absorbent and the active oxygen release agent, the function as a $NO_x$ absorbent and the function of an active oxygen release agent are simultaneously exhibited.

Next, an explanation will be given of the action of absorption and release of $NO_x$ taking as an example the case of use of platinum Pt as the precious metal catalyst and use of potassium K as the $NO_x$ absorbent.

First, considering the action of absorption of $NO_x$, the $NO_x$ is absorbed in the $NO_x$ absorbent by the same mechanism as the mechanism shown in FIG. 4A. However, in this case, in FIG. 4A, reference numeral 61 indicates the $NO_x$ absorbent.

When the air-fuel ratio of the exhaust gas flowing into the particulate filter 22 is lean, since a large amount of excess oxygen is contained in the exhaust gas, if the exhaust gas flows into the exhaust gas inflow passages 50 of the particulate filter 22, as shown in FIG. 4A, the oxygen $O_2$ adheres to the surface of the platinum Pt in the form of $O_2^-$ or $O_2^{2-}$. On the other hand, the NO in the exhaust gas reacts with the $O_2^-$ or $O_2^{2-}$ on the surface of the platinum Pt to become $NO_2$ ($2NO+O_2 \rightarrow 2NO_2$). Next, part of the $NO_2$ which is produced is absorbed in the $NO_x$ absorbent 61 while being oxidized on the platinum Pt and diffuses in the $NO_x$ absorbent 61 in the form of nitrate ions $NO_3^-$ as shown in FIG. 4A while bonding with the potassium K. Part of the nitrate ions $NO_3^-$ produces potassium nitrate $KNO_3$. In this way, NO is absorbed in the $NO_x$ absorbent 61.

On the other hand, when the exhaust gas flowing into the particulate filter 22 becomes rich, the nitrate ions $NO_3^-$ is broken down into oxygen O and NO and then NO is successively released from the $NO_x$ absorbent 61. Therefore, when the air-fuel ratio of the exhaust gas flowing into the particulate filter 22 becomes rich, the NO is released from the $NO_x$ absorbent 61 in a short time. Further, the released NO is reduced, so no NO is discharged into the atmosphere.

Note that in this case, even if the air-fuel ratio of the exhaust gas flowing into the particulate filter 22 is the stoichiometric air-fuel ratio, NO is released from the $NO_x$ absorbent 61. In this case, however, since the NO is only released gradually from the $NO_x$ absorbent 61, it takes a somewhat long time for all of the $NO_x$ absorbed in the $NO_x$ absorbent 61 to be released.

As explained above, however, it is possible to use different metals for the $NO_x$ absorbent and the active oxygen release agent. In this embodiment of the present invention, however, the same metal is used for the $NO_x$ absorbent and the active oxygen release agent. In this case, as explained earlier, the function of the $NO_x$ absorbent and the function of the active oxygen release agent are performed simultaneously. An agent which performs these two functions simultaneously will be called an active oxygen release agent/$NO_x$ absorbent from here on. Therefore, in this embodiment of the present invention, reference numeral 61 in FIG. 4A shows an active oxygen release agent/$NO_x$ absorbent.

When using such an active oxygen release agent/$NO_x$ absorbent, when the air-fuel ratio of the exhaust gas flowing into the particulate filter 22 is lean, the NO contained in the exhaust gas is absorbed in the active oxygen release agent/$NO_x$ absorbent 71. If the particulate contained in the exhaust gas adheres to the active oxygen release agent/$NO_x$ absorbent 61, the particulate is removed by oxidation in a short time by the active oxygen contained in the exhaust gas and the active oxygen released from the active oxygen release agent/$NO_x$ absorbent 61. Therefore, at this time, it is possible to prevent the discharge of both the particulate and $NO_x$ in the exhaust gas into the atmosphere.

On the other hand, when the air-fuel ratio of the exhaust gas flowing into the particulate filter 22 becomes rich, NO is released from the active oxygen release agent/$NO_x$ absorbent 61. This NO is reduced by the unburned hydrocarbons and CO and therefore no NO is discharged into the atmosphere at this time as well. Further, the particulate deposited on the particulate filter 22 is removed by oxidation by the active oxygen released from the active oxygen release agent/$NO_x$ absorbent 61.

As already explained with reference to FIG. 6, the action of release of active oxygen from the active oxygen release agent 61 is started from when the temperature of the particulate filter 22 is considerably low. The same is true even when using the active oxygen release agent/$NO_x$ absorbent 61. As opposed to this, the action of absorption of $NO_x$ in the active oxygen release agent/$NO_x$ absorbent 61 does not start unless the temperature TF of the particulate filter 22 becomes higher than the temperature of start of release of active oxygen. This is considered to be because the release of active oxygen is caused if robbing oxygen from the potassium nitrate $KNO_3$ for example, while the action of absorption of $NO_x$ is not started unless the platinum Pt is activated.

FIG. 11 shows the amount G of the particulate removable by oxidation and the $NO_x$ absorption rate when using potassium K as the active oxygen release agent/$NO_x$ absorbent 61. From FIG. 11, it is learned that the action of release of active oxygen is started when the temperature TF of the particulate filter 22 is less than 200° C., while the action of absorption of $NO_x$ is not started unless the temperature TF of the particulate filter 22 is over 200° C.

On the other hand, the action of release of active oxygen becomes more active the higher the temperature TF of the particulate filter 22. As opposed to this, the action of absorption of $NO_x$ disappears when the temperature TF of the particulate filter 22 becomes higher. That is, if the temperature TF of the particulate filter 22 exceeds a certain temperature, in the example shown in FIG. 11, about 500° C., the sulfate ions $N_3^-$ or potassium sulfate KNO3 break down under heat and NO is released from the active oxygen release agent/$NO_x$ absorbent 61. In this state, the amount of release of NO becomes greater than the amount of absorption of $NO_x$ and therefore, as shown in FIG. 11, the $NO_x$ absorption rate falls.

FIG. 11 shows the $NO_x$ absorption rate when using potassium K as the $NO_x$ absorbent or the active oxygen release agent/$NO_x$ absorbent 61. In this case, the temperature range of the particulate filter 22 where the $NO_x$ absorption rate becomes higher differs by the metal used. For example, when using barium Ba as the $NO_x$ absorbent or the active oxygen release agent/$NO_x$ absorbent 61, the temperature range of the particulate filter 22 where the $NO_x$ absorption rate becomes higher becomes narrower than the case of use of potassium K shown in FIG. 11.

As explained above, however, to enable the particulate in the exhaust gas to be removed by oxidation without depositing in layers on the particulate filter 22, it is necessary to make the amount M of discharged particulate smaller than the amount G of the particulate removable by oxidation. If just making the amount M of discharged particulate smaller than the amount G of the particulate removable by oxidation, however, the action of absorption of $NO_x$ by the $NO_x$ absorbent or the active oxygen release agent/$NO_x$ absorbent 61 does not occur. To ensure the action of absorption of $NO_x$ by the $NO_x$ absorbent or the active oxygen release agent/$NO_x$ absorbent, it is necessary to maintain the temperature TF of the particulate filter 22 within the temperature range where the action of absorption of $NO_x$ occurs. In this case, the temperature range of the particulate filter 22 where the $NO_x$ absorption action occurs has to be made a temperature range where the $NO_x$ absorption rate becomes more than a certain value, for example, more than 50 percent. Therefore, when using potassium K as the $NO_x$ absorbent or the active oxygen release agent/$NO_x$ absorbent 61, as will be understood from FIG. 11, the temperature TF of the particulate filter 22 has to be maintained between about 250° C. to 500° C.

Therefore, in this embodiment of the present invention, to remove by oxidation the particulate in the exhaust gas without it depositing in layers on the particulate filter 22 and absorb the $NO_x$ in the exhaust gas, the amount M of discharged particulate is maintained smaller than the amount G of the particulate removable by oxidation continuously and temperature TF of the particulate filter 22 is maintained in the temperature range where the $NO_x$ absorption rate of the particulate filter 22 becomes more than a certain value. That is, the amount M of discharged particulate and the temperature TF of the particulate filter 22 are kept in the simultaneous particulate and $NO_x$ treatment region shown by the hatching in FIG. 11.

Even if the amount M of discharged particulate and the temperature of the particulate filter 22 are maintained in the simultaneously particulate and $NO_x$ treatment region in this way, sometimes the amount M of discharged particulate and the temperature of the particulate filter 22 will end up outside the simultaneous particulate and $NO_x$ treatment region. In this case, in this embodiment of the present invention, at least one of the amount M of discharged particulate, amount G of the particulate removable by oxidation, and temperature TF of the particulate filter 22 is controlled so that the amount M of discharged particulate and the temperature of the particulate filter 22 become inside the simultaneous particulate and $NO_x$ treatment region. This will be explained next with reference to FIG. 12.

First, the case when the amount M of discharged particulate and the temperature of the particulate filter 22 reach the point A outside the simultaneous particulate and $NO_x$ treatment region shown in FIG. 12, that is, the amount M of discharged particulate becomes larger than the amount G of the particulate removable by oxidation and the temperature TF of the particulate filter 22 becomes lower than the lower limit temperature of the simultaneous particulate and $NO_x$ treatment region, will be explained. In this case, as shown by the arrow, by raising the temperature TF of the particulate filter 22, the amount M of discharged particulate and the temperature TF of the particulate filter 22 are returned to within the simultaneous particulate and $NO_x$ treatment region.

Next, the case where the amount M of discharged particulate and the temperature TF of the particulate filter 22 reach the point B outside the simultaneous particulate and $NO_x$ treatment region shown in FIG. 12, that is, where the amount M of discharged particulate becomes greater than the amount G of the particulate removable by oxidation and the temperature TF of the particulate filter 22 is inside the temperature range of the simultaneous particulate and $NO_x$ treatment region will be explained. In this case, as shown by the arrow, the amount M of discharged particulate is reduced to return the amount M of discharged particulate and the temperature TF of the particulate filter 22 to the simultaneous particulate and $NO_x$ treatment region.

Next, the case where the amount M of discharged particulate and the temperature TF of the particulate filter 22 reach the point C outside the simultaneous particulate and $NO_x$ treatment region shown in FIG. 12, that is, where the amount M of discharged particulate becomes larger than the amount G of the particulate removable by oxidation and the temperature TF of the particulate filter 22 becomes higher than the upper limit temperature of the simultaneous particulate and $NO_x$ treatment region, will be explained. In this case, as shown by the arrow, the amount M of discharged particulate is reduced and the temperature TF of the particulate filter 22 is reduced so as to return the amount M of discharged particulate and the temperature TF of the particulate filter 22 to the simultaneous particulate and $NO_x$ treatment region.

In this way, by reducing the amount M of discharged particulate or raising or reducing the temperature TF of the particulate filter 22 when the amount M of discharged particulate and the temperature of the particulate filter 22 become outside the simultaneous particulate and $NO_x$ treatment region, the amount M of discharged particulate and the temperature of the particulate filter 22 are returned inside the simultaneous particulate and $NO_x$ treatment region. Note that as another method, it is also possible to return the amount M of discharged particulate and the temperature of the particulate filter 22 to the inside of the simultaneous particulate and $NO_x$ treatment region by increasing the amount G of the particulate removable by oxidation. Therefore, next, an explanation will be given of the method of reducing the amount M of discharged particulate, the method of raising or lowering the temperature TF of the particulate filter 22, and the method of increasing the amount G of the particulate removable by oxidation.

One method effective for raising the temperature TF of the particulate filter 22 is the method of delaying the fuel injection timing to after the top dead center of the compression stroke. That is, normally the main fuel Qm is injected near the top dead center of the compression stroke as shown in (I) in FIG. 13. In this case, if the injection timing of the main fuel Qm is delayed as shown in (II) of FIG. 13, the after-burning time becomes longer and therefore the temperature of the exhaust gas rises. If the temperature of the exhaust gas rises, the temperature TF of the particulate filter 22 rises. In this case, if the amount of delay of the fuel injection timing is reduced, the temperature TF of the particulate filter 22 can be reduced.

Figure 13:
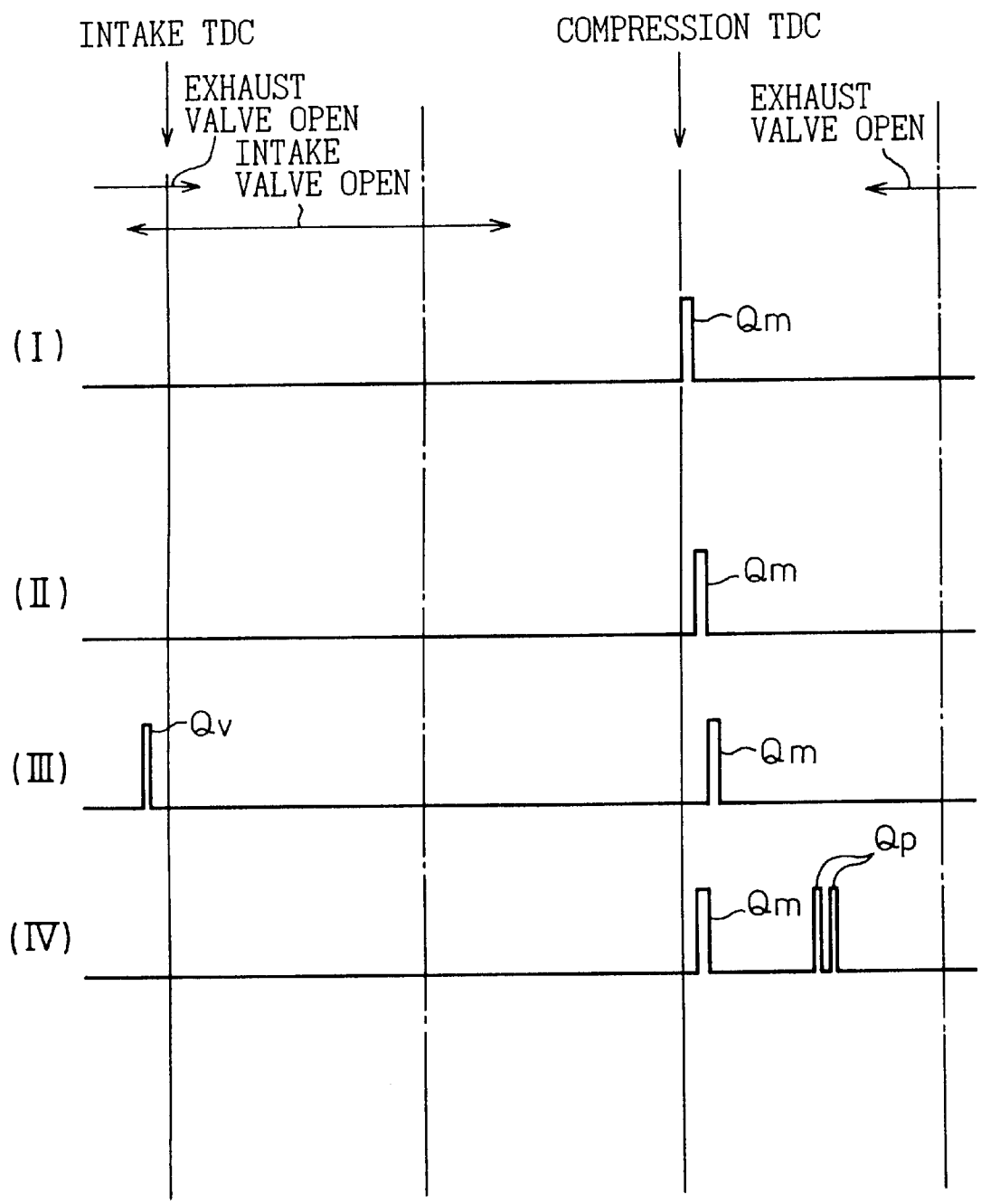
FIG. 13 is a view for explaining injection control.

Further, to raise the temperature TF of the particulate filter 22, as shown by (III) of FIG. 13, the auxiliary fuel Qv can be injected near the top dead center of the suction stroke in addition to the main fuel Qm. If the auxiliary fuel Qv is additionally injected in this way, the fuel able to be burned increases by exactly the auxiliary fuel Qv, so the temperature of the exhaust gas rises and therefore the temperature TF of the particulate filter 22 rises.

On the other hand, if the auxiliary fuel Qv is injected near top dead center of the suction stroke in this way, the heat of compression during the compression stroke will produce aldehydes, ketones, peroxides, carbon monoxide, and other intermediate products from the auxiliary fuel Qv. The reaction of the main fuel Qm is accelerated by these intermediate products. Therefore, in this case, as shown by (III) in FIG. 13, even if the injection timing of the main fuel Qm is largely delayed, no misfires will occur and good combustion will be obtained. That is, since it is possible to delay the injection timing of the main fuel Qm a large extent in this way, the temperature of the exhaust gas becomes considerably high and therefore the temperature TF of the particulate filter 22 can be quickly raised. In this case, if the injection of the auxiliary fuel Qv is stopped or the amount of injection of auxiliary fuel Qv is reduced to reduce the amount of delay of the injection timing of the main fuel Qm, the temperature TF of the particulate filter 22 can be reduced.

Further, to raise the temperature TF of the particulate filter 22, as shown by (IV) of FIG. 13, it is possible to inject the auxiliary fuel Qp during the expansion stroke or the discharge stroke in addition to the main fuel Qm. That is, in this case, the large portion of the auxiliary fuel Qp is discharged inside the exhaust passage in the form of unburned hydrocarbons without being burned. The unburned hydrocarbons are oxidized by the excess oxygen on the particulate filter 22. Due to the heat of the oxidation reaction generated at this time, the temperature TF of the particulate filter 22 is raised. In this case, if the amount of injection of the auxiliary fuel Qp is reduced, the temperature TF of the particulate filter 22 can be reduced.

Next, an explanation will be given of the method of using low temperature combustion to control the amount M of discharged particulate and the temperature TF of the particulate filter 22.

Figure 14:
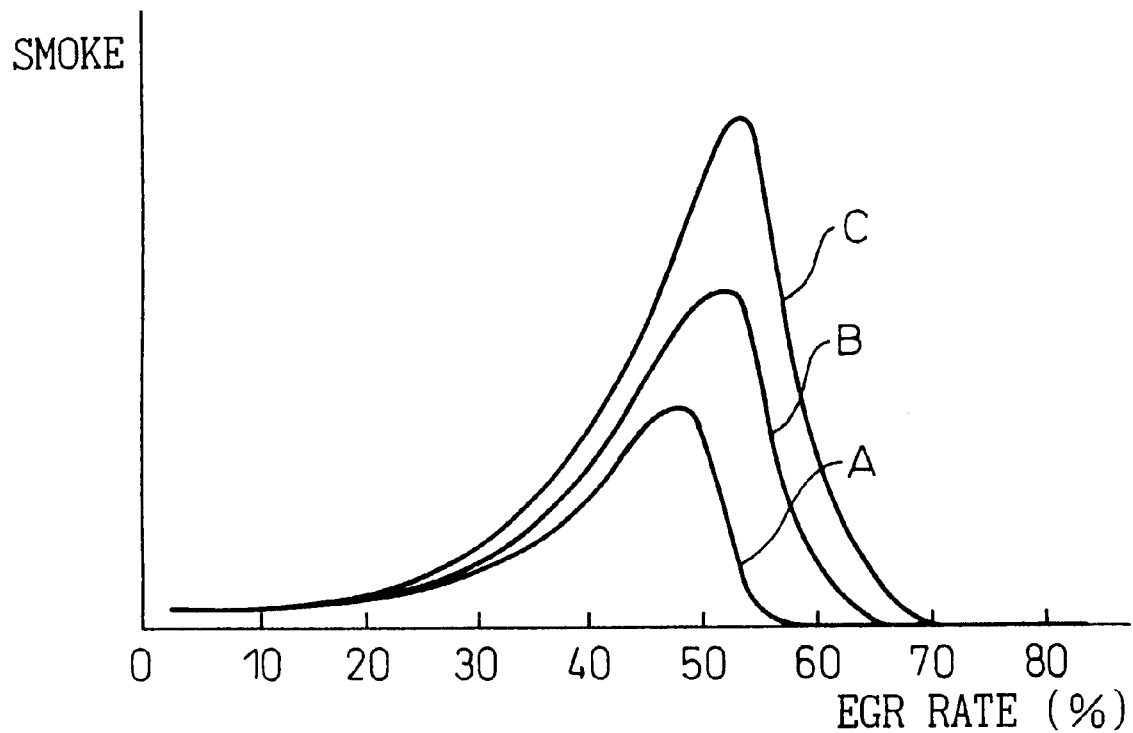
FIG. 14 is a view of the amount of generation of smoke.

In the engine shown in FIG. 1, if the EGR rate (amount of EGR gas/(amount of EGR gas+amount of intake air)) is increased, the amount of smoke generated gradually increases and peaks. If the EGR rate is further raised, the amount of generation of smoke then rapidly falls. This will be explained with reference to FIG. 14 showing the relation between the EGR rate and the smoke when changing the degree of cooling of the EGR gas. Note that in FIG. 14, the curve A shows the case of force cooling the EGR gas to maintain the temperature of the EGR gas at about 90° C., curve B shows the case of cooling the EGR gas by a small sized cooling device, and curve C shows the case of not force cooling the EGR gas.

As shown by curve A of FIG. 14, when force cooling the EGR gas, the amount of generation of smoke peaks when the EGR rate is slightly lower than 50 percent. In this case, if the EGR rate is made more than about 55 percent, almost no smoke is generated any longer. On the other hand, as shown by curve B of FIG. 14, when slightly cooling the EGR gas, the amount of generation of smoke peaks when the EGR rate becomes slightly higher than 50 percent. In this case, if the EGR rate is made more than about 65 percent, almost no smoke is generated any longer. Further, as shown by curve C in FIG. 14, when the EGR gas is not force cooled, the amount of generation of smoke peaks near an EGR rate of 55 percent. In this case, almost no smoke is generated any longer when the EGR rate is over about 70 percent.

The reason why smoke is no longer generated when the EGR gas rate is made over 55 percent is that due to the heat absorbing action of the EGR gas, the gas temperature of the fuel and its surroundings at the time of combustion does not become that high, that is, low temperature combustion is performed, and as a result the hydrocarbon does not grow into soot.

This low temperature combustion has the characteristic of enabling suppression of the generation of smoke and reduction of the amount of generation of $NO_x$ regardless of the air-fuel ratio. That is, when the air-fuel ratio is made rich, the fuel becomes excessive, but since the combustion temperature is suppressed to a low temperature, the excess fuel does not grow to soot and therefore no smoke is generated. Further, at this time, only an extremely small amount of $NO_x$ is produced. On the other hand, when the mean air-fuel ratio is lean or the air-fuel ratio is the stoichiometric air-fuel ratio, if the combustion temperature becomes high, a small amount of soot is produced, but under low temperature combustion, the combustion temperature is suppressed to low temperature, so no smoke is generated at all and only an extremely small amount of $NO_x$ is generated.

On the other hand, if low temperature combustion is performed, the gas temperature of the fuel and its surroundings becomes low, but the temperature of the exhaust gas rises. This will be explained with reference to FIGS. 15A and 15B.

Figure 15A:
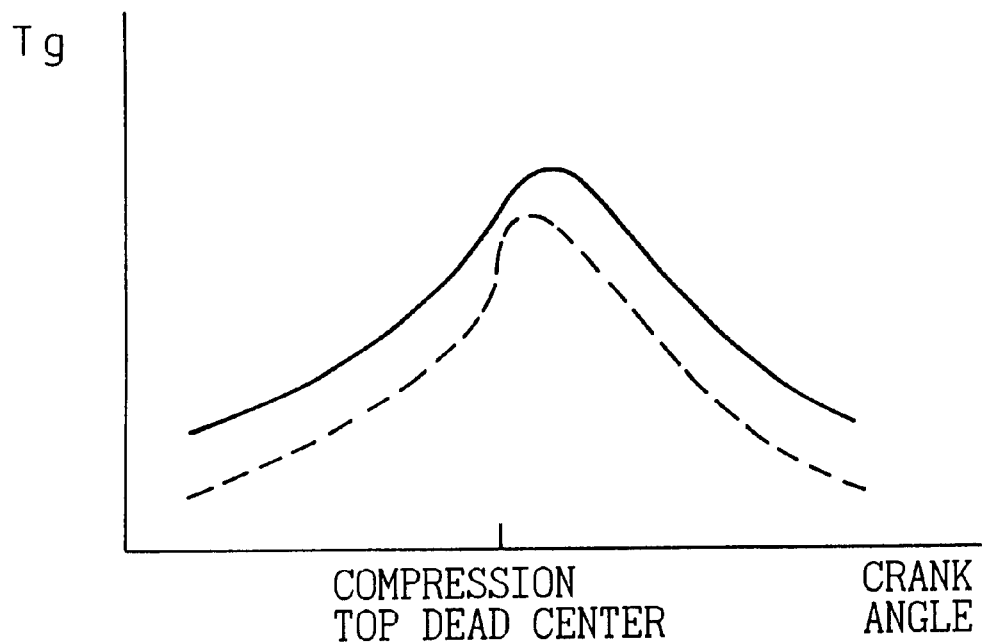
FIGS. 15A and 15B are views of the temperature of gas in the combustion chamber.
Figure 15B:
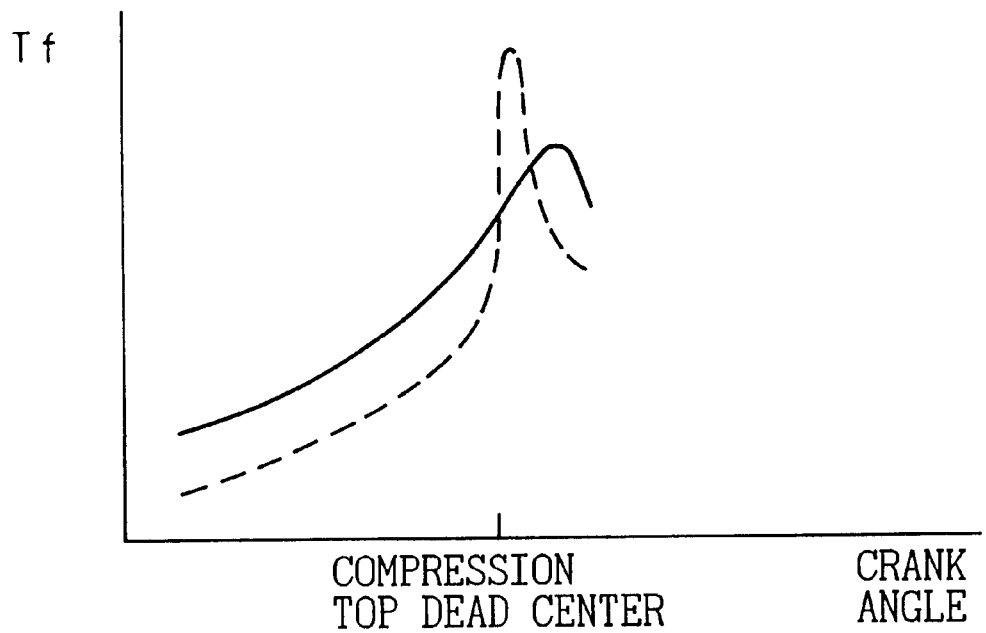

The solid line of FIG. 15A shows the relationship between the mean gas temperature Tg in the combustion chamber 5 and the crank angle when low temperature combustion is performed, while the broken line of FIG. 15A shows the relationship between the mean gas temperature Tg in the combustion chamber 5 and the crank angle when normal combustion is performed. Further, the solid line of FIG. 15B shows the relationship between the gas temperature of the fuel and its surroundings when low temperature combustion is performed, while the broken line of FIG. 15B shows the relationship between the gas temperature Tf of the fuel and its surroundings and the crank angle when normal combustion is performed.

When low temperature combustion is performed, the amount of EGR gas becomes larger than when normal combustion is performed. Therefore, as shown in FIG. 15A, before top dead center of the compression stroke, that is, during the compression stroke, the mean gas temperature Tg at the time of low temperature combustion shown by the solid line becomes higher than the mean gas temperature Tg at the time of normal combustion shown by the broken line. Note that at this time, as shown in FIG. 15B, the gas temperature Tf of the fuel and its surroundings becomes about the same temperature as the mean gas temperature Tg.

Next, the combustion starts near top dead center of the compression stroke. In this case, at the time of low temperature combustion, as shown by the solid line of FIG. 15B, due to the heat absorbing action of the EGR gas, the gas temperature Tf of the fuel and its surroundings does not become that high. As opposed to this, at the time of normal combustion, there is a large amount of oxygen around the fuel, as shown by the broken line of FIG. 15B, the gas temperature Tf of the fuel and its surroundings becomes extremely high. When normal combustion is performed in this way, the gas temperature Tf of the fuel and its surroundings becomes considerably high compared with the case of low temperature combustion, but the temperature of the gas other than the majority becomes lower when normal combustion is performed compared with when low temperature combustion is performed. Therefore, as shown in FIG. 15A, the mean gas temperature Tg in the combustion chamber 5 near top dead center of the compression stroke becomes higher at the time of low temperature combustion compared with normal combustion. As a result, as shown in FIG. 15A, the temperature of the already burned gas in the combustion chamber 5 after the combustion is finished becomes higher at the time of low temperature combustion compared with normal combustion. Therefore, at the time of low temperature combustion, the temperature of the exhaust gas becomes high.

If low temperature combustion is performed in this way, the amount of generation of smoke, that is, the amount M of discharged particulate, becomes smaller and the temperature of the exhaust gas rises. Therefore, if. switching from normal combustion to low temperature combustion during engine operation, the amount M of discharged particulate can be reduced and the temperature TF of the particulate filter 22 can be raised. As opposed to this, if switching from low temperature combustion to normal combustion, the temperature TF of the particulate filter 22 falls. At this time, however, the amount M of discharged particulate increases. Whatever the case, by switching between normal combustion and low temperature combustion, the amount M of discharged particulate and the temperature of the particulate filter 22 can be controlled.

Figure 16:
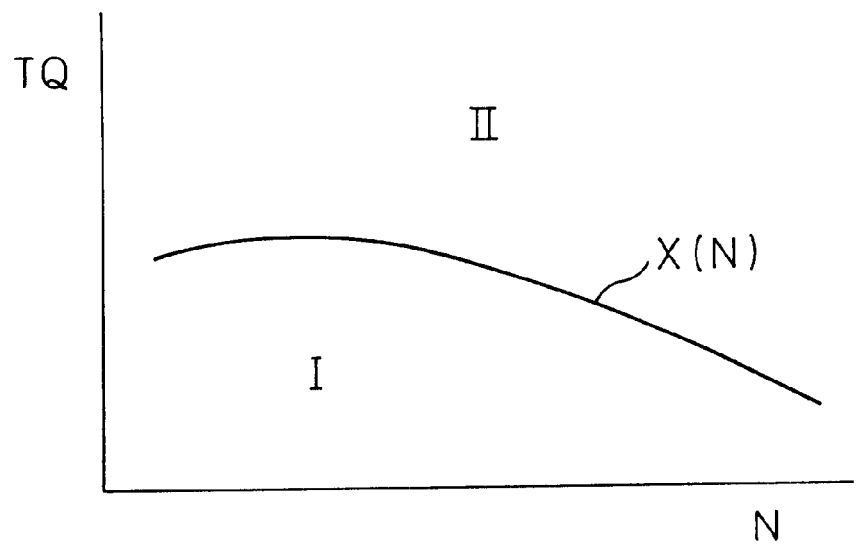
FIG. 16 is a view of operating regions I and II.

If the required torque TQ of the engine becomes higher, however, that is, if the amount of fuel injection becomes greater, the gas temperature of the fuel and its surroundings at the time of combustion becomes higher, so low temperature combustion becomes difficult. That is, low temperature combustion becomes possible only at the time of engine medium and low load operation where the amount of generation of heat by the combustion is relatively small. In FIG. 16, region I shows the operating region where first combustion where there is a larger amount of inert gas in the combustion chamber 5 than the amount of inert gas where the generation of soot peaks, that is, low temperature combustion, can be performed, while region II shows the operating region where second combustion where there is a smaller amount of inert gas in the combustion chamber 5 than the amount of inert gas where the generation of soot peaks, that is, normal temperature combustion, can be performed.

Figure 17:
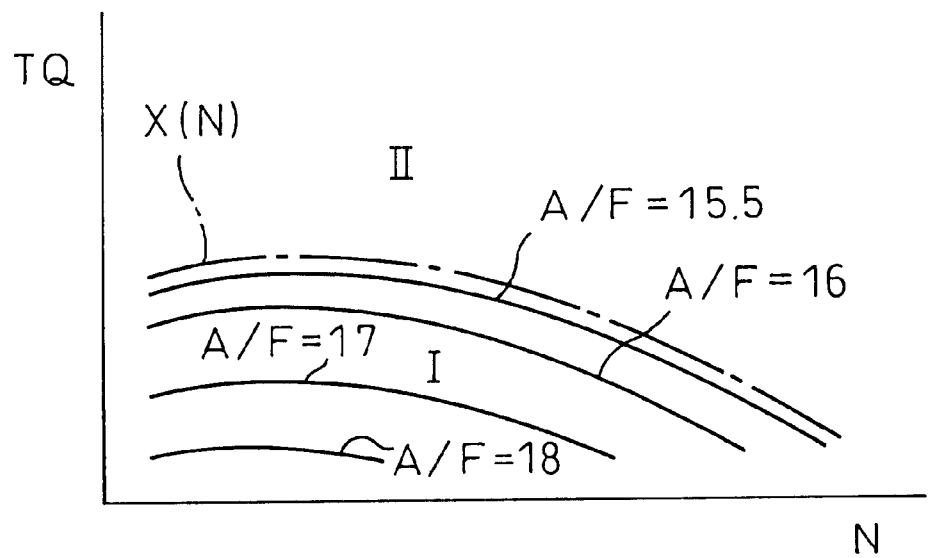
FIG. 17 is a view of an air-fuel ratio A/F.
Figure 18:
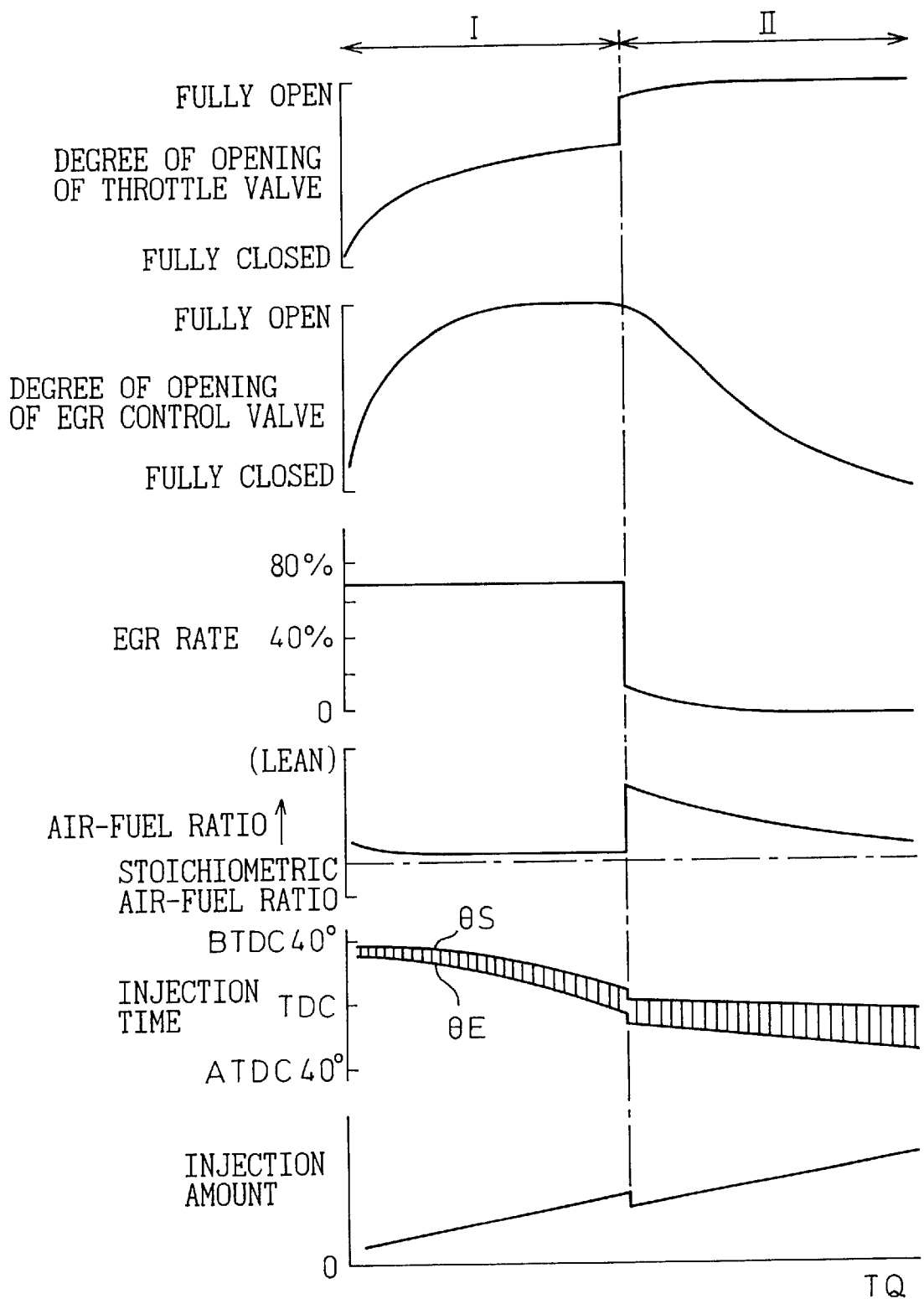
FIG. 18 is a view of a change of an opening degree of a throttle valve etc.

FIG. 17 shows the target air-fuel ratio A/F in the case of low temperature combustion in the operating region I, while FIG. 18 shows the opening degree of the throttle valve 17, the opening degree of the EGR control valve 25, the EGR rate, the air-fuel ratio, the injection start timing θS, the injection end timing θE, and the amount of injection in accordance with the required torque TQ at the time of low temperature combustion in operating region I. Note that FIG. 18 also shows the opening degree of the throttle valve 17 at the time of normal combustion performed in operating region II.

From FIG. 17 and FIG. 18, it is understood that when low temperature combustion is performed in operating region I, the EGR rate is made over 55 percent and the air-fuel ratio A/F is made a lean air-fuel ratio of 15.5 to about 18. Note that as explained above, when low temperature combustion is performed in operating region I, even if the air-fuel ratio is made rich, almost no smoke is produced.

Figure 19:
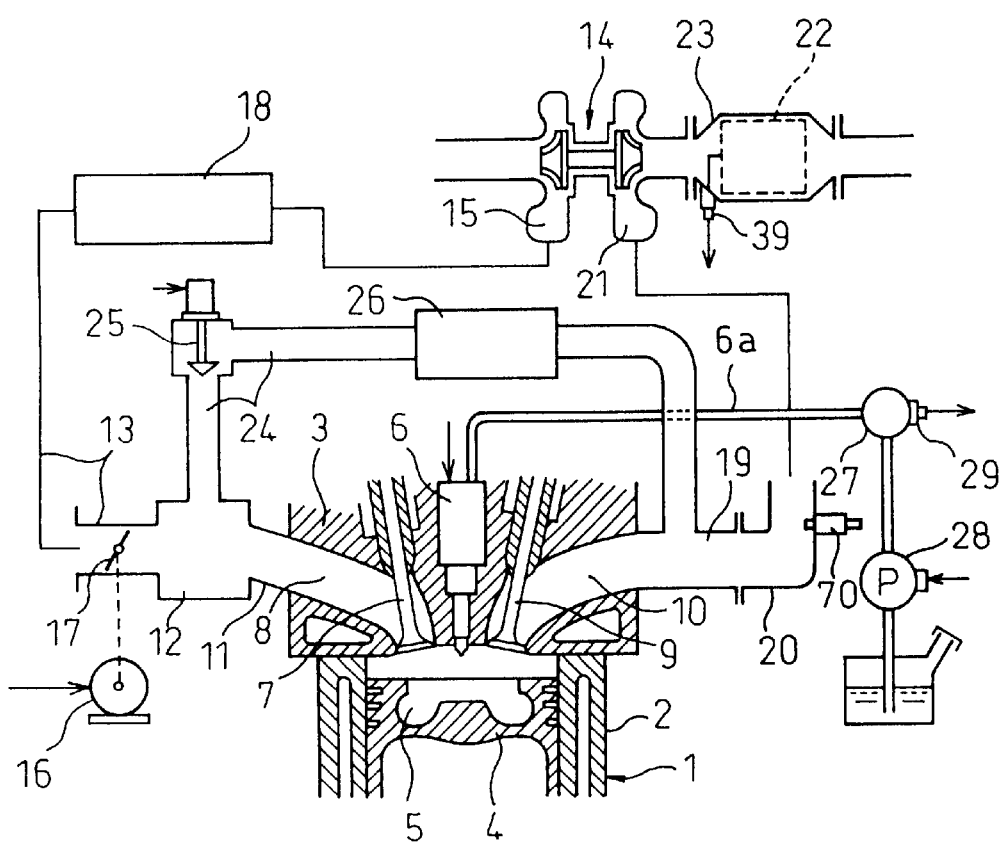
FIG. 19 is an overall view of another embodiment of an engine.

Next, an explanation will be given of another method for raising the temperature TF of the particulate filter 22. FIG. 19 shows an engine suited for execution of this method. Referring to FIG. 19, in this engine, a hydrocarbon feed device 70 is arranged in the exhaust pipe 20. Hydrocarbon is fed from the hydrocarbon feed device 70 to the inside of the exhaust pipe 20 in accordance with need. If hydrocarbon is fed, the hydrocarbon is oxidized by the excess oxygen on the particulate filter 22. Due to the heat of oxidation reaction at this time, the temperature TF of the particulate filter 22 is raised. In this case, by reducing the amount of feed of the hydrocarbon, it is possible to reduce the temperature TF of the particulate filter 22. Note that this hydrocarbon feed device 70 may be arranged anywhere between the particulate filter 22 and the exhaust port 10.

Figure 20:
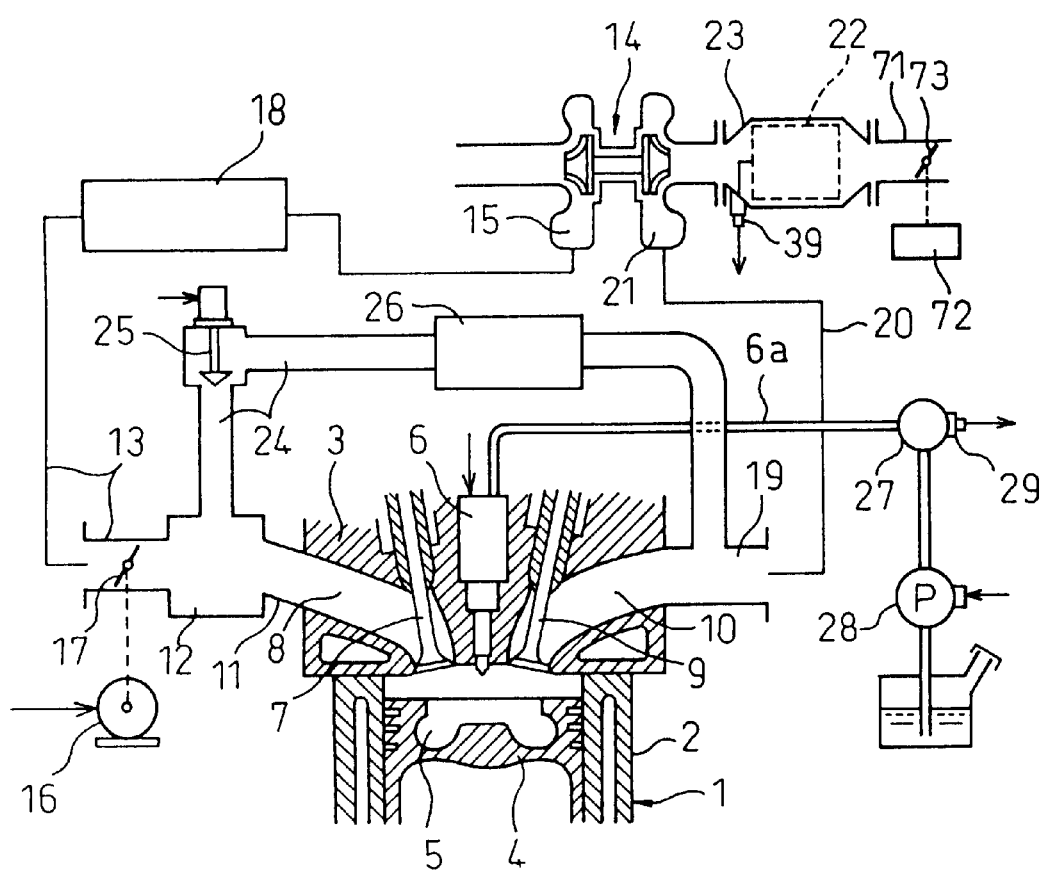
FIG. 20 is an overall view of still another embodiment of an engine.

Next, an explanation will be given of still another method for raising the temperature TF of the particulate filter 22. FIG. 20 shows an engine suited for execution of this method. Referring to FIG. 20, in this engine, an exhaust control valve 73 driven by an actuator 72 is arranged in the exhaust pipe 71 downstream of the particulate filter 22.

In this method, when the temperature TF of the particulate filter 22 is to be raised, the exhaust control valve 73 is made substantially fully closed. To prevent a reduction in the engine output torque due to the exhaust control valve 73 being substantially fully closed, the amount of injection of main fuel Qm is increased. If the exhaust control valve 73 is substantially fully closed, the pressure in the exhaust passage upstream of the exhaust control valve 73, that is, the back pressure, rises. If the back pressure rises, when exhaust gas is exhausted from the inside of the combustion chamber 5 to the inside of the exhaust port 10, the pressure of the exhaust gas does not fall that much. Therefore, the temperature no longer falls that much. Further, at this time, since the amount of injection of main fuel Qm is increased, the temperature of the already burned gas in the combustion chamber 5 becomes high. Therefore, the temperature of the exhaust gas exhausted into the exhaust port 10 becomes considerably high. As a result, the temperature of the particulate filter 22 is made to rapidly rise.

In this case, it is possible to increase the opening degree of the exhaust control valve 73 and reduce the amount of injection of the main fuel Qm so as to reduce the temperature of the particulate filter 22.

Figure 21:
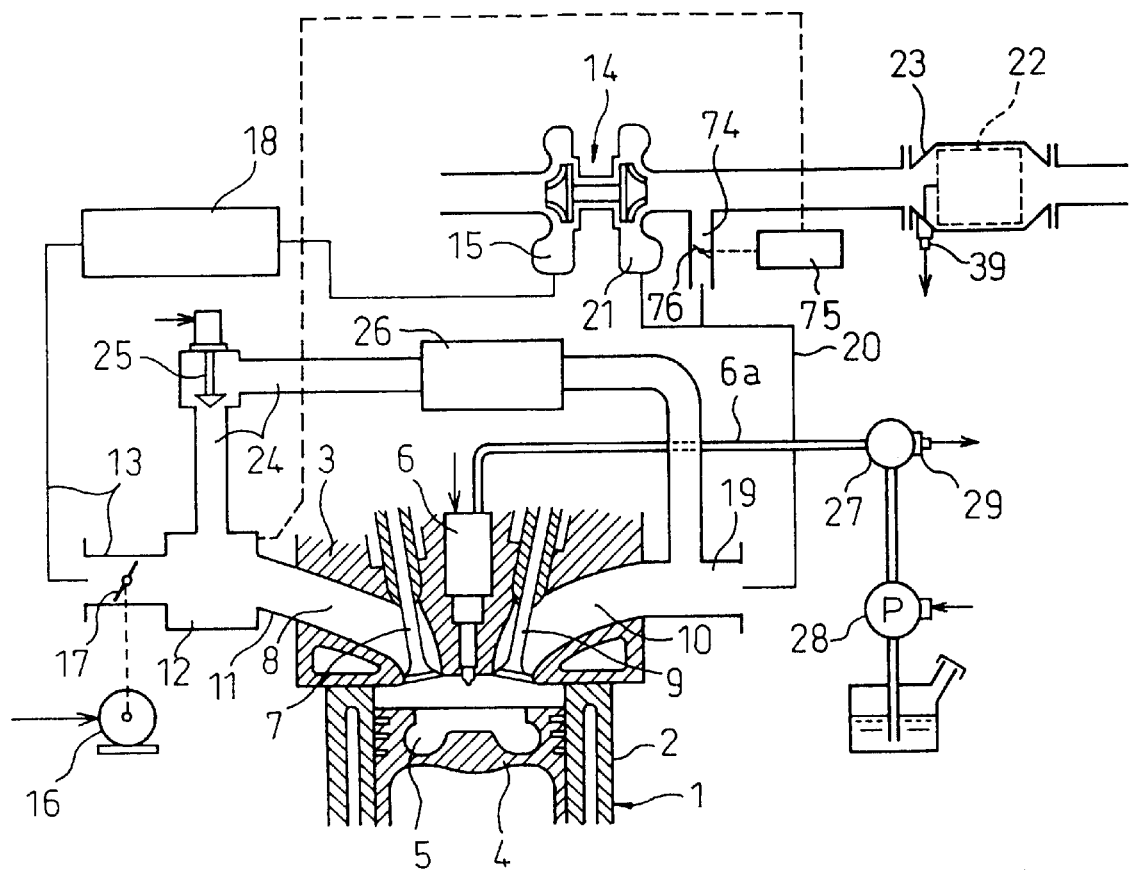
FIG. 21 is an overall view of still another embodiment of an engine.

Next, an explanation will be given of still another method for raising the temperature TF of the particulate filter 22. FIG. 21 shows an engine suited to execution of this method. Referring to FIG. 21, in this engine, a waist gate valve 76 controlled by an actuator 75 is arranged inside the exhaust bypass passage 74 bypassing the exhaust turbine 21. This actuator 75 is normally actuated in response to the pressure inside the surge tank 12, that is, the supercharging pressure, and controls the opening degree of the waist gate valve 76 so that the supercharging pressure does not become more than a certain value.

In this method, when the temperature TF of the particulate filter 22 should be raised, the waist gate valve 76 is fully opened. If the exhaust gas passes through the exhaust turbine 21, the temperature falls, but if the waist gate valve 76 is fully opened, the large portion of the exhaust gas flows through the exhaust bypass passage 74, so the temperature no longer falls. Therefore, the temperature of the particulate filter 22 rises. In this case, it is possible to reduce the temperature TF of the particulate filter 22 by reducing the opening degree of the waist gate valve 76.

Next, an explanation will be given of the method of reducing the amount M of discharged particulate. That is, the more sufficiently the injected fuel and the air are mixed, that is, the greater the amount of air around the injected fuel, the better the injected fuel is burned, so the less particulate is produced. Therefore, to reduce the amount M of discharged particulate, it is sufficient to more sufficiently mix the injected fuel and air. If the injected fuel and air are mixed well, however, the amount of generation of $NO_x$ increases since the combustion becomes active. Therefore, in other words, the method of reducing the amount M of discharged particulate may be said to be a method of increasing the amount of generation of $NO_x$.

Whatever the case, there are various methods for reducing the amount M of discharged particulate. Therefore, these methods will be successively explained.

It is also possible to use the above-mentioned low temperature combustion as a method for reducing the amount PM of discharged particulate, but the method of controlling the fuel injection may also be mentioned as another effective method. For example, if the amount of fuel injection is reduced, sufficient air becomes present around the injected fuel and therefore the amount M of discharged particulate is reduced.

Further, if the fuel injection is advanced, sufficient fuel becomes present around the injected fuel and therefore the amount M of discharged particulate is reduced. Further, if the fuel pressure in the common rail 27, that is, the injection pressure, is raised, the injected fuel is dispersed, so the mixture between the injected fuel and the air becomes good-and therefore the amount M of discharged particulate is reduced. Further, when auxiliary fuel is injected at the end of the compression stroke immediately before injection of the main fuel Qm, that is, when so-called pilot injection is performed, the air around the fuel Qm becomes insufficient since the oxygen is consumed by the combustion of the auxiliary fuel. Therefore, in this case, the amount M of discharged particulate is reduced by stopping the pilot injection.

That is, when controlling the fuel injection to reduce the amount M of discharged particulate, the amount of fuel injection is reduced, the fuel injection timing is delayed, the injection pressure is raised, or the pilot injection is stopped.

Next, an explanation will be given of another method for reducing the amount M of discharged particulate. In this method, when the amount M of discharged particulate is to be reduced, the opening degree of the EGR control valve 25 is reduced to reduce the EGR rate. If the EGR rate falls, the amount of air around the injected fuel increases and therefore the amount M of discharged particulate falls.

Next, an explanation will be given of still another method for reducing the amount M of discharged particulate. In this method, when the amount M of discharged particulate is to be reduced, the opening degree of the waist gate valve 76 (FIG. 21) is reduced to increase the supercharging pressure. If the supercharging pressure increases, the amount of air around the injected fuel increases and therefore the amount M of discharged particulate falls.

Next, an explanation will be given of the method for increasing the concentration of oxygen in the exhaust gas for increasing the amount G of the particulate removable by oxidation. If the concentration of oxygen in the exhaust gas increases, amount of oxygen absorbed in the active oxygen release agent 61 increases, so the amount of active oxygen released from the active oxygen release agent 61 increases and therefore the amount G of the particulate removable by oxidation increases.

As a method for executing-this method, the method of controlling the EGR rate may be mentioned. That is, when the amount G of the particulate removable by oxidation is to be increased, the opening degree of the EGR control valve 25 is reduced so that the EGR rate falls. The fall of the EGR rate means that the ratio of the amount of intake air in the intake air increases. Therefore, if the EGR rate falls, the concentration of oxygen in the exhaust gas rises. As a result, the amount M of discharged particulate increases. Further, if the EGR rate falls, as mentioned above, the amount M of discharged particulate falls. Therefore, if the EGR rate falls, the amount M of discharged particulate rapidly becomes smaller than the amount G of the particulate removable by oxidation.

Next, an explanation will be given of the method of using secondary air for increasing the concentration of oxygen in exhaust gas. In the example shown in FIG. 22, the exhaust pipe 77 between the exhaust turbine 21 and the particulate filter 22 is connected with the intake duct 13 through a secondary air feed conduit 78, while a feed control valve 78 is arranged in the secondary air feed conduit 78. Further, in the example shown in FIG. 23, the secondary air feed conduit 78 is connected to an engine driven air pump 80. Note that the position for feeding secondary air into the exhaust passage may be anywhere between the particulate filter 22 and the exhaust port 10.

Figure 22:
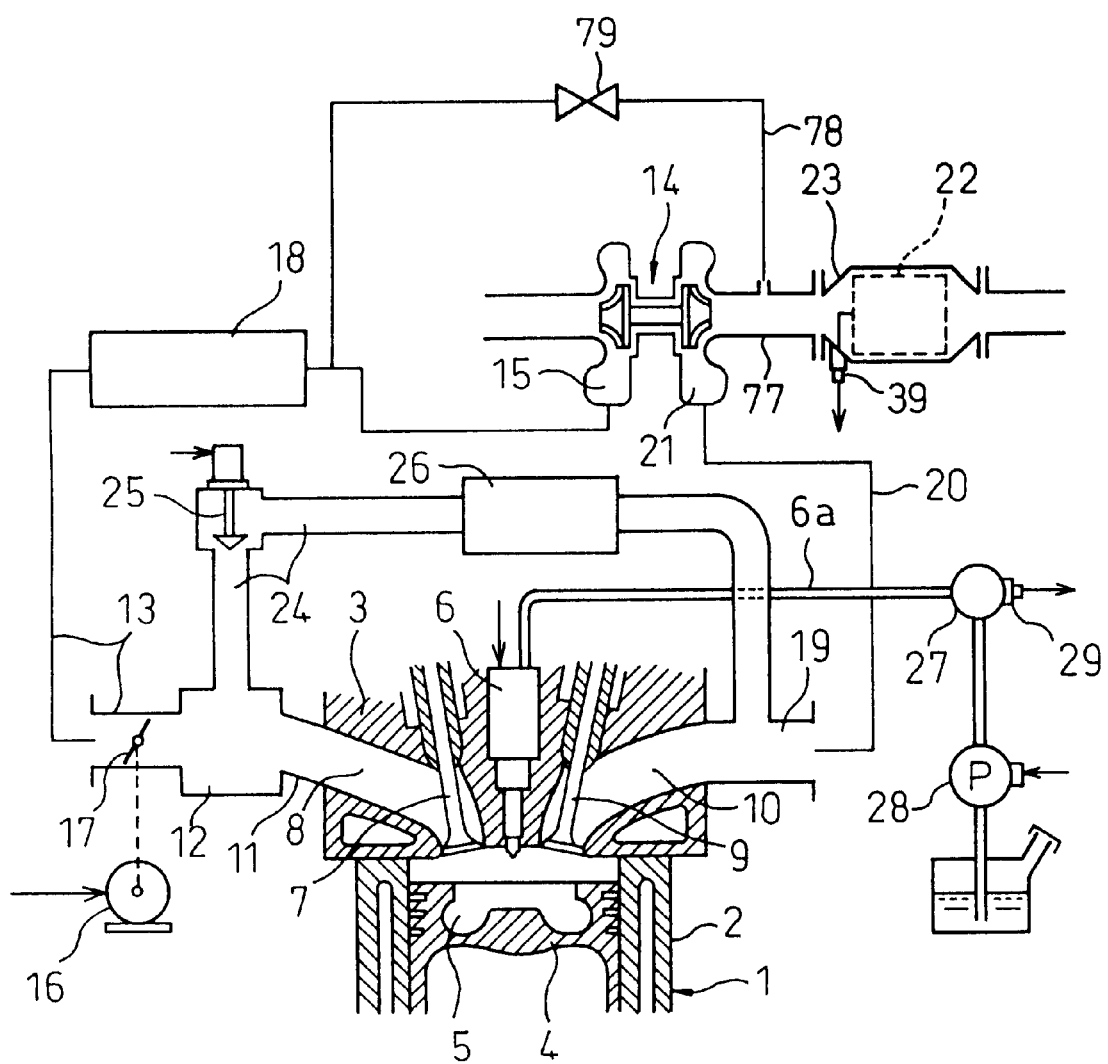
FIG. 22 is an overall view of still another embodiment of an engine.
Figure 23:
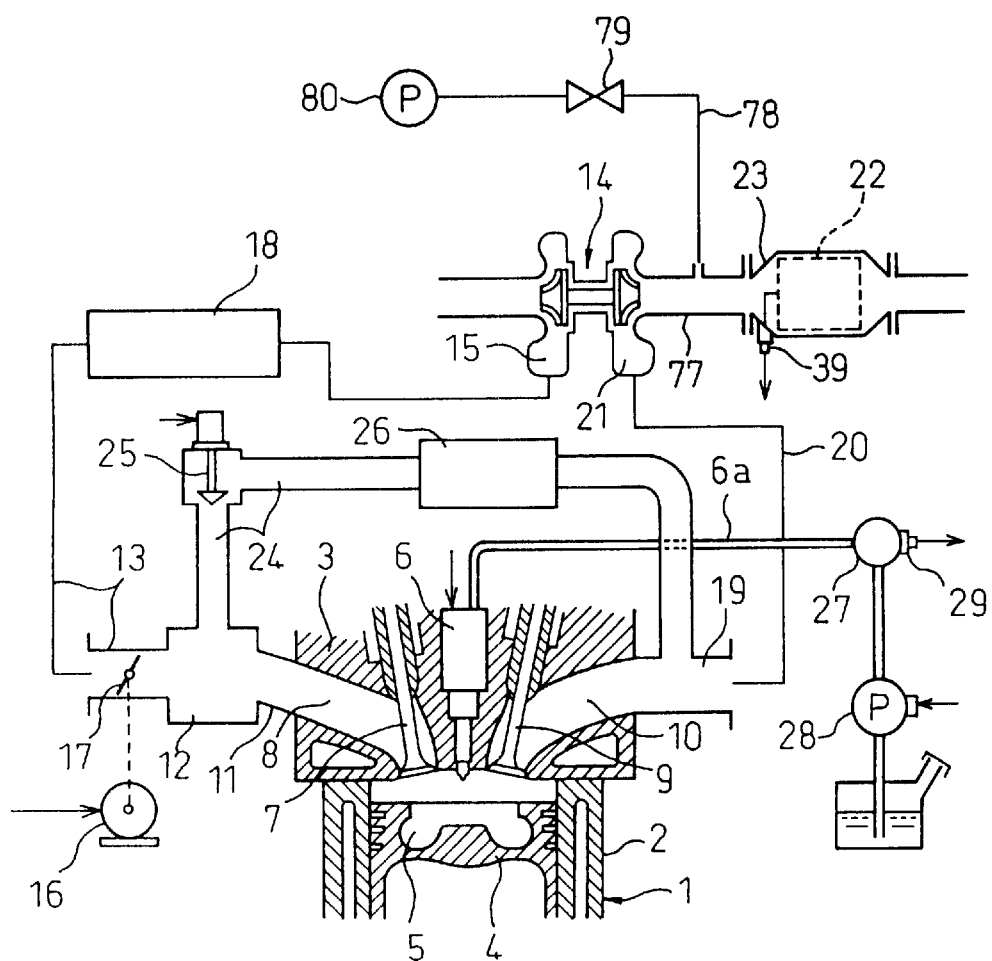
FIG. 23 is an overall view of still another embodiment of an engine.

In the engine shown in FIG. 22 or FIG. 23, the feed control valve 79 is made to open when the concentration of oxygen in the exhaust gas is to be increased. At this time, secondary air is supplied from the secondary air feed conduit 78 to the exhaust pipe 77. Therefore, the concentration of oxygen in the exhaust gas is increased.

Now, as explained above, when the air-fuel ratio of the exhaust gas is lean, the $NO_x$ in the exhaust gas is absorbed in the active oxygen release agent/$NO_x$ absorbent 61. However, there are limits to the $NO_x$ absorption capability of the $NO_x$ absorbent 61. It is necessary to cause the release of $NO_x$ from the active oxygen release agent/$NO_x$ absorbent 61 before the $NO_x$ absorption capability of the active oxygen release agent/$NO_x$ absorbent 61 becomes saturated. Therefore, it is necessary to estimate the amount of $NO_x$ absorbed in the active oxygen release agent/$NO_x$ absorbent 61. Therefore, in this embodiment of the present invention, the $NO_x$ absorption amount A per unit time is found in advance in the form of a map shown in FIG. 24 as a function of the required torque TQ and engine speed N. By cumulatively adding the $NO_x$ absorption amount A per unit time, the $NO_x$ amount $\Sigma NO_x$ absorbed in the active oxygen release agent/$NO_x$ absorbent 61 may be estimated.

Further, in this embodiment of the present invention, when the $NO_x$ absorption amount $\Sigma NO_x$ exceeds a predetermined allowable maximum value MAXN, the air-fuel ratio of the exhaust gas flowing into the active oxygen release agent/$NO_x$ absorbent 61 is made temporarily rich. Due to this, $NO_x$ is made to be released from the active oxygen release agent/$NO_x$ absorbent 61.

The exhaust gas however, contains $SO_x$. The active oxygen release agent/$NO_x$ absorbent 61 absorbs not only the $NO_x$, but also the $SO_x$. The mechanism of absorption of $SO_x$ in the active oxygen release agent/$NO_x$ absorbent 61 is the same as the mechanism of absorption of the $NO_x$.

That is, explaining this taking as an example the case of carrying platinum Pt and potassium K on the carrier in the same way as explained with respect to the mechanism of absorption of $NO_x$, as explained above, the oxygen $O_2$ adheres to the surface of the platinum Pt in the form of $O_2^-$ or $O^{2-}$ when the air-fuel ratio of the exhaust gas is lean. The $SO_2$ in the exhaust gas reacts with the $O_2^-$ or $O^{2-}$ on the surface of the platinum Pt to become $SO_3$. Next, part of the $SO_3$ which is produced is absorbed in the active oxygen release agent 61 while being oxidized on the platinum Pt and diffuses in the active oxygen release agent/$NO_x$ absorbent 61 in the form of sulfate ions $SO_4^{2-}$ while bonding with the potassium Pt to produce potassium sulfate $K_2SO_4$.

This sulfate $K_2SO_4$ however is stable and hard to break down. As explained above, even if the air-fuel ratio of the exhaust gas is made rich for releasing the $NO_x$ from the active oxygen release agent/$NO_x$ absorbent 61, the sulfate $K_2SO_4$ remains as it is without breaking down. Therefore, the sulfate $K_2SO_4$ increases in the active oxygen release agent/$NO_x$ absorbent 61 along with time. Accordingly, the amount of $NO_x$ which the active oxygen release agent/$NO_x$ absorbent 61 can absorb along with time falls.

The sulfate $K_2SO_4$ breaks down when the temperature of the active oxygen release agent/$NO_x$ absorbent 61 exceeds a certain temperature determined by the active oxygen release agent/$NO_x$ absorbent 61, for example, about 600° C. At this time, if the air-fuel ratio of the exhaust gas flowing into the active oxygen release agent/$NO_x$ absorbent 61 is made rich, the $SO_x$ is released from the active oxygen release agent/$NO_x$ absorbent 61. Release of the $SO_x$ from the active oxygen release agent/$NO_x$ absorbent 61, however, takes a considerably long time compared with release of $NO_x$ from the active oxygen release agent/$NO_x$ absorbent 61.

Therefore, in this embodiment of the present invention, when $SO_x$ is to be released from the active oxygen release agent/$NO_x$ absorbent 61, the temperature of the active oxygen release agent/$NO_x$ absorbent 61 is raised to about 600° C. while maintaining the state where the air-fuel ratio is lean and the amount M of discharged particulate is smaller than the amount G of the particulate removable by oxidation, then $SO_x$ is made to be released from the active oxygen release agent/$NO_x$ absorbent 61 while alternately switching the air-fuel ratio of the exhaust gas flowing to the active oxygen release agent/$NO_x$ absorbent 61 between rich and lean.

In this case, there are various methods for raising the temperature TF of the active oxygen release agent/$NO_x$ absorbent 61 to about 600° C. In this embodiment of the present invention, as shown in (III) of FIG. 13, the auxiliary fuel Qv is injected and the injection timing of the main fuel Qm is delayed or, as shown in (IV) of FIG. 13, auxiliary fuel Qp is injected after injection of the main fuel Qm to raise the temperature TF of the active oxygen release agent/$NO_x$ absorbent 61 to about 600° C.

Further, when the temperature TF of the active oxygen release agent/$NO_x$ absorbent 61 is raised to about 600° C., the state is maintained where the air-fuel ratio is lean and the amount M of discharged particulate is smaller than the amount G of the particulate removable by oxidation. Therefore, at this time, even if the particulate deposits on the particulate filter 22, the deposited particulate is removed by oxidation while the temperature TF of the active oxygen release agent/$NO_x$ absorbent 61 is raised to about 600° C.

On the other hand, there are various methods for making the air-fuel ratio of the exhaust gas flowing into the active oxygen release agent/$NO_x$ absorbent 61 rich to release the $NO_x$ or $SO_x$ from the active oxygen release agent/$NO_x$ absorbent 61. For example, when performing low temperature combustion, by making the air-fuel ratio in the combustion chamber 5 rich during low temperature combustion, it is possible to make the air-fuel ratio of the exhaust gas flowing into the active oxygen release agent/$NO_x$ absorbent 61 rich.

Further, as shown in (IV) of FIG. 13, it is also possible to make the air-fuel ratio of the exhaust gas flowing into the active oxygen release agent/$NO_x$ absorbent 61 rich by injecting the auxiliary fuel Qp after the injection of the main fuel Qm and increasing the amount of the auxiliary fuel Qp. Further, as shown in FIG. 19, it is also possible to arrange a hydrocarbon feed device 70, inject hydrocarbon from the hydrocarbon feed device 70, and make the air-fuel ratio of the exhaust gas flowing into the active oxygen release agent/$NO_x$ absorbent 61 rich by the hydrocarbon.

Further, as explained above, when the air-fuel ratio of the exhaust gas is made rich, the active oxygen is released all at once from the active oxygen release agent/$NO_x$ absorbent 61. Due to this, the particulate deposited on the particulate filter 22 is rapidly oxidized. Even after this, however, if the air-fuel ratio of the exhaust gas continues to be made rich, oxygen is not stored in the active oxygen release agent/$NO_x$ absorbent 61. Further, there is almost no oxygen present in the exhaust gas. Therefore, the particulate is deposited in layers on the particulate filter 22 without being oxidized.

Therefore, in this embodiment of the present invention, when releasing $SO_x$, which requires that the air-fuel ratio be made rich for a long period, the air-fuel ratio of the exhaust gas flowing into the active oxygen release agent/$NO_x$ absorbent 61 is alternately switched between rich and lean as explained above. By doing this, when the air-fuel ratio of the exhaust gas becomes lean, the particulate on the particulate filter 22 is removed by oxidation by the active oxygen in the exhaust gas or the active oxygen released from the active oxygen release agent/$NO_x$ absorbent 61. Therefore, it is possible to prevent the particulate from depositing in layers on the particulate filter 22.

Figure 25A:
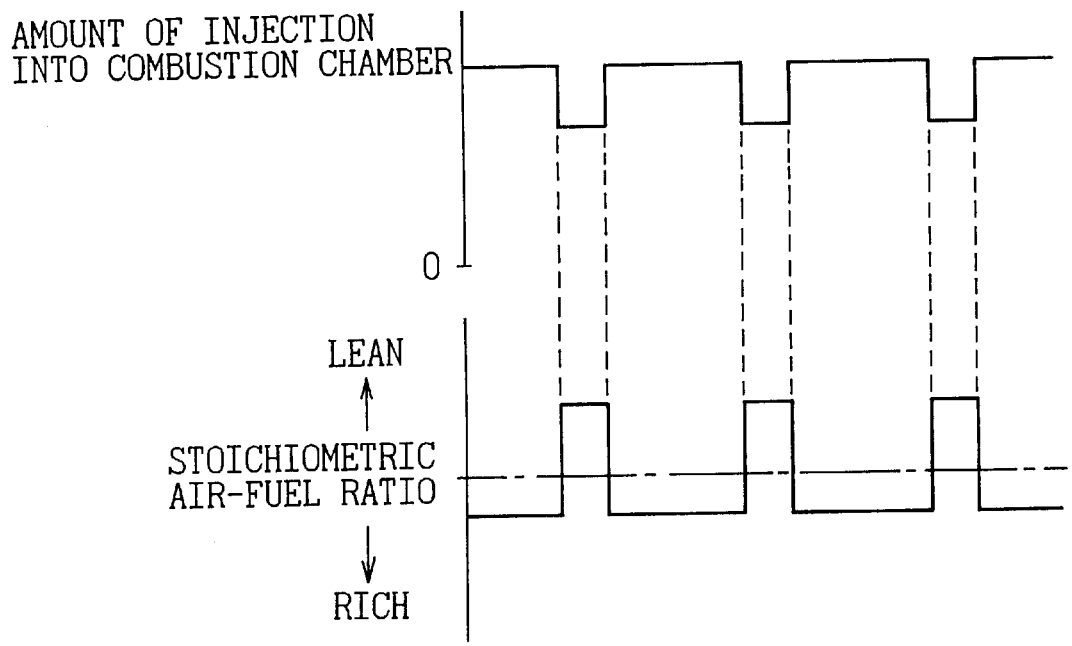
FIGS. 25A and 25B are views of air-fuel ratio control when releasing $SO_x$.
Figure 25B:
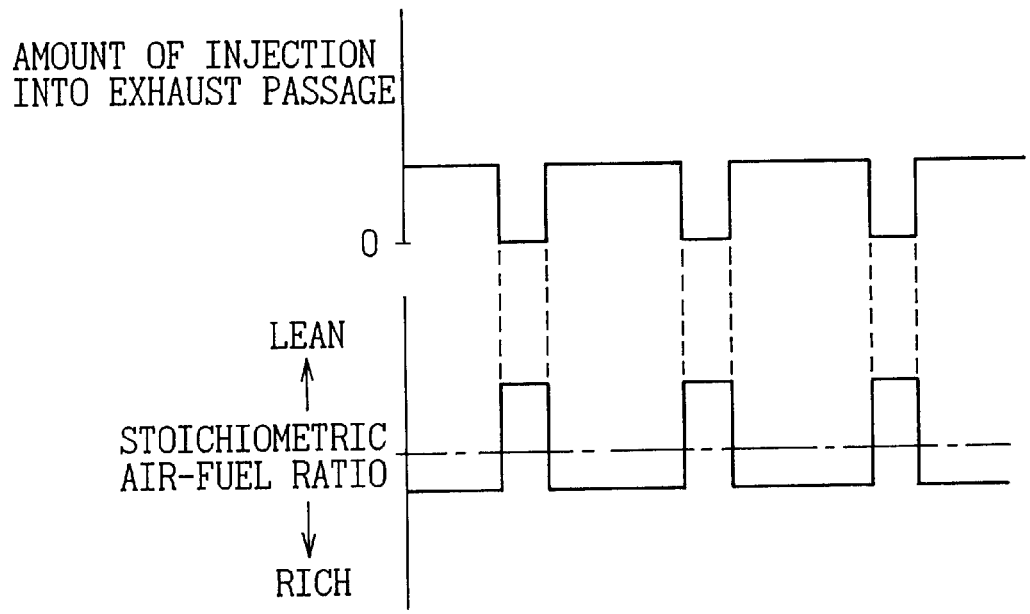

FIG. 25A shows the case of alternately switching the air-fuel ratio of the exhaust gas between lean and rich by controlling the amount of fuel fed into the combustion chamber 5 when releasing $SO_x$ from the active oxygen release agent/$NO_x$ absorbent 61. FIG. 25B shows the case of alternately switching the air-fuel ratio of the exhaust gas between lean and rich by controlling the amount of hydrocarbon fed into the exhaust pipe 20 when releasing $SO_x$ from the active oxygen release agent/$NO_x$ absorbent 61.

Next, an explanation will be made, referring to FIG. 26, of the processing routine of the $NO_x$ releasing flag set when the $NO_x$ is to be released from the active oxygen release agent/$NO_x$ absorbent 61 and the $SO_x$ releasing flag set when the $SO_x$ is to be released from the active oxygen release agent/$NO_x$ absorbent 61. Note that this routine is executed by interruption every certain time interval.

Figure 24:
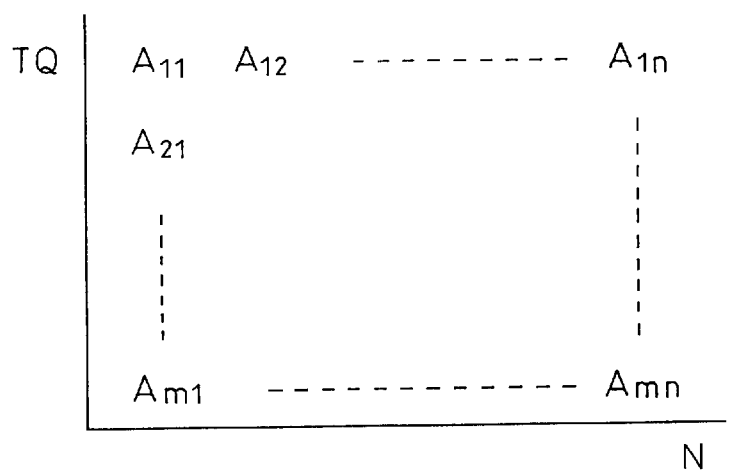
FIG. 24 is a view of a map of an amount of $NO_x$ absorption.
Figure 26:
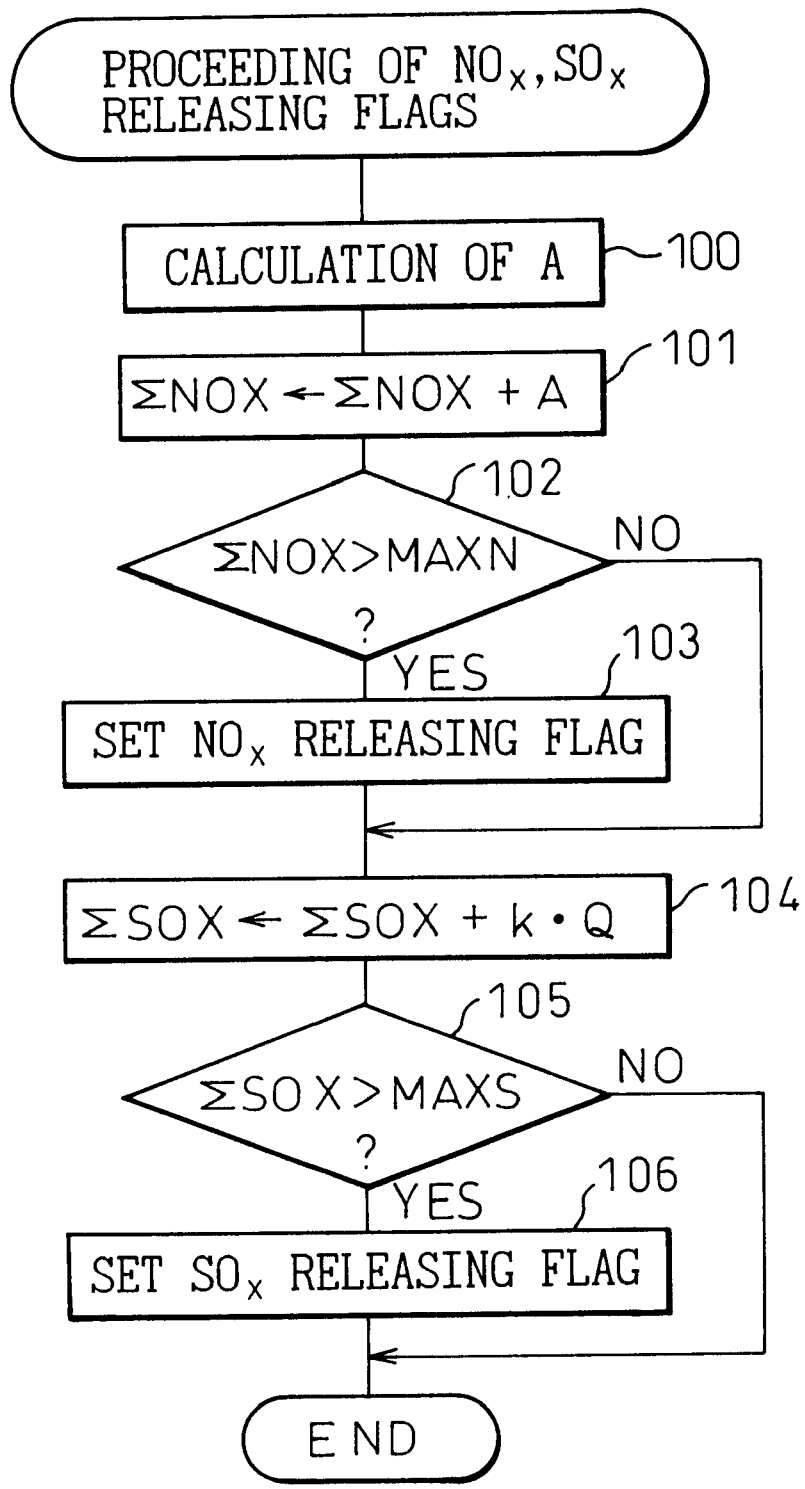
FIG. 26 is a flow chart for processing a $NO_x$ releasing flag and $SO_x$ releasing flag.

Referring to FIG. 26, first, at step 100, the $NO_x$ absorption amount A per unit time is calculated from the map shown in FIG. 24. Next, at step 101, A is added to the $NO_x$ absorption amount $\Sigma NO_x$. Next, at step 102, it is decided if the $NO_x$ absorption amount $\Sigma NO_x$ has exceeded the allowable maximum value MAXN. When $\Sigma NOX>MAXN$, the routine proceeds to step 103, the $NO_x$ releasing flag showing that the $NO_x$ is to be released is set. Next, the routine proceeds to step 104.

At step 104, the product k Q of the constant k multiplied with the injection amount Q is added to $\Sigma SOX$. The fuel contains a certain amount of sulfur S. Therefore, the amount of $SO_x$ absorbed in the active oxygen release agent/$NO_x$ absorbent 61 can be expressed by k Q. Therefore, the $\Sigma SOX$ obtained by successively adding k Q expresses the amount of $SO_x$ estimated to be absorbed in the active oxygen release agent/$NO_x$ absorbent 61. At step 105, it is decided if the $SO_x$ amount $\Sigma SOX$ is over the allowable maximum MAXs. When $\Sigma SOX>MAXS$, the routine proceeds to step 106, where the $SO_x$ releasing flag is set.

Next, an explanation will be made of the control of the operation while referring to FIG. 27 and FIG. 28.

Figure 27:
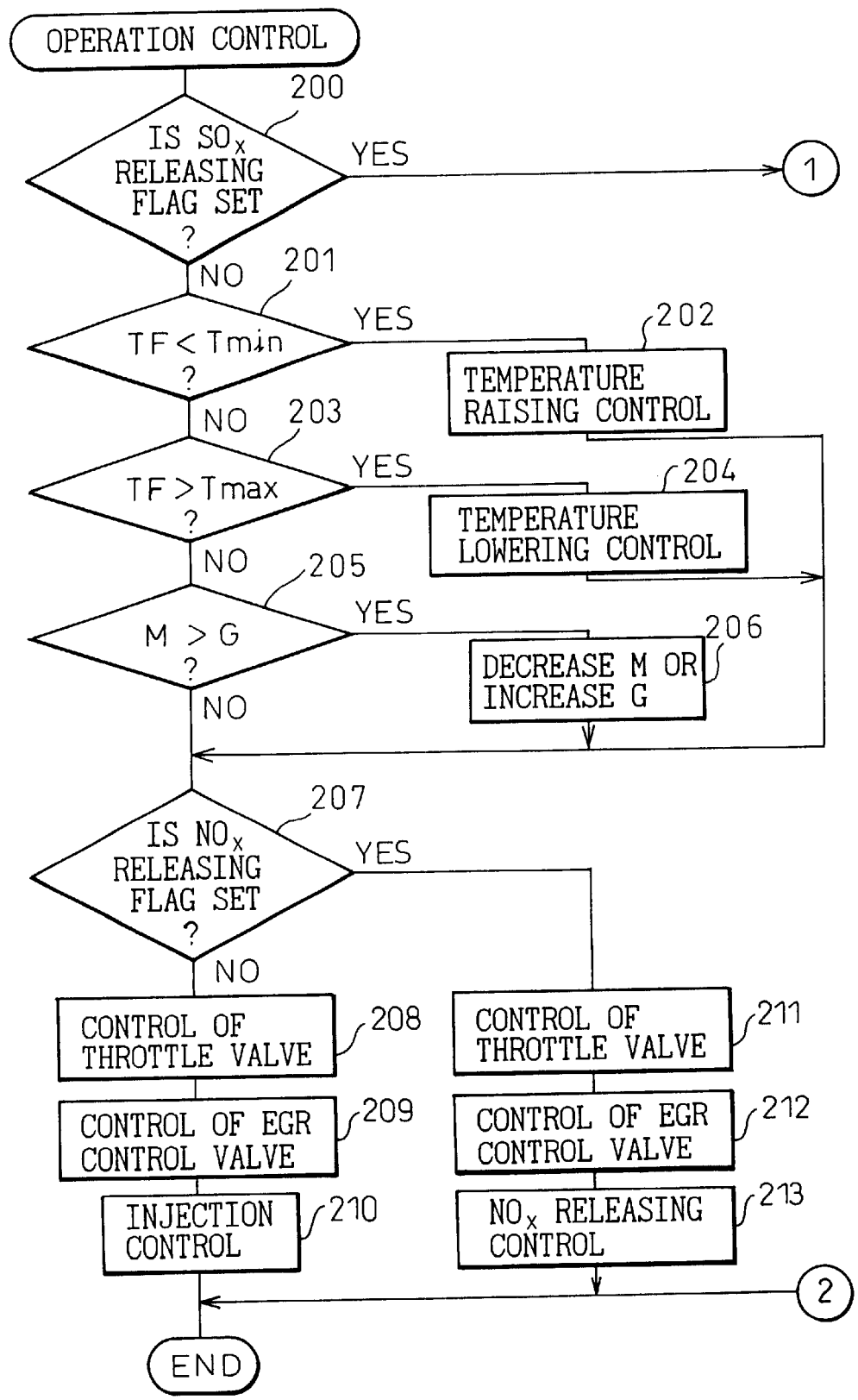
FIGS. 27 and 28 are flow charts for control of engine operation.
Figure 28:
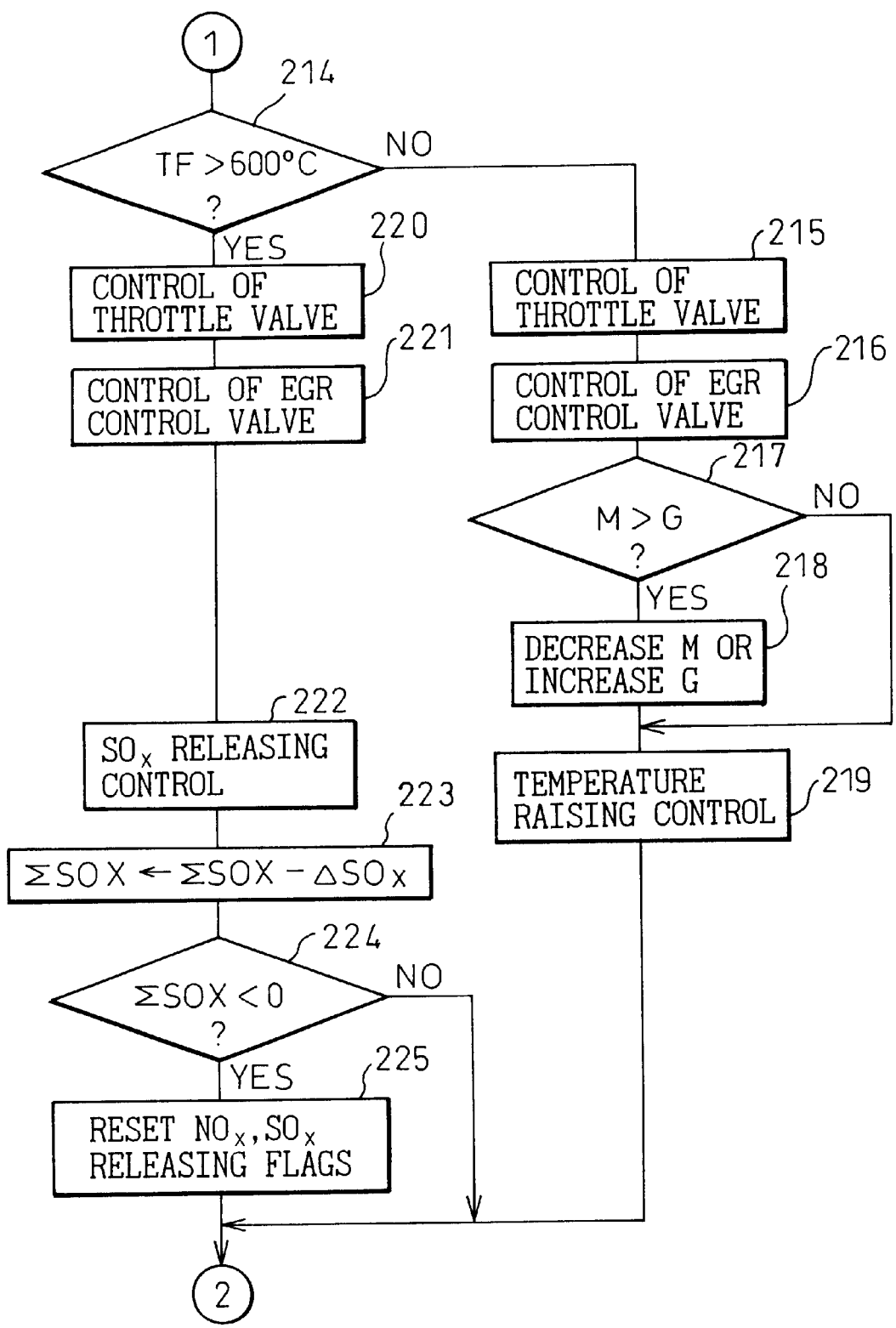

Referring to FIG. 27 and FIG. 28, first, at step 200, it is decided if the $SO_x$ releasing flag is set. When the $SO_x$ releasing flag is not set, the routine proceeds to step 201, where it is decided if the temperature TF of the particulate filter 22 is lower than the lower limit temperature $T_{min}$ of the simultaneous particulate and $NO_x$ treatment region shown by the hatching in FIG. 11, for example, 250° C. When $TF<T_{min}$, the routine proceeds to step 202, where one of the methods for raising the temperature TF of the particulate filter 22 is executed. Next, the routine proceeds to step 207.

On the other hand, when it is decided at step 201 that $TF \leq T_{min}$, the routine proceeds to step 203, where it is decided if the temperature TF of the particulate filter 22 is higher than the upper limit temperature $T_{max}$ of the simultaneous particulate and $NO_x$ treatment region shown by the hatching in FIG. 11, for example 500° C. When $TF>T_{max}$, the routine proceeds to step 204, where one of the methods for reducing the temperature TF of the particulate filter 22 is executed. Next, the routine proceeds to step 207.

On the other hand, when it is decided at step 203 that $TF \leq T_{max}$, the routine proceeds to step 205, where it is decided if the amount M of discharged particulate is larger than amount G of the particulate removable by oxidation. When $M>G$, the routine proceeds to step 206, where one of the methods for reducing the amount M of discharged particulate or one of the methods for increasing the amount G of the particulate removable by oxidation is executed. Next, the routine proceeds to step 207.

On the other hand, when it is decided at step 205 that $M \leq G$, the routine proceeds to step 207. At step 207, it is decided if the $NO_x$ flag has been set. When the $NO_x$ releasing flag has been set, the routine proceeds to step 208, where the opening degree of the throttle valve 17 is controlled, then at step 209, the opening degree of the EGR control valve 25 is controlled. Next, at step 210, the fuel injection is controlled.

As opposed to this, when it is judged at step 207 that the $NO_x$ releasing flag has been set, the routine proceeds to step 211, where the opening degree of the throttle valve 17 is controlled. Next, at step 212, the opening degree of the EGR control valve 25 is controlled. Next, at step 213, one of the methods for making the air-fuel ratio of the exhaust gas temporarily rich is executed to release the $NO_x$ and the $NO_x$ releasing flag is reset.

On the other hand, when it is decided at step 200 that the $SO_x$ releasing flag has been set, the routine proceeds to step 214, where it is decided if the temperature TF of the particulate filter 22 is more than the temperature where $SO_x$ can be released, for example, 600° C. When $TF \leq 600°$ C., the routine proceeds to step 215, the opening degree of the throttle valve 17 is controlled, then at step 216, the opening degree of the EGR control valve 25 is controlled.

Next, at step 217, it is decided if the amount M of discharged particulate is larger than the amount G of the particulate removable by oxidation. When $M>G$, the routine proceeds to step 218, where one of the methods for reducing the amount M of discharged particulate or one of the methods for increasing the amount G of the particulate removable by oxidation is executed. Next, at step 219, one of the methods for raising the temperature TF of the particulate filter 22 to about 600° C. is executed.

On the other hand, when it is decided at step 214 that TF>600° C., the routine proceeds to step 220, where the opening degree of the throttle valve 17 is controlled, then at step 221, the opening degree of the EGR control valve 25 is controlled. Next, at step 222, by alternately switching the air-fuel ratio of the exhaust gas between rich and lean, the release of $SO_x$ is controlled to release the $SO_x$ from the active oxygen release agent/$NO_x$ absorbent 61.

Next, at step 223, the $SO_x$ release amount $\Delta SO_x$ is subtracted from the $SO_x$ amount $\Sigma SOX$. This $SO_x$ release amount $\Delta SO_x$ may be made a certain value or may be changed in accordance with the engine operating state. Next, at step 224, it is decided if the $SO_x$ amount $\Sigma SOX$ has become negative. When $\Sigma SOX<0$, the routine proceeds to step 225, where the $NO_x$ releasing flag and the $SO_x$ releasing flag are reset.

Generally speaking, however, in an internal combustion engine, at the time of engine low load operation, the temperature of the exhaust gas is low. Therefore, sometimes it is difficult to make the amount G of the particulate removable by oxidation larger than the amount M of discharged particulate. If low temperature combustion is performed as mentioned above, however, the amount M of discharged particulate is extremely small. Further, since the temperature of the exhaust gas is high, the temperature TF of the particulate filter 22 becomes high. Therefore, even during engine low load operation, it is possible to easily increase the amount M of discharged particulate from the amount M of discharged particulate. Therefore, low temperature combustion can be said to be extremely suited to the exhaust gas purification apparatus of the present invention.

As explained above, however, this low temperature combustion is only performed in the low side operating region I shown in FIG. 16 and is not performed in the high load side operating region II. Therefore, even when performing low temperature combustion, low temperature combustion is performed only when the engine operating state is in the operating region I of FIG. 16. When the engine operating state exceeds the boundary X(N) and shifts to the operating region II, low temperature combustion is switched to normal combustion. That is, temperature combustion is performed in operating region I, while normal combustion is performed in operating region II.

Figure 29:
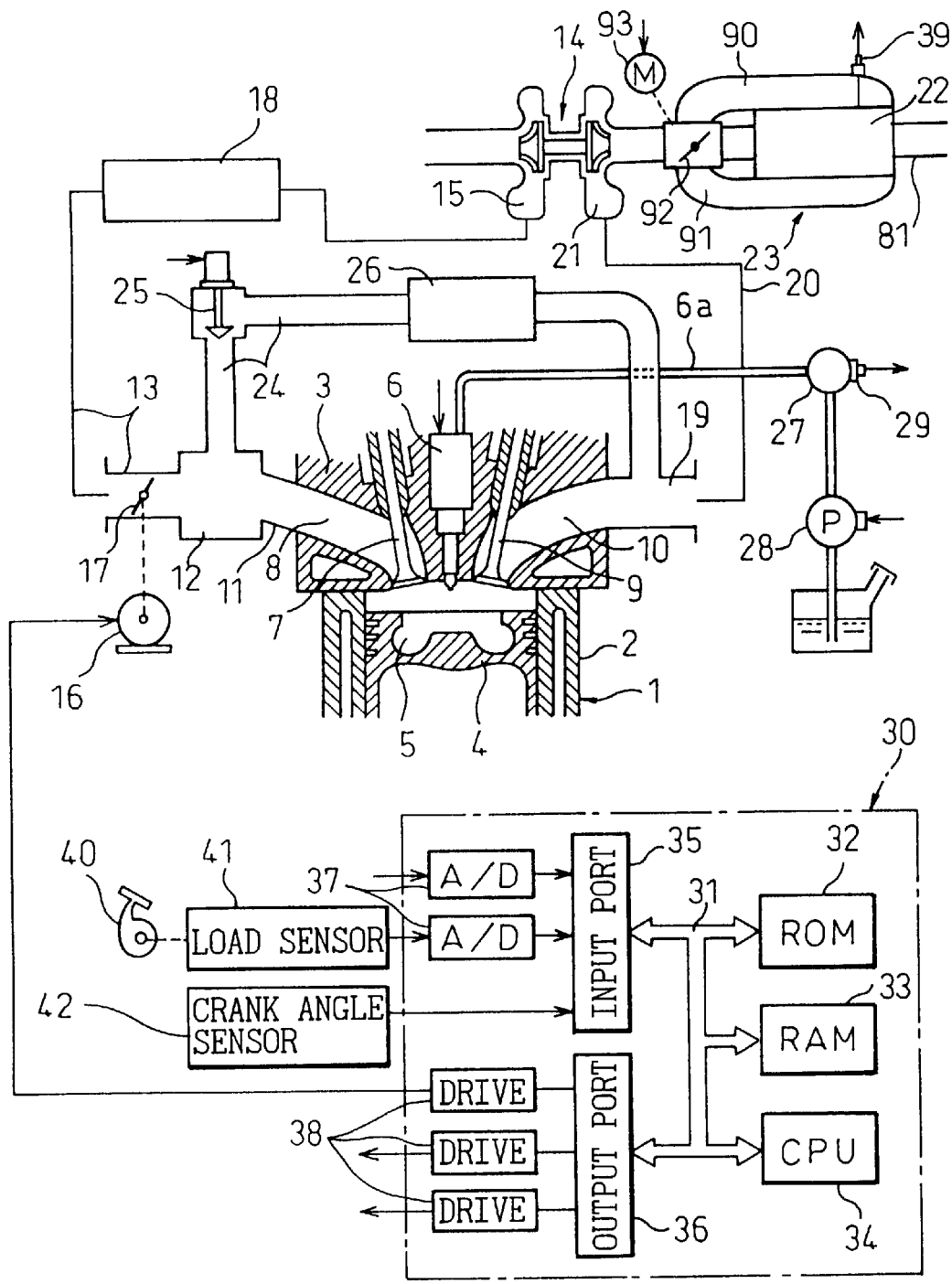
FIG. 29 is an overall view of still another embodiment of an engine.

FIG. 29 shows another embodiment of the casing 23 containing the particulate filter 22. Note that in FIG. 29, components similar to those shown in FIG. 1 are assigned the same reference numerals.

In this embodiment, a particulate filter 22 of the same structure as the particulate filter shown in FIG. 3B is arranged in a state rotated 90 degrees from the particulate filter shown in FIG. 3B. The exhaust gas is made to selectively circulate in both directions in the particulate filter 22.

Further, in this embodiment, as shown in FIG. 29, a switching valve device 92 is arranged in the exhaust passage extending inside the casing 23. In this embodiment, the switching valve device 92 is comprised of an exhaust switching valve. This exhaust switching valve is driven by the exhaust switching valve drive 93. Further, in this embodiment, a first passage 90 extending up to one of the exhaust gas outflow and inflow end faces of the particulate filter 22, a second passage 91 extending up to the other of the exhaust gas outflow and inflow end faces of the particulate filter 22, and an exhaust bypass passage communicating with the outside, that is, the exhaust passage 81, are branched from the switching valve device 92. The direction of flow of the exhaust gas can be switched by the switching valve device 92 among a first direction passing through the first passage 90, the particulate filter 22, and the second passage 91 toward the exhaust bypass passage 81, that is, the forward flow direction, a second direction passing through the second passage 91, the particulate filter 22, and the first passage 90 toward the exhaust bypass passage 81, that is, the reverse flow direction, and a third direction not passing through the particulate filter 22, but directly heading toward the exhaust bypass passage 81.

When the exhaust gas is made to flow in the forward flow direction through the particulate filter 22, the exhaust gas flows into the exhaust circulation passages 50 in FIG. 3B, then passes through the partitions 54 to flow out into the exhaust circulation passages 51. When the exhaust gas flows in the reverse flow direction through the particulate filter 22, the exhaust gas flows into the exhaust circulation passages 51 in FIG. 3B, then passes through the partitions 54 and flows out into the exhaust circulation passages 50.

Figure 30:
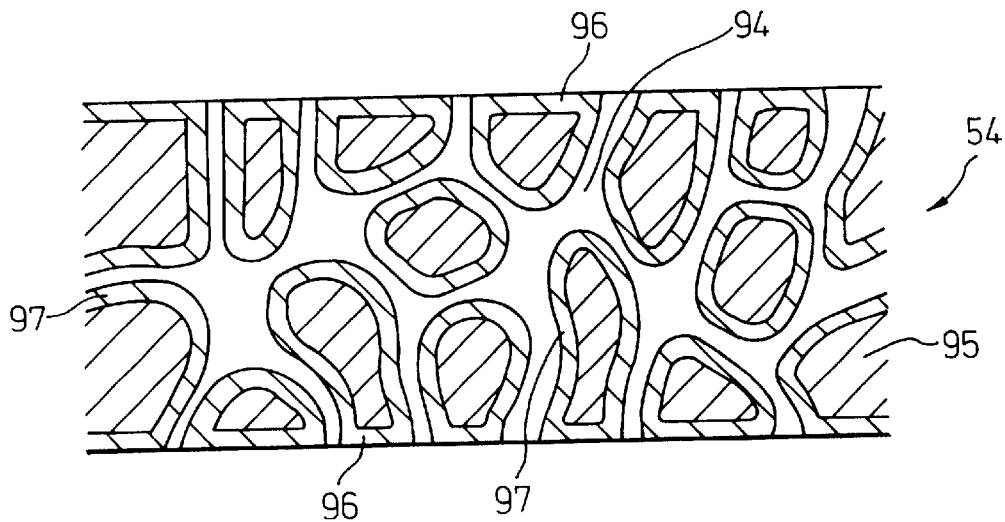
FIG. 30 is an enlarged sectional view of a partition of a particulate filter shown in FIG. 3B.

FIG. 30 is an enlarged view of a partition 54 of a particulate filter 22 shown in FIG. 3B. In FIG. 30, reference numeral 94 indicates an exhaust gas passage extending inside the partition 54, 95 is a substrate of the particulate filter, 96 is an active oxygen release agent/$NO_x$ absorbent carried on the surface of the partition 54 of the particulate filter, and 97 is an active oxygen release agent/$NO_x$ absorbent carried inside the partition 54 of the particulate filter.

Figure 31A:
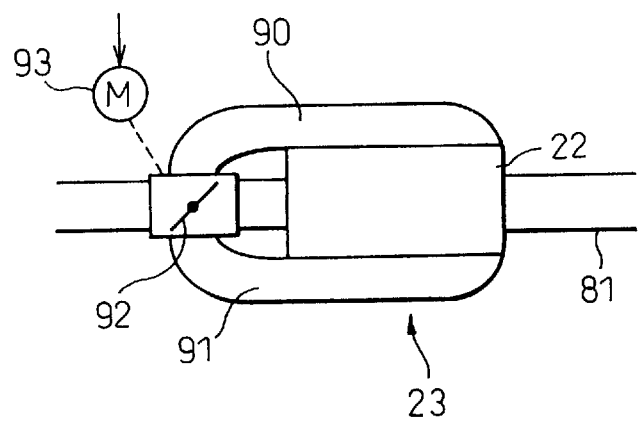
FIGS. 31A and 31B are enlarged views of the particulate filter shown in FIG. 29.
Figure 31B:
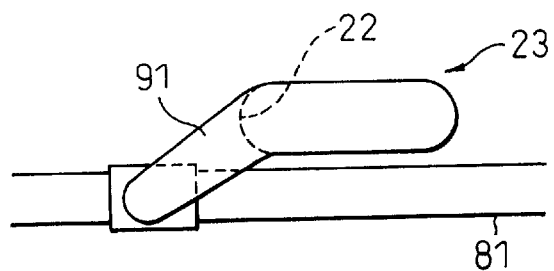
Figure 32A:
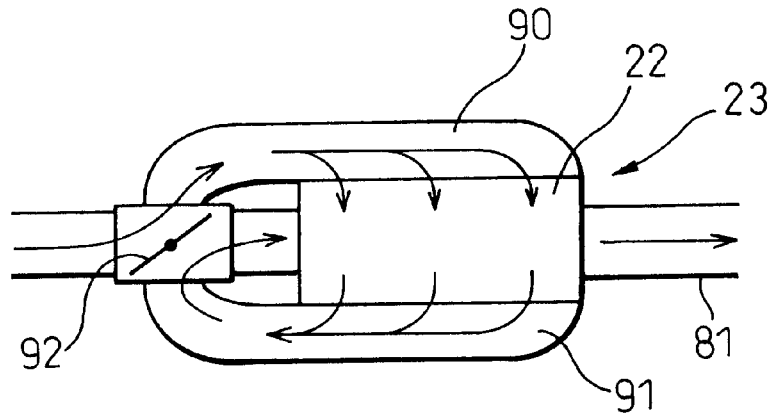
FIGS. 32A to 32C are views of the relationship between a switching position of an exhaust switching valve and the flow of exhaust gas.
Figure 32B:
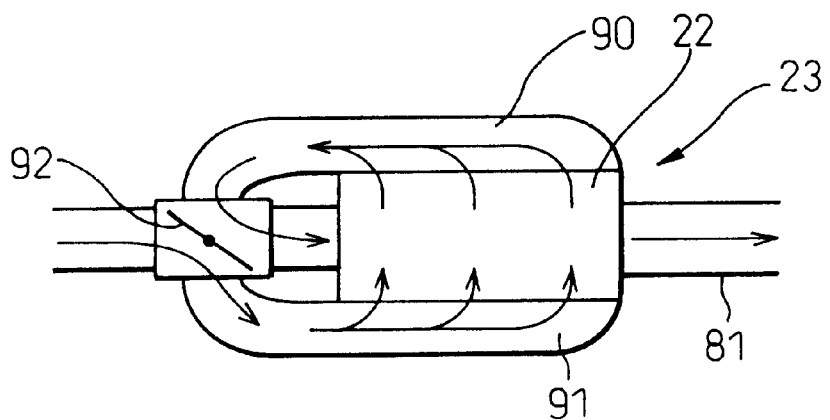
Figure 32C:
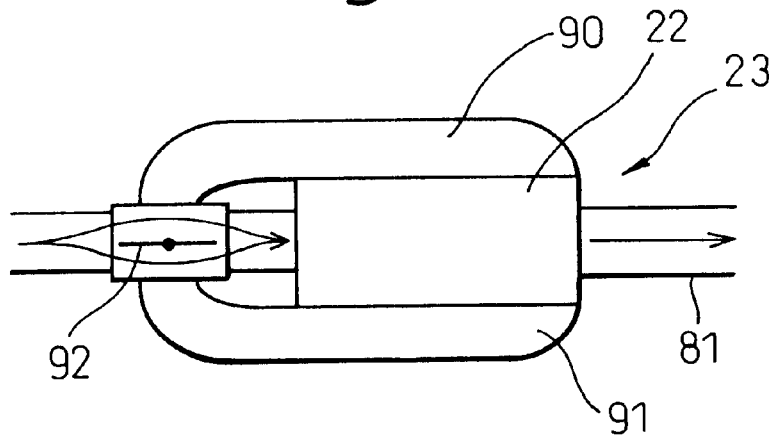

FIGS. 31A and 31B are enlarged views of the particulate filter 22 shown in FIG. 29. Specifically, FIG. 31A is an enlarged plan view of a particulate filter, while FIG. 31B is an enlarged side view of a particulate filter. FIGS. 32A to FIG. 32C are views of the relationship between the switching position of the exhaust switching valve 92 and the flow of the exhaust gas. Specifically, FIG. 32A is a view when the exhaust switching valve 92 is in the forward flow position, FIG. 32B is a view when the exhaust switching valve 92 is in the reverse flow position, and FIG. 32C is a view when the exhaust switching valve 92 is in the bypass position. When the exhaust switching valve 92 is in the forward flow position, as shown in FIG. 32A, the exhaust gas passing through the exhaust switching valve 92 and flowing into the casing 23 first passes through the first passage 90, then passes through the particulate filter 22, and finally passes through the second passage 91 and again passes through the exhaust switching valve 92 and is exhausted to the exhaust pipe 81. When the exhaust switching valve 92 is in the reverse flow position, as shown in FIG. 32B, the exhaust gas passing through the exhaust switching valve 92 and flowing into the casing 23 first passes through the second passage 91, then passes through the particulate filter 22 in a direction reverse to the case shown in FIG. 32A, and finally passes through the first passage 90 and again passes through the exhaust switching valve 92 and is exhausted to the exhaust pipe 81. When the exhaust switching valve 92 is in the bypass position, as shown in FIG. 32C, the pressure in the first passage 90 and the pressure in the second passage 91 become equal, so the exhaust gas reaching the exhaust switching valve 92 passes through the exhaust switching valve 92 and flows out inside the exhaust pipe 81 as it is without flowing into the first passage 90 or the second passage 91. The exhaust switching valve 92 is switched at a predetermined timing, for example, with every deceleration operation of the engine.

Figure 33A:
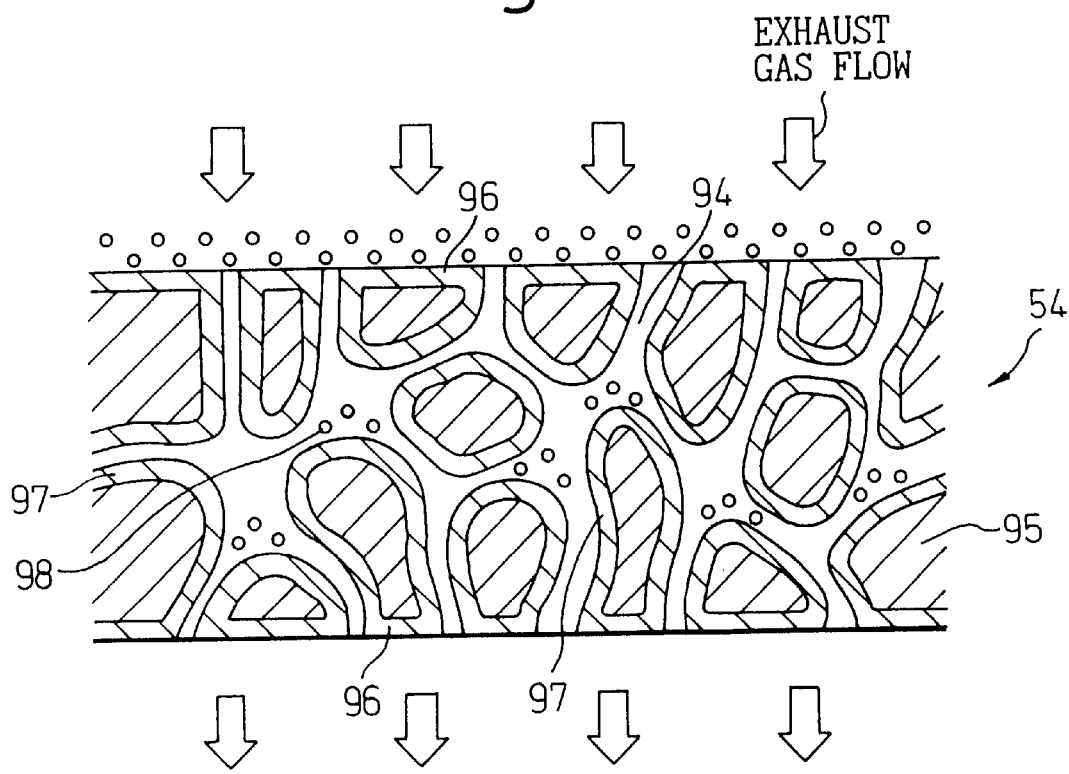
FIGS. 33A and 33B are views of the state of movement of particulate inside the partition 54 of the particulate filter.
Figure 33B:
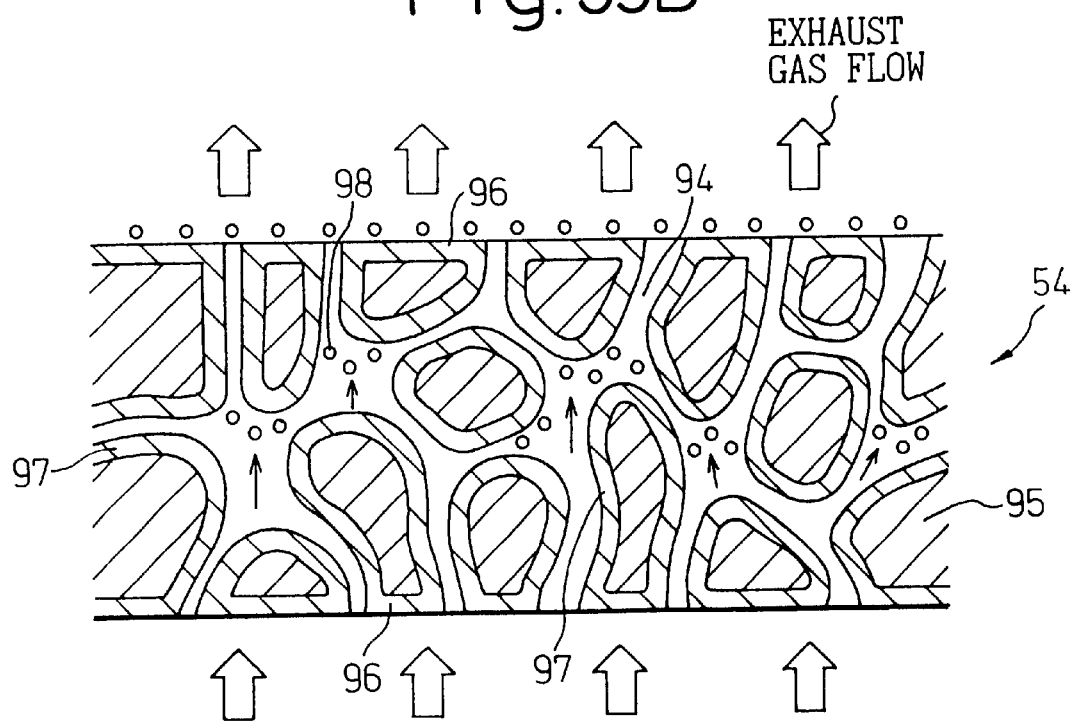

FIGS. 33A and 33B show the state when the particulate in the partitions 54 of the particulate filter 22 moves in accordance with the switching of position of the exhaust switching valve 92. More specifically, FIG. 33A is an enlarged sectional view of a partition 54 of the particulate filter 22 when the exhaust switching valve 92 is in the forward flow position (FIG. 32A), while FIG. 33B is an enlarged sectional view of the partition 54 of the particulate filter 22 when the exhaust switching valve 92 is switched from the forward feed position to the reverse feed position (FIG. 32B). As shown in FIG. 33A, when the exhaust switching valve 92 is switched to the forward feed position and the exhaust gas flows from the top side to the bottom side, the particulate 98 present in the exhaust gas passage 95 in the partition 54 is pushed on to the active oxygen release agent/$NO_x$ absorbent 97 inside the partition 54 and is gradually deposited there. Therefore, the particulate 98 not coming into direct contact with the active oxygen release agent/$NO_x$ absorbent 97 is not sufficiently oxidized. Next, as shown in FIG. 33B, when the exhaust switching valve 92 is switched from the forward flow position to the reverse flow position and the exhaust gas flows from the bottom side to the top side, the particulate 98 present inside the exhaust gas passage 94 in the partition 54 is moved by the flow of the exhaust gas. As a result, the particulate 98 which was not sufficiently oxidized is brought into direct contact with the active oxygen. release agent/$NO_x$ absorbent 97 and is fully oxidized. Further, when the exhaust switching valve 92 is in the forward feed direction (FIG. 3A), part of the particulate deposited on the active oxygen release agent/$NO_x$ absorbent 96 present on the surface of the partition 54 of the particulate filter disassociates from the active oxygen release agent/$NO_x$ absorbent 96 on the surface of the partition 54 of the particulate filter 22 by the exhaust switching valve 92 being switched from the forward feed position to the reverse feed position (FIG. 33B). The amount of disassociation of the particulate becomes greater the higher the temperature of the particulate filter 22 and becomes greater the greater the amount of exhaust gas. The amount of disassociation of the particulate increases the higher the temperature of the particulate filter 22 because the bonding force between the SOF, functioning as a binder causing the deposition of the particulate, and the particulate becomes weaker as the temperature of the particulate filter 22 becomes higher.

In this embodiment, due to the switching from the forward flow position of the exhaust switching valve 92 shown in FIG. 32A to the reverse flow position shown in FIG. 32B and the switching from the reverse flow position shown in FIG. 32B to the forward flow position shown in FIG. 32A, the particulate trapped in the partition 54 of the particulate filter 22 is dispersed to one side and the other side of the partition 54 of the particulate filter 22. By switching the exhaust switching valve 92 in this way, it is possible to reduce the possibility of deposition of the particulate on the partition 54 of the particulate filter 22 without being removed by oxidation. Note that the particulate trapped in the partition 54 of the particulate filter 22 is preferably dispersed to substantially the same degree at one side and the other side of the partition 54 of the particulate filter 22.

In the embodiment shown in FIG. 29 as well, to oxidize and remove the particulate in the exhaust gas without depositing on the particulate filter 22 and absorb the $NO_x$ in the exhaust gas, usually the amount M of discharged particulate is kept smaller than the amount G of the particulate removable by oxidation and the temperature TF of the particulate filter 22 is kept within the temperature range where the $NO_x$ absorption rate of the particulate filter 22 becomes more than a certain value. That is, the amount M of discharged particulate and the temperature TF of the particulate filter 22 are maintained within the simultaneous particulate and $NO_x$ treatment region shown by the hatching in FIG. 11.

On the other hand, as explained above, even if the amount M of discharged particulate and the temperature of the particulate filter 22 are maintained in the simultaneous particulate and $NO_x$ treatment region, sometimes the amount M of discharged particulate and the temperature of the particulate filter 22 will end up outside of the simultaneous particulate and $NO_x$ treatment region. In this case, in this embodiment as well, at least one of the amount M of discharged particulate, amount M of discharged particulate, and temperature TF of the particulate filter 22 is controlled so that the amount M of discharged particulate and the temperature of the particulate filter 22 become within the simultaneous particulate and $NO_x$ treatment region. In this case, the amount M of discharged particulate, amount G of the particulate removable by oxidation, or temperature TF of the particulate filter 22 may be controlled by the methods explained above with reference to FIG. 13 to FIG. 18.

The embodiments shown from FIG. 34 to FIG. 39 show cases of application of the embodiments shown from FIG. 19 to FIG. 23 to an engine having a casing 23 of the structure shown in FIG. 29.

Figure 34:
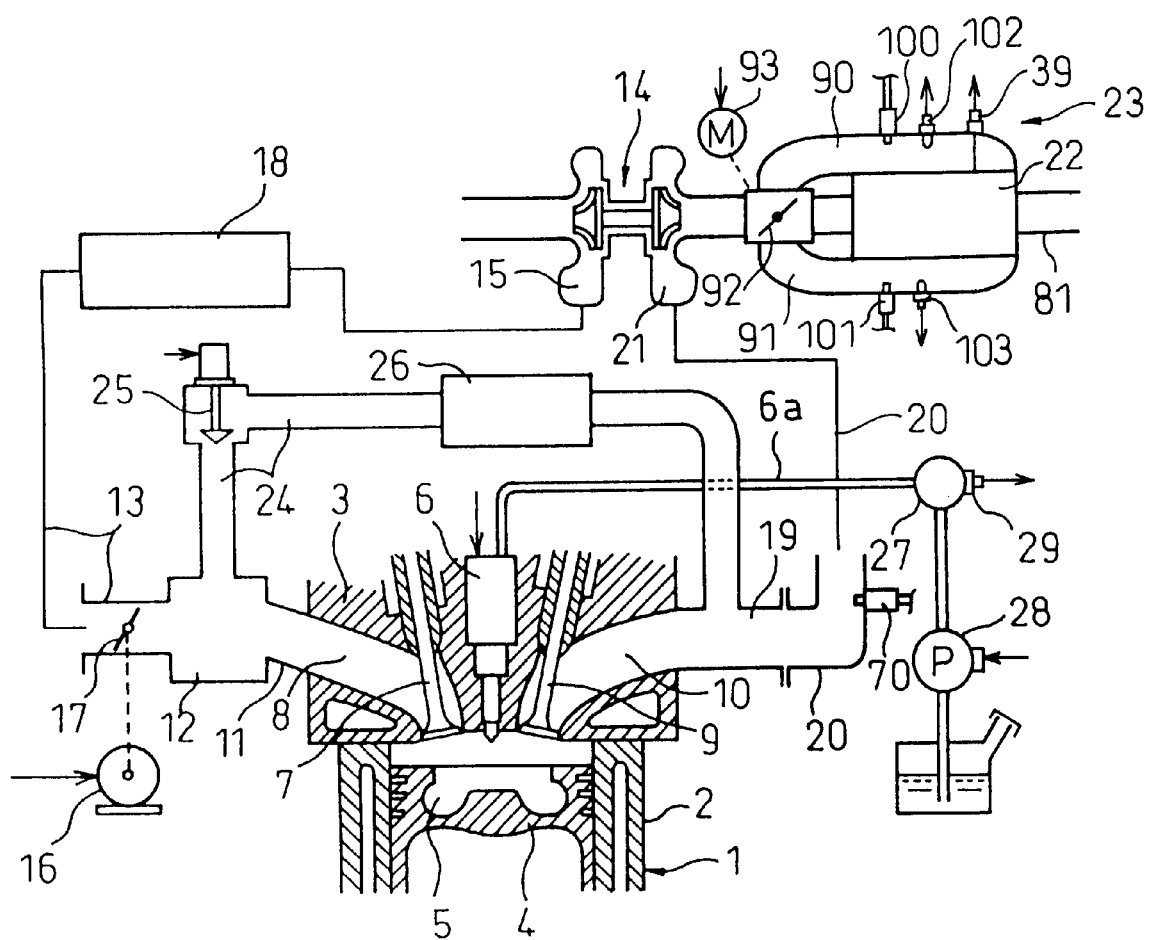
FIG. 34 is an overall view of still another embodiment of an engine.

FIG. 34 shows an engine suitable for raising the temperature TF of the particulate filter 22. Referring to FIG. 34, in this engine, the hydrocarbon feed devices 70, 100, and 101 are arranged in the exhaust pipe 20, the first passage 90, and the second passage 91, respectively. Hydrocarbons are fed from the hydrocarbon feed devices 70, 100, and 101 in accordance with need. When the hydrocarbons are fed, the hydrocarbons are oxidized by the excess oxygen on the particulate filter 22. The temperature TF of the particulate filter 22 is raised by the heat of the oxidation reaction at this time. In this case, it is possible to reduce the temperature TF of the particulate filter 22 by reducing the amount of feed of the hydrocarbons. Note that the hydrocarbon feed device 70 may also be arranged somewhere between the particulate filter 22 and the exhaust port 10. In FIG. 34, reference numerals 102 and 103 are air-fuel ratio sensors.

Figure 35:
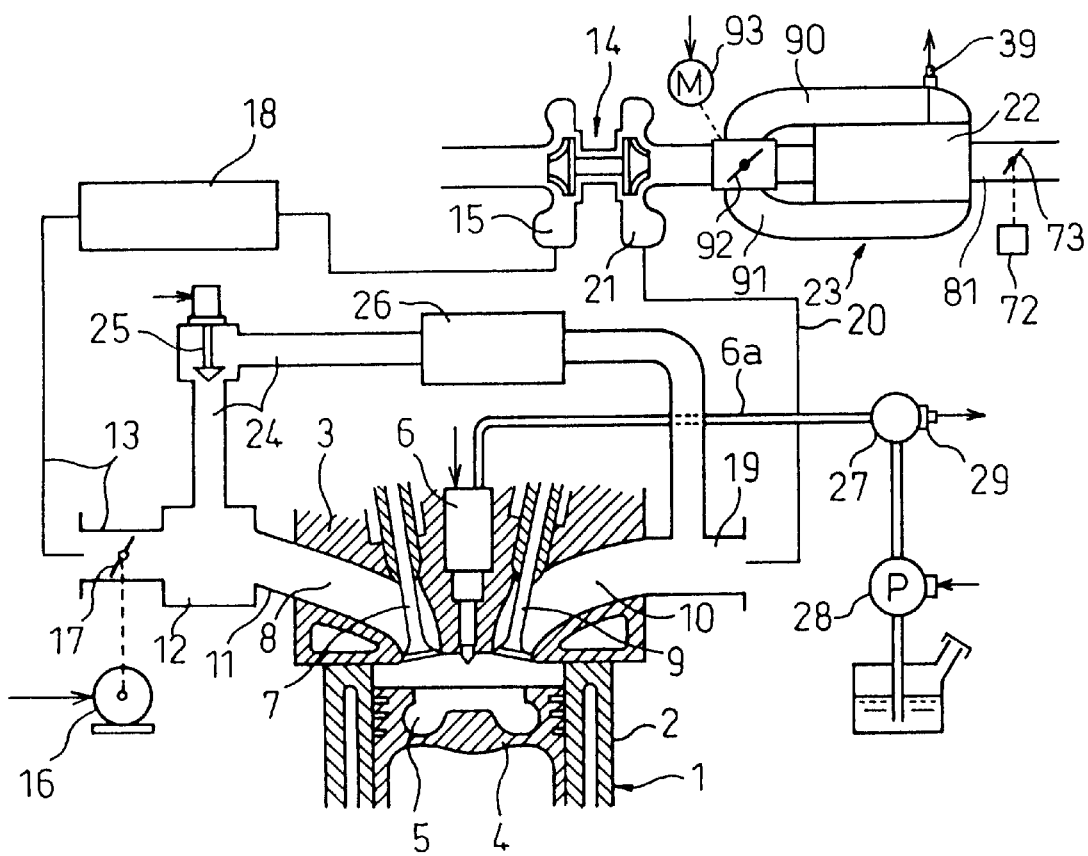
FIG. 35 is an overall view of still another embodiment of an engine.

FIG. 35 shows an engine suitable for raising the temperature TF of the particulate filter 22. Referring to FIG. 35, in this engine, an exhaust control valve 73 driven by an actuator 72 is arranged inside the exhaust pipe 81 downstream of the exhaust switching valve 82. When the temperature TF of the particulate filter 22 is raised, the exhaust control valve 73 is substantially fully closed. To prevent a reduction in the engine output torque due to the exhaust control valve 73 being substantially fully closed, the amount of injection of the main fuel Qm is increased. On the other hand, by increasing the opening degree of the exhaust control valve 73 and reducing the amount of injection of the main fuel Qm, it is possible to reduce the temperature of the particulate filter 22.

Figure 36:
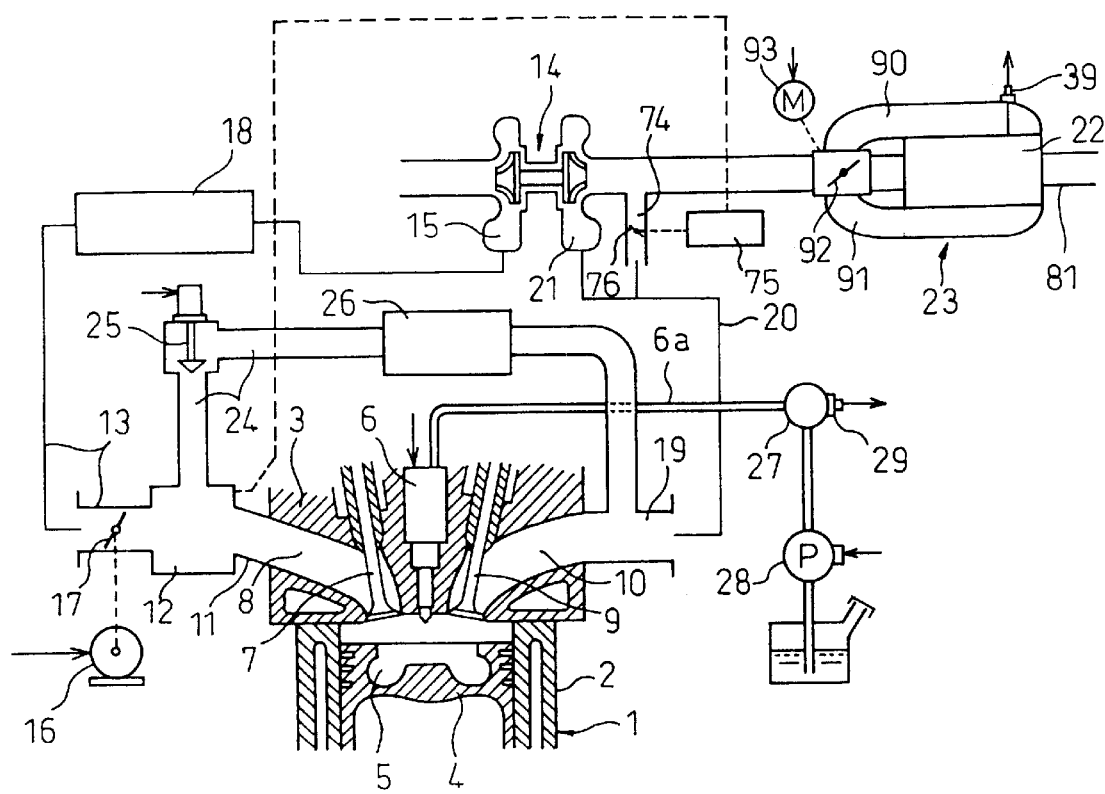
FIG. 36 is an overall view of still another embodiment of an engine.

FIG. 36 shows another engine suited for raisin the temperature TF of the particulate filter 22. Referring to FIG. 36, in this engine, a waist gate valve 76 controlled by an actuator 75 is arranged inside the exhaust bypass passage 74 bypassing the exhaust turbine 21. This actuator 75 is activated by the pressure inside the surge tank 12, that is, the supercharging pressure, and controls the opening degree of the waist gate valve 76 so that the supercharging pressure does not become more than a certain pressure. When the temperature TF of the particulate filter 22 should be raised, the waist gate valve 76 is fully opened.

On the other hand, by reducing the opening degree of the waist gate valve 76, the temperature TF of the particulate filter 22 can be reduced.

Further, in another embodiment, when the temperature of the exhaust gas is lower than the temperature range where the $NO_x$ absorption rate becomes more than 50 percent, that is, 250° C. to 500° C., and there is the possibility of the temperature TF of the particulate filter 22 becoming lower than the temperature range where the $NO_x$ absorption rate becomes more than 50 percent, that is, 250° C. to 500° C., the exhaust gas is made to bypass the particulate filter 22 as shown in FIG. 32C. Due to this, the temperature TF of the particulate filter 22 is kept in the temperature range where the $NO_x$ absorption rate becomes more than 50 percent, that is, 250° C. to 500° C. Further, when the temperature of the exhaust gas is higher than the temperature range where the $NO_x$ absorption rate becomes more than 50 percent, that is, 250° C. to 500° C., and there is the possibility of the temperature TF of the particulate filter 22 becoming higher than the temperature range where the $NO_x$ absorption rate becomes more than 50 percent, that is, 250° C. to 500° C., the exhaust gas is made to bypass the particulate filter 22 as shown in FIG. 32C. Due to this, the temperature TF of the particulate filter 22 is kept in the temperature range where the $NO_x$ absorption rate becomes more than 50 percent, that is, 250° C. to 500° C. This state is for example operation of the engine for rapid acceleration. In this case, whether the engine is in rapid acceleration operation can be determined based on for example the amount of depression of the accelerator pedal, the angular speed of the crankshaft, the engine speed, the torque, the exhaust temperature, the amount of intake air, etc. On the other hand, when the temperature of the exhaust gas is in the temperature range where the $NO_x$ absorption rate becomes more than 50 percent, that is, 250° C. to 500° C., and there is no possibility of the temperature TF of the particulate filter 22 ending up outside the temperature range where the $NO_x$ absorption rate becomes more than 50 percent, that is, 250° C. to 500° C., the exhaust switching valve 92 is kept at the position shown in FIG. 32A or FIG. 32B and the exhaust gas is made not to bypass the particulate filter 22 so that the temperature TF of the particulate filter 22 is maintained in the temperature range where the $NO_x$ absorption rate becomes more than 50 percent, that is, 250° C. to 500° C. The temperature of the exhaust gas may be actually measured or may be estimated based on the operating conditions of the engine. Further, by both switching the exhaust switching valve 92 and changing the operating state of the engine as explained above, the temperature TF of the particulate filter 22 may be maintained in the temperature range where the $NO_x$ absorption rate becomes more than 50 percent, that is, 250° C. to 500° C.

Further, when the temperature of the exhaust gas is lower than the temperature range where the $NO_x$ absorption rate becomes more than 50 percent, that is, 250° C. to 500° C., and the temperature TF of the particulate filter 22 is lower than the temperature range where the $NO_x$ absorption rate becomes more than 50 percent, that is, 250° C. to 500° C., as mentioned above, operating state of the engine is changed as explained above to raise the temperature of the exhaust gas, the exhaust switching valve 92 is switched to the forward flow position (FIG. 32A) or the reverse flow position (FIG. 32B) to make the exhaust gas raised in temperature flow into the particulate filter 22, then the exhaust switching valve 92 is switched to the bypass position (FIG. 32C) to seal the exhaust gas raised in temperature in the particulate filter 22, and the temperature TF of the particulate filter 22 is raised to the temperature range where the $NO_x$ absorption rate becomes more than 50 percent, that is, 250° C. to 500° C. In this case, it is possible to detect any change in the temperature TF of the particulate filter 22 by a temperature sensor 39 and estimate the distribution of temperature in the particulate filter 22 and to select the direction of flow of the exhaust gas to the particulate filter 22 and the hydrocarbon feed device 100, 101 to be used to feed the hydrocarbon based on this.

In this embodiment, cooling fins or other cooling devices (not shown) are provided in the second passage 91 (FIG. 29). In this embodiment, when the temperature of the exhaust gas is in the temperature range where the $NO_x$ absorption rate becomes more than 50 percent, that is, 250° C. to 500° C., and there is no possibility of the temperature TF of the particulate filter 22 becoming out of the temperature range where the $NO_x$ absorption rate becomes more than 50 percent, that is, 250° C. to 500° C., by sending the exhaust gas into the first passage 90 with no cooling device, the temperature of the exhaust gas flowing into the particulate filter 22 is maintained in the temperature range where the $NO_x$ absorption rate becomes more than 50 percent, that is, 250° C. to 500° C., and the temperature TF of the particulate filter 22 is maintained in the temperature range where the $NO_x$ absorption rate becomes more than 50 percent, that is, 250° C. to 500° C. On the other hand, when the temperature of the exhaust gas is higher than the temperature range where the $NO_x$ absorption rate becomes more than 50 percent, that is, 250° C. to 500° C., and there is a possibility of the temperature TF of the particulate filter 22 becoming higher than the temperature range where the $NO_x$ absorption rate becomes more than 50 percent, that is, 250° C. to 500° C., by sending the exhaust gas into the second passage with the cooling device, the temperature of the exhaust gas flowing into the particulate filter 22 is maintained in the temperature range where the $NO_x$ absorption rate becomes more than 50 percent, that is, 250° C. to 500° C., and the temperature TF of the particulate filter 22 is maintained in the temperature range where the $NO_x$ absorption rate becomes more than 50 percent, that is, 250° C. to 500° C.

Figure 37:
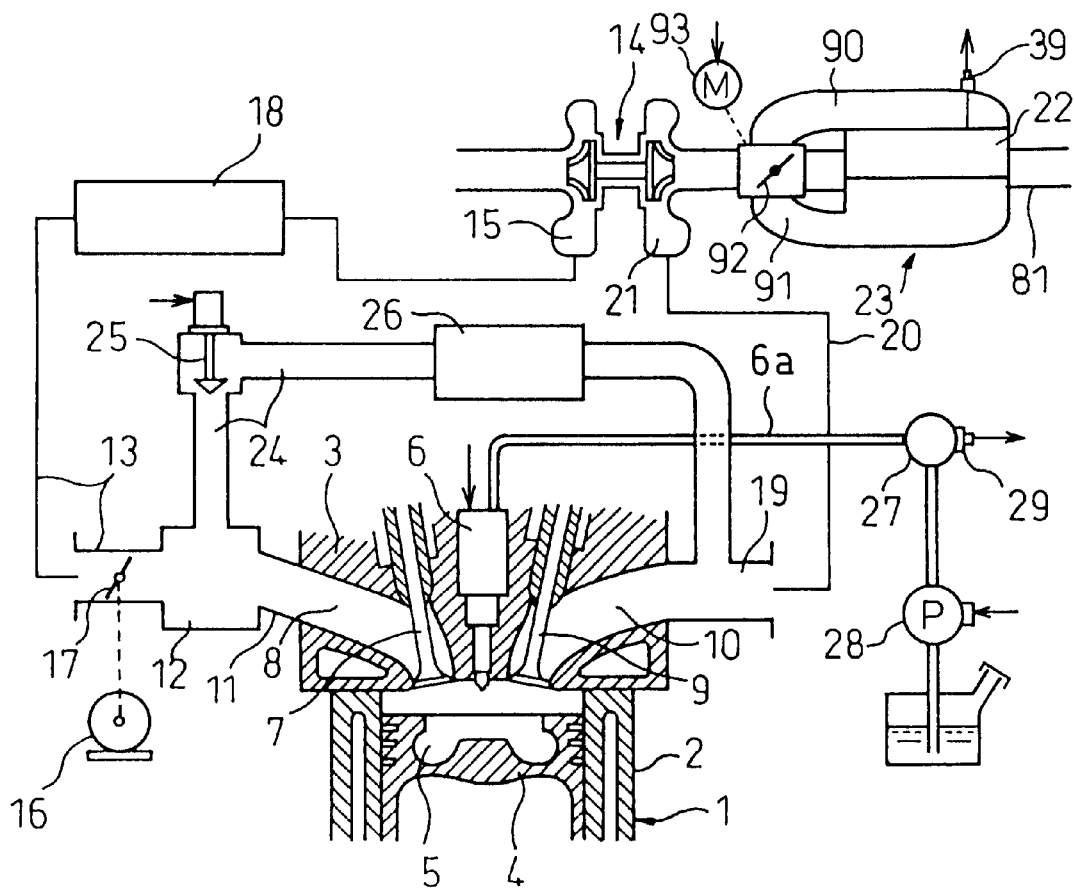
FIG. 37 is an overall view of still another embodiment of an engine.
Figure 38:
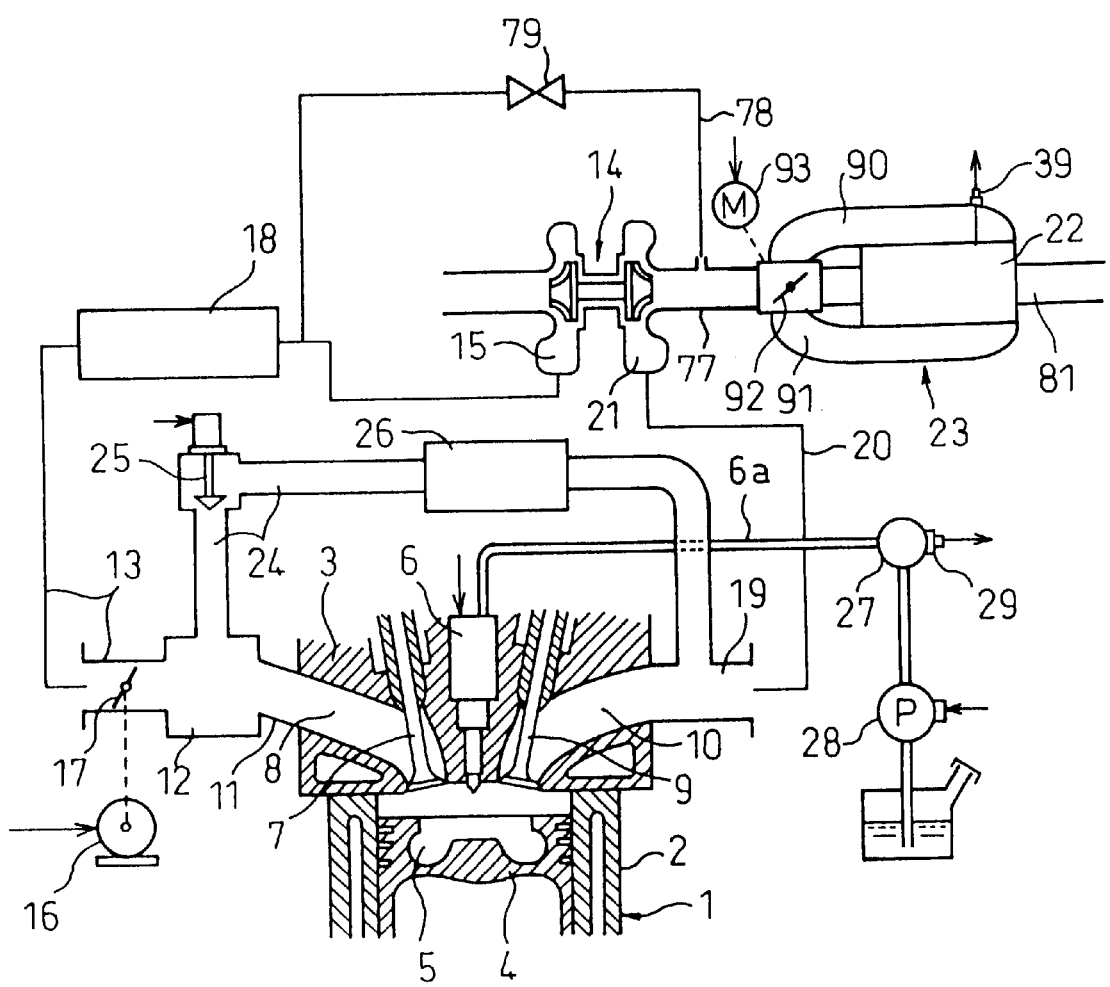
FIG. 38 is an overall view of still another embodiment of an engine.
Figure 39:
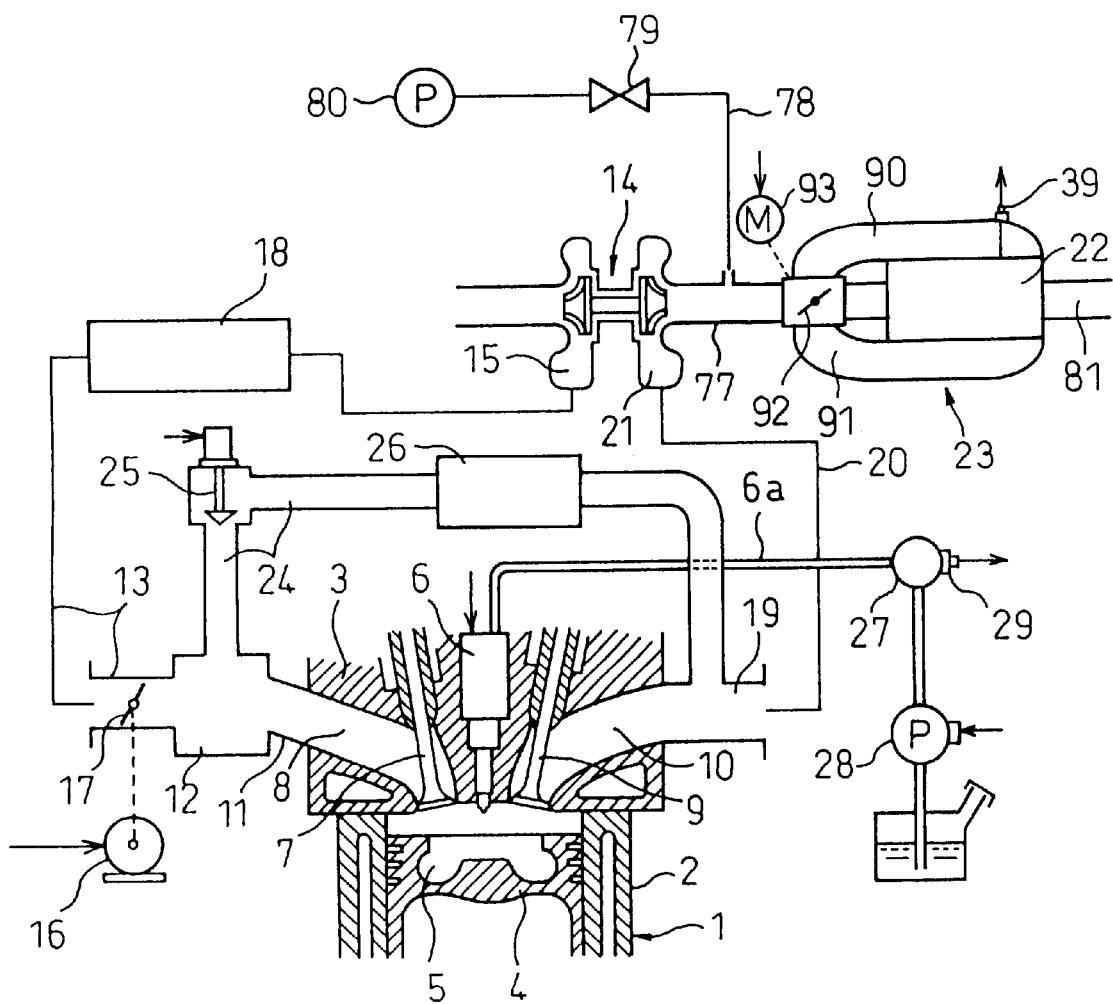
FIG. 39 is an overall view of still another embodiment of an engine.

FIG. 37 shows still another embodiment. In this embodiment, instead of providing a cooling device in the second passage 91 as in the above embodiment, the length of the exhaust gas passage of the second passage 91 is longer than the length of the exhaust gas passage of the first passage 90. In this embodiment, when the temperature of the exhaust gas is in the temperature range where the $NO_x$ absorption rate becomes more than 50 percent, that is, 250° C. to 500° C., and there is no possibility of the temperature TF of the particulate filter 22 becoming out of the temperature range where the $NO_x$ absorption rate becomes more than 50 percent, that is, 250° C. to 500° C., by sending the exhaust gas into the first passage 90 of the short length of the exhaust gas passage, the temperature of the exhaust gas flowing into the particulate filter 22 is maintained in the temperature range where the $NO_x$ absorption rate becomes more than 50 percent, that is, 250° C. to 500° C., and the temperature TF of the particulate filter 22 is maintained in the temperature range where the $NO_x$ absorption rate becomes more than 50 percent, that is, 250° C. to 500° C. On the other hand, when the temperature of the exhaust gas is higher than the temperature range where the $NO_x$ absorption rate becomes more than 50 percent, that is, 250° C., to 500° C., and there is a possibility of the temperature TF of the particulate filter 22 becoming higher than the temperature range where the $NO_x$ absorption rate becomes more than 50 percent, that is, 250° C. to 500° C., by sending the exhaust gas into the second passage with the long exhaust gas passage, the temperature of the exhaust gas flowing into the particulate filter 22 is maintained in the temperature range where the $NO_x$ absorption rate becomes more than 50 percent, that is, 250° C. to 500° C., and the temperature TF of the particulate filter 22 is maintained in the temperature range where the $NO_x$ absorption rate becomes more than 50 percent, that is, 250° C. to 500° C.

Further, in the above embodiment, when the temperature TF of the particulate filter 22 is in the temperature range where the $NO_x$ absorption rate becomes more than 50 percent, that is, 250° C. to 500° C., and there is a possibility of the temperature TF of the particulate filter 22 becoming lower than the temperature range where the $NO_x$ absorption rate becomes more than 50 percent, that is, 250° C. to 500° C., when the exhaust gas at the time of suspension of feed of fuel flows into the particulate filter 22, the exhaust switching valve 92 is switched to the bypass position (FIG. 32C) and the exhaust gas is made to bypass the particulate filter 22, whereby the temperature TF of the particulate filter 22 is maintained in the temperature range where the $NO_x$ absorption rate becomes more than 50 percent, that is, 250° C. to 500° C. Note that at this time, since the feed of fuel is stopped, even if the exhaust gas bypasses the particulate filter 22, the $NO_x$ will not be discharged outside the vehicle. In this embodiment, when the temperature TF of the particulate filter 22 is higher than the temperature range where the $NO_x$ absorption rate becomes more than 50 percent, that is, 250° C. to 500° C., and the temperature TF of the particulate filter 22 has to be reduced, the exhaust switching valve 92 is switched to the forward feed position (FIG. 32A) or the reverse flow position (FIG. 32B) and the relatively low temperature exhaust gas at the time of suspension of the feed of fuel is made to flow into the particulate filter 22, so the temperature TF of the particulate filter 22 is maintained in the temperature range where the $NO_x$ absorption rate becomes more than 50 percent, that is, 250° C. to 500° C. As a case for prohibiting the exhaust gas from bypassing the particulate filter 22 in this way, there is not only the case of the suspension of feed of the fuel where the temperature TF of the particulate filter 22 actually becomes higher than the temperature range where the $NO_x$ absorption rate becomes more than 50 percent, that is, 250° C. to 500° C., but also the case of the bypass of the exhaust gas wherein the temperature TF of the particulate filter 22 ends up becoming higher than the temperature range where the $NO_x$ absorption rate becomes more than 50 percent, that is, 250° C. to 500° C.

On the other hand, as explained above, when the amount M of discharged particulate and the temperature of the particulate filter 22 are out of the simultaneous particulate and $NO_x$ treatment region, it is possible to either reduce the amount M of discharged particulate or increase the amount G of the particulate removable by oxidation so as to restore the amount M of discharged particulate and the temperature of the particulate filter 22 to within the simultaneous particulate and $NO_x$ treatment region. In this case, as the method for reducing the amount of the discharged particulate, it is possible to use the various methods described earlier.

Further, as the method for increasing the concentration of oxygen in the exhaust gas so as to increase the amount G of the particulate removable by oxidation, it is similarly possible use the various methods explained earlier.

Further, as explained above, it is possible to use secondary air to increase the concentration of oxygen in the exhaust gas. In the example shown in FIG. 38, the exhaust pipe 77 between the exhaust turbine 21 and the particulate filter 22 is connected to the intake duct 13 through the secondary air feed conduit 78 and the feed control valve 79 is arranged in the secondary air feed conduit 78. Further, in the example shown in FIG. 39, the secondary air feed conduit 78 is connected to an engine driven air pump 80. Note that the position of feeding the secondary air to the exhaust passage may be anywhere between the particulate filter 22 and the exhaust port 10. In the engine shown in FIG. 38 or FIG. 39, the feed control valve 79 is opened when the concentration of oxygen in the exhaust gas is to be increased. At this time, the secondary air is fed from the secondary air feed conduit 78 to the exhaust pipe 77 and therefore the concentration of oxygen in the exhaust gas is increased.

Note that the present invention can also be applied to an exhaust gas purification apparatus designed to arrange an oxidation catalyst in the exhaust passage upstream of the particulate filter, convert the NO in the exhaust gas to $NO_2$ by this oxidation catalyst, cause the $NO_2$ and the particulate deposited on the particulate filter to react, and use this $NO_2$ to oxidize the particulate.

According to the present invention, as explained above, it is possible to continuously oxidize and remove the particulate in the exhaust gas on the particulate filter while purifying the $NO_x$ in the exhaust gas well.

While the invention has been described with reference to specific embodiment chosen for purpose of illustration, it should be apparent that numerous modifications could be made thereto by those skilled in the art without departing from the basic concept and scope of the invention.

What is claimed is:

1. An exhaust gas purification device of an engine having a combustion chamber comprising an exhaust passage and a particulate filter arranged in said exhaust passage for removing particulate in exhaust gas exhausted from said combustion chamber; said particulate filter being a particulate filter having a function of removing, by oxidation, particulate in the exhaust gas without emitting a luminous flame when an amount of discharged particulate discharged from the combustion chamber per unit time is smaller than an amount of particulate removable by oxidation per unit time without emitting a luminous flame on the particulate filter and of absorbing $NO_x$ in exhaust gas when an air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich; the amount of said discharged particulate and the temperature of the particulate filter being maintained in most operating states within a simultaneous particulate and $NO_x$ treatment region in a temperature region wherein the amount of discharged particulate becomes smaller than an amount of particulate removable by oxidation and a $NO_x$ absorption rate becomes more than a certain value at all times.

2. An exhaust gas purification device as set forth in claim 1, wherein a precious metal catalyst is carried on the particulate filter.

3. An exhaust gas purification device as set forth in claim 2, wherein an active oxygen release agent which absorbs oxygen and holds the oxygen when excess oxygen is present in the surroundings and releases the held oxygen in the form of active oxygen when the concentration of oxygen in the surroundings falls is carried on the particulate filter and wherein active oxygen is released from the active oxygen release agent and the particulate adhered on the particulate filter is oxidized by the released active oxygen when the particulate adheres on the particulate filter.

4. An exhaust gas purification device as set forth in claim 2, wherein an $NO_x$ absorbent for absorbing the $NO_x$ in the exhaust gas when the air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich is carried on the particulate filter; the air-fuel ratio of the exhaust gas flowing into the particulate filter is usually maintained lean so that the $NO_x$ in the exhaust gas is absorbed in the $NO_x$ absorbent, and air-fuel ratio control means is provided for making the air-fuel ratio of the exhaust gas flowing into the particulate filter temporarily rich when $NO_x$ is to be released from the $NO_x$ absorbent.

5. An exhaust gas purification device as set forth in claim 2, wherein an active oxygen release agent/$NO_x$ absorbent having the function of an active oxygen release agent which absorbs oxygen and holds the oxygen when excess oxygen is present in the surroundings and releases the held oxygen in the form of active oxygen when the concentration of oxygen in the surroundings falls and the function of a $NO_x$ absorbent absorbing the $NO_x$ in the exhaust gas when the air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich is carried on the particulate filter; the air-fuel ratio of the exhaust gas flowing into the particulate filter is usually maintained lean so that the particulate adhered on the particulate filter is oxidized and the $NO_x$ in the exhaust gas is absorbed in the active oxygen release agent/$NO_x$ absorbent, and air-fuel ratio control means is provided for making the air-fuel ratio of the exhaust gas flowing into the particulate filter temporarily rich when $NO_x$ is to be released from the active oxygen release agent/$NO_x$ absorbent.

6. An exhaust gas purification device as set forth in claim 5, wherein the active oxygen release agent/$NO_x$ absorbent is comprised of at least one of an alkali metal, an alkali earth metal, a rare earth, and a transition metal.

7. An exhaust gas purification device as set forth in claim 6, wherein the alkali metal and alkali earth metal are comprised of metals higher in tendency toward ionization than calcium.

8. An exhaust gas purification device as set forth in claim 6, further comprising temperature raising means for raising the temperature of the particulate filter to a $SO_x$ release temperature while maintaining the air-fuel ratio of the exhaust gas flowing into the particulate filter lean when $SO_x$ is to be released from the active oxygen release agent/$NO_x$ absorbent.

9. An exhaust gas purification device as set forth in claim 8, wherein the temperature raising means makes the temperature of the particulate filter rise by causing a delay of the injection timing of main fuel or causing injection of auxiliary fuel in addition to the main fuel.

10. An exhaust gas purification device as set forth in claim 5, wherein the air-fuel ratio control means alternately switches the air-fuel ratio of the exhaust gas flowing into the particulate filter between lean and rich when causing the release of $SO_x$ from the active oxygen release agent/$NO_x$ absorbent.

11. An exhaust gas purification device as set forth in claim 1, wherein a mean air-fuel ratio in the combustion chamber is made rich or fuel is injected into the exhaust passage when making the air-fuel ratio of the exhaust gas flowing into the particulate filter rich.

12. An exhaust gas purification device as set fort in claim 11, wherein the engine is an engine where the amount of generation of soot gradually increases and peaks when an amount of inert gas in the combustion chamber increases and where almost no soot is generated any longer when the amount of inert gas in the combustion chamber further increases and wherein when the amount of inert gas in the combustion chamber is larger than the amount of inert gas where the amount of generation of soot peaks and the air-fuel ratio of the exhaust gas flowing into the particulate filter should be made rich, the mean air-fuel ratio in the combustion chamber is made rich.

13. An exhaust gas purification device as set forth in claim 1, wherein an amount of particulate removable by oxidation is a function of a temperature of the particulate filter.

14. An exhaust gas purification device as set forth in claim 13, wherein the amount of particulate removable by oxidation is a function of at least one of concentration of oxygen and concentration of $NO_x$ in the exhaust gas in addition to the temperature of the particulate filter.

15. An exhaust gas purification device as set forth in claim 1, further comprising control means for controlling at least one of an amount of discharged particulate, an amount of particulate removable by oxidation, and a temperature of the particulate filter so that the amount of discharged particulate and the temperature of the particulate filter become within a simultaneous particulate and $NO_x$ treatment region when at least one of the amount of discharged particulate and temperature of the particulate filter become out of the simultaneous particulate and $NO_x$ treatment region.

16. An exhaust gas purification device as set forth in claim 15, wherein said control means controls the temperature of the particulate filter by controlling at least one of an amount of fuel injection and a fuel injection timing.

17. An exhaust gas purification device as set forth in claim 15, wherein said engine is an engine where an amount of generation of soot gradually increases and peaks when an amount of exhaust gas recirculation increases and where almost no soot is generated any longer when the amount of exhaust gas recirculation further increases and wherein the control means controls the temperature of the particulate filter by controlling the amount of exhaust gas recirculation.

18. An exhaust gas purification device as set forth in claim 15, wherein a hydrocarbon feed device is arranged in the exhaust passage upstream of the particulate filter and wherein the temperature of the particulate filter is controlled by controlling the amount of hydrocarbons fed from the hydrocarbon feed device into the exhaust passage.

19. An exhaust gas purification device as set forth in claim 15, wherein an exhaust control valve is arranged in the exhaust passage downstream of the particulate filter and wherein the opening degree of the exhaust control valve is controlled to control the temperature of the particulate filter.

20. An exhaust gas purification device as set forth in claim 15, further comprising an exhaust turbocharger provided with a waist gate valve for controlling an amount of exhaust gas bypassing an exhaust turbine and wherein the opening degree of the waist gate valve is controlled to control the temperature of the particulate filter.

21. An exhaust gas purification device as set forth in claim 15, wherein the control means reduces the amount of discharged particulate when the amount of discharged particulate is to be controlled when at least one of the amount of discharged particulate and temperature of the particulate filter is out of the simultaneous particulate and $NO_x$ treatment region.

22. An exhaust gas purification device as set forth in claim 21, wherein the control means reduces the amount of discharged particulate by controlling at least one of an amount of fuel injection, fuel injection timing, fuel injection pressure, and injection of auxiliary fuel.

23. An exhaust gas purification device as set forth in claim 21, wherein supercharging means is provided for supercharging an intake air and wherein said control means reduces the amount of discharged particulate by increasing the supercharging pressure.

24. An exhaust gas purification device as set forth in claim 21, wherein exhaust gas recirculation device is provided for recirculating exhaust gas in an intake passage and wherein said control means reduces the amount of discharged particulate by reducing an exhaust gas recirculation rate.

25. An exhaust gas purification device as set forth in claim 15, wherein said control means controls a concentration of oxygen in the exhaust gas so as to control the amount of particulate removable by oxidation.

26. An exhaust gas purification device as set forth in claim 25, wherein exhaust gas recirculation device is provided for recirculating exhaust gas in an intake passage and wherein said control means controls the exhaust gas recirculation rate to control the concentration of oxygen in the exhaust gas.

27. An exhaust gas purification device as set forth in claim 25, wherein secondary air feed device is provided for feeding secondary air inside the exhaust passage upstream of the particulate filter and wherein said control means feeds secondary air inside the exhaust passage upstream of the particulate filter to control the concentration of oxygen in the exhaust gas.

28. An exhaust gas purification device as set forth in claim 1, wherein said engine is an engine where an amount of generation of soot gradually increases and peaks when an amount of inert gas in the combustion chamber increases and where almost no soot is generated any longer when the amount of inert gas in the combustion chamber further increases and wherein first combustion where the amount of inert gas in the combustion chamber is larger than the amount of inert gas where the amount of generation of soot peaks and second combustion where the amount of inert gas in the combustion chamber is smaller than the amount of inert gas where the amount of generation of soot peaks are selectively performed.

29. An exhaust gas purification device as set forth in claim 28, wherein exhaust gas recirculation device is provided for recirculating exhaust gas discharged from the combustion chamber through an engine intake passage, the inert gas is comprised of exhaust gas recirculation gas, the exhaust gas recirculation rate when first combustion is being performed is at least about 55 percent, and the exhaust gas recirculation rate when second combustion is being performed is not more than about 50 percent.

30. An exhaust gas purification device as set forth in claim 28, wherein an operating region of the engine is divided into a low load side first operating region and a high load side second operating region, first combustion is performed in the first operating region, and second combustion is performed in the second operating region.

31. An exhaust gas purification device as set forth in claim 1, wherein further provision is made of flow direction switching means able to alternately switch a direction of flow of exhaust gas flowing through the particulate filter between a first direction and a second direction opposite to the first direction.

32. An exhaust gas purification device as set forth in claim 31, wherein said flow direction switching means alternately switches the direction of flow of the exhaust gas flowing through the particulate filter between the first direction and the second direction by a predetermined timing.

33. An exhaust gas purification device as set forth in claim 31, wherein said flow direction switching means is comprised of a switching valve device arranged in the exhaust passage, the particulate filter is provided with exhaust gas outflow and inflow ends at its two ends; a first passage extending up to one of the exhaust gas outflow and inflow ends of the particulate filter, a second passage extending from the particulate filter up to the other of the exhaust gas outflow and inflow ends, and an exhaust bypass passage communicating with the outside air are branched from said switching valve device; and said switching valve device can switch the direction of flow of the exhaust gas among a first direction passing through the first passage, particulate filter, and second passage toward the exhaust bypass passage, a second direction passing through the second passage, particulate filter, and first passage toward exhaust bypass passage, and a third direction not passing through the particulate filter, but directly heading toward the exhaust bypass passage.

34. An exhaust gas purification device as set forth in claim 33, wherein said switching valve device switches the direction of flow of the exhaust gas to one of the first direction or second direction passing through the particulate filter and the third direction where the exhaust gas does not pass through the particulate filter so that the temperature of the particulate filter becomes a temperature range where the $NO_x$ absorption rate becomes more than a certain value.

35. An exhaust gas purification device as set forth in claim 34, wherein said switching valve device switches the direction of flow of the exhaust gas to the third direction when the temperature of the particulate filter is outside the temperature range where the $NO_x$ absorption rate becomes more than a certain value.

36. An exhaust gas purification device as set forth in claim 33, wherein the first passage and the second passage are formed so that the temperature of the exhaust gas flowing from the second passage to the particulate filter becomes lower than the temperature of the exhaust gas flowing from the first passage to the particulate filter and wherein the switching valve device switches the flow of direction of the exhaust gas to one of the first direction or second direction so that the temperature of the particulate filter becomes a temperature range where the $NO_x$ absorption rate becomes more than a certain value.

37. An exhaust gas purification device as set forth in claim 33, wherein the switching valve device switches the direction of flow of the exhaust gas to the third direction when the temperature of the particulate filter may become lower than the temperature range where the $NO_x$ absorption rate becomes more than a certain value when stopping the feed of fuel and makes the direction of flow the exhaust gas the first direction or second direction when the temperature of the particulate filter is higher than the temperature range where the $NO_x$ absorption rate becomes more than a certain value when stopping the feed of fuel.

38. An exhaust gas purification device as set forth in claim 31, wherein an active oxygen release agent/$NO_x$ absorbent having the function of an active oxygen release agent which absorbs oxygen and holds the oxygen when excess oxygen is present in the surroundings and releases the held oxygen in the form of active oxygen when the concentration of oxygen in the surroundings falls and the function of a $NO_x$ absorbent absorbing the $NO_x$ in the exhaust gas when the air-fuel ratio of the exhaust gas flowing into the particulate filter is lean and releasing the absorbed $NO_x$ when the air-fuel ratio of the exhaust gas flowing into the particulate filter becomes the stoichiometric air-fuel ratio or rich is carried inside the particulate filter and wherein the particulate trapped in the particulate filter is moved by the direction of flow of the exhaust gas being switched to the first direction or the second direction by the flow direction switching means.

* * * * *